(12) United States Patent
Miyazawa

(10) Patent No.: US 7,193,353 B2
(45) Date of Patent: Mar. 20, 2007

(54) OPERATING APPARATUS AND AN ELECTRIC INSTRUMENT

(75) Inventor: Osamu Miyazawa, Shimasuwa-machi (JP)

(73) Assignee: Seiko Epson Corporation (JP)

( * ) Notice: Subject to any disclaimer, the term of this patent is extended or adjusted under 35 U.S.C. 154(b) by 263 days.

(21) Appl. No.: 10/817,446

(22) Filed: Apr. 2, 2004

(65) Prior Publication Data

US 2004/0256957 A1 Dec. 23, 2004

(30) Foreign Application Priority Data

Apr. 3, 2003 (JP) .............................. 2003-100101
Jan. 28, 2004 (JP) .............................. 2004-020522

(51) Int. Cl.
*H01L 41/08* (2006.01)

(52) U.S. Cl. ...................................... 310/328
(58) Field of Classification Search ................ 310/323, 310/328, 323.02, 323.12, 323.16; 250/442.11; *H02N 1/00; H01L 41/08*
See application file for complete search history.

(56) References Cited

U.S. PATENT DOCUMENTS 4,453,103 A * 6/1984 Vishnevsky et al. ........ 310/328

5,696,421 A * 12/1997 Zumeris et al. ............. 310/328

FOREIGN PATENT DOCUMENTS

| JP | 11-250225 | 9/1999 |
| WO | WO00/38309 | 6/2000 |
| WO | WO0038309 | * 6/2000 |

* cited by examiner

*Primary Examiner*—Darren Schuberg
*Assistant Examiner*—Karen Addison
(74) *Attorney, Agent, or Firm*—Harness, Dickey & Pierce, P.L.C.

(57) ABSTRACT

An operating apparatus 1 of the present invention has a driven element 5 having an imaging element and a contacted element, a frame 4 rotatably supporting the driven element 5, and an ultrasonic motor. The ultrasonic motor includes a vibrating element 6. The vibrating element 6 includes a first piezoelectric element 62 that undergoes extension and contraction by application of an AC voltage, a reinforcing plate 63 having a contact portion 66 and an arm portion 68, and a second piezoelectric element 64 that undergoes extension and contraction by application of an AC voltage. The first piezoelectric element 62, the reinforcing plate 63, and the second piezoelectric element 64 are laminated in this order. The vibrating element 6 is fixedly mounted on the frame 4 in a state where the contact portion 66 abuts on the contacted element 51. Further, in the operating apparatus 1, the driven element 5 is driven by vibrating of the vibrating element 6 via the contacted element 51 to rotate with respect to the frame 4.

25 Claims, 36 Drawing Sheets

OPERATING APPARATUS AND AN ELECTRIC INSTRUMENT

CROSS REFERENCE TO RELATED APPLICATIONS

This application claims priority to Japanese Patent Application Nos. 2003-100101 filed Apr. 3, 2003 and 2004-020522 filed Jan. 28, 2004, which are hereby expressly incorporated by reference herein in their entireties.

TECHNICAL FIELD

The present invention is related to an operating apparatus and an electric instrument.

BACKGROUND ART

So far, operating apparatuses that drive a driven element such as a pan-tilt type zoom camera or the like are well known. In such an ultrasonic motor, a technology described in a website (URL: http://www.viwemedia. co.jp/kiki/vcc4.htm (Japanese only)) is known as the above-mentioned technology.

However, in conventional operating apparatuses, since a drive mechanism of the driven element is constructed from a large motor such as an electromagnetic motor, there is a problem that the entire apparatus becomes a large size.

SUMMARY OF THE INVENTION

It is an object of the present invention to provide an operating apparatus and an electric instrument that can minimize a size of the entire apparatus.

In order to achieve the above-mentioned object, in one aspect of the invention, the present invention is directed to an operating apparatus. In one embodiment of the present invention, the operating apparatus comprises:
 a driven element (in particular, a driven element having an imaging element);
 a frame which rotatably supports the driven element;
 a contacted element which is stationary with respect to the driven element; and
 a vibrating element which includes a first piezoelectric element that undergoes extension and contraction by application of an AC voltage, a reinforcing plate having a contact portion and an arm portion, and a second piezoelectric element that undergoes extension and contraction by application of an AC voltage, the first piezoelectric element, the reinforcing plate and the second piezoelectric element being laminated in this order, and the contact portion of the vibrating element abutting on the contacted element;
 wherein the vibrating element transmits power to the driven element via the contacted element to rotate the driven element.

According to this invention, since an operating mechanism for the driven element, in particular, an operating mechanism for a driven element that is an imaging device (imaging unit) is constructed using an ultrasonic motor having a laminated structure, it is possible to make the entire apparatus smaller and thinner.

In particular, since the vibrating element is constructed so that the first piezoelectric element that undergoes extension and contraction by application of an AC voltage, the reinforcing plate having a contact portion and an arm portion, and the second piezoelectric element that undergoes extension and contraction by application of an AC voltage are laminated in this order, it is possible to obtain great driving force and a high drive speed by applying a low voltage to the vibrating element. Further, since the vibrating element drives using the extension and contraction of the in-plan direction thereof, it is possible to heighten (enhance) drive efficiency extremely.

In the operating apparatus of the present invention, it is preferable that the contacted element is fixedly provided on the driven element.

Further, in the operating apparatus of the present invention, it is preferable that the vibrating element is fixedly provided on the frame.

Further, in the operating apparatus of the present invention, it is preferable that the operating apparatus has means for pushing one of the contacted element and the vibrating element toward the other.

This makes it possible to obtain greater (higher) driving force and therefore it is possible to rotate (drive) the driven element more surely.

In the operating apparatus of the present invention, it is preferable that the pushing means is adapted to push the contacted element toward the vibrating element by Further, in the operating apparatus of the present invention, it is preferable that the vibrating element has a thin plate-shaped structure, and the contacted element and the vibrating element are provided in a substantially same plane.

In this invention, since the contacted element and the vibrating element are arranged in the substantially same plane, it is possible to constitute the drive mechanism of the driven element in one plane. In particular, in the case where the vibrating element has a plane structure, it is possible to make the entire apparatus thinner because the drive mechanism can be made further thinner.

In the operating apparatus of the present invention, it is preferable that the driven element has a side surface and the frame has an inner wall surface which is opposite to the side surface of the driven element through a gap therebetween, and the contacted element and the vibrating element are arranged within the gap.

According to this invention, it is possible to form the drive mechanism of the driven element the gap between the contacted element and the frame. This makes it possible to minimize a width of the operating apparatus.

In the operating apparatus of the present invention, it is preferable that the vibrating element is arranged so that a longitudinal direction thereof is parallel to a width direction of the frame, and the contacted element is arranged on a line extended to the longitudinal direction of the vibrating element.

Thus, since the longitudinal direction of the vibrating element is directed to the width direction of the operating apparatus, and the vibrating element and the contacted element is arranged on the line, it is possible to minimize a thickness of the operating apparatus.

In the operating apparatus of the present invention, it is preferable that the contacted element and the vibrating element are arranged so as to overlap each other when viewed from a top of the operating apparatus.

This makes it possible to minimize the width of the operating apparatus.

Further, it is preferable that the operating apparatus of the present invention has a decelerating mechanism between the contacted element and the driven element.

This makes it possible to drive the driven element with great torque.

In another embodiment of the present invention, the operating apparatus comprises:
- a driven element (in particular, a driven element having an imaging element);
- a first frame which receives the driven element;
- a second frame which rotatably supports the first frame;
- a contacted element which is stationary with respect to the first frame; and
- a vibrating element which includes a first piezoelectric element that undergoes extension and contraction by application of an AC voltage, a reinforcing plate having a contact portion and an arm portion, and a second piezoelectric element that undergoes extension and contraction by application of an AC voltage, the first piezoelectric element, the reinforcing plate and the second piezoelectric element being laminated in this order, and the contact portion of the vibrating element abutting on the contacted element;
- wherein the vibrating element transmits power to the first frame via the contacted element to rotate the first frame.

According to this invention, since an operating mechanism for the driven element (in particular, imaging device (imaging unit)) is constructed using an ultrasonic motor having a laminated structure, it is possible to make the entire apparatus smaller and thinner.

In particular, since the vibrating element is constructed so that the first piezoelectric element that undergoes extension and contraction by application of an AC voltage, the reinforcing plate having a contact portion and an arm portion, and the second piezoelectric element that undergoes extension and contraction by application of an AC voltage are laminated in this order, it is possible to obtain great driving force and a high drive speed by applying a low voltage to the vibrating element. Further, since the vibrating element drives using the extension and contraction of the in-plan direction thereof, it is possible to heighten (enhance) drive efficiency extremely.

In the operating apparatus of the present invention, it is preferable that the driven element is rotatably supported in the first frame, and the driven element and the first frame respectively have rotational axes in which an axial direction of the rotational axis of the driven element with respect to the first frame is different from that of the first frame with respect to the second frame.

Thus, since the driven element rotates with respect to the first frame and the first frame rotates with respect to the second frame, it is possible to realize a pan-tilt mechanism in which the driven element displaces (faces) in a desired direction with respect to the second frame.

In the operating apparatus of the present invention, it is preferable that the rotational axis of the driven element with respect to the first frame is substantially orthogonal to that of the first frame with respect to the second frame.

Thus, since the driven element rotates with respect to the first frame and the first frame rotates with respect to the second frame, it is possible to realize a pan-tilt mechanism in which the driven element displaces (faces) in a desired direction with respect to the second frame.

In the operating apparatus of the present invention, it is preferable that the vibrating element has a thin plate-shaped structure, and the contacted element and the vibrating element are provided in a substantially same plane.

In this invention, since the contacted element and the vibrating element are arranged in the substantially same plane, it is possible to constitute the drive mechanism of the driven element in one plane. In particular, in the case where the vibrating element has a plane structure, it is possible to make the entire apparatus thinner because the drive mechanism can be made further thinner.

In the operating apparatus of the present invention, it is preferable that the first frame has a side surface and the second frame has an inner wall surface which is opposite to the side surface of the first frame through a gap therebetween, and the contacted element and the vibrating element are arranged within the gap.

This makes it possible to minimize the width of the operating apparatus.

In the operating apparatus of the present invention, it is preferable that the first frame has a bottom portion and the second frame has an inner wall surface and an inner bottom surface, the contacted element and the vibrating element are arranged within a space defined by the bottom portion of the first frame and the inner wall surface and the inner bottom surface of the second frame, and the vibrating element and the contacted element transmit power to the first frame through the bottom portion of the first frame.

It is preferable that the operating apparatus of the present invention has a decelerating mechanism between the contacted element and the first frame.

This makes it possible to drive the first frame with great torque.

In the operating apparatus of the present invention, it is preferable that the contacted element has a gear and the first frame has tooth grooves so that the tooth grooves which are in engagement with the gear so that the contacted element transmits the power of the vibrating element to the first frame via the gear and the tooth grooves.

In the operating apparatus of the present invention, it is preferable that the contacted element is fixedly provided on the first frame.

In the operating apparatus of the present invention, it is preferable that the contacted element is fixedly provided on the second frame.

In the operating apparatus of the present invention, it is preferable that the vibrating element is fixedly provided on the first frame so as to rotate together with the first frame.

In the operating apparatus of the present invention, it is preferable that the inner wall surface of the second frame constitutes the contacted element, and the vibrating element abuts on the inner wall surface of the second frame to transmit its vibration to the inner wall surface and to receive reaction force from the inner wall surface so that the first frame is rotated together with the vibrating element by means of the reaction force.

In yet another embodiment of the present invention, the operating apparatus comprises:
- a driven element (in particular, a driven element having an imaging element);
- a first frame which rotatably supports the driven element;
- a first contacted element which is stationary with respect to the driven element;
- a first vibrating element which includes a first piezoelectric element that undergoes extension and contraction by application of an AC voltage, a reinforcing plate having a contact portion and an arm portion, and a second piezoelectric element that undergoes extension and contraction by application of an AC voltage, the first piezoelectric element, the reinforcing plate and the second piezoelectric element of the first vibrating element being laminated in this order, and the contact portion of the first vibrating element abutting on the first contacted element;
- a second frame which rotatably supports the first frame;

a second contacted element which is stationary with respect to the first frame; and a second vibrating element which includes a first piezoelectric element that undergoes extension and contraction by application of an AC voltage, a reinforcing plate having a contact portion and an arm portion, and a second piezoelectric element that undergoes extension and contraction by application of an AC voltage, the first piezoelectric element, the reinforcing plate and the second piezoelectric element of the second vibrating element being laminated in this order, and the contact portion of the second vibrating element abutting on the second contacted element;

wherein the first vibrating element transmits power to the driven element via the first contacted element to rotate the driven element with respect to the first frame, and the second vibrating element transmits power to the first frame via the second contacted element to rotate the first frame with respect to the second frame.

According to this invention, since an operating mechanism for the driven element (in particular, imaging device (imaging unit)) is constructed using an ultrasonic motor having a laminated structure, it is possible to make the entire apparatus smaller and thinner.

Further, since the driven element rotates with respect to the first frame and the first frame rotates with respect to the second frame, it is possible to realize a pan-tilt mechanism in which the driven element displaces (faces) in a desired direction with respect to the second frame.

In particular, since each of the vibrating elements is constructed so that the first piezoelectric element that undergoes extension and contraction by application of an AC voltage, the reinforcing plate having a contact portion and an arm portion, and the second piezoelectric element that undergoes extension and contraction by application of an AC voltage are laminated in this order, it is possible to obtain great driving force and a high drive speed by applying a low voltage to the vibrating element. Further, since the vibrating element drives using the extension and contraction of the in-plan direction thereof, it is possible to heighten (enhance) drive efficiency extremely.

In the operating apparatus of the present invention, it is preferable that the first contacted element is fixedly provided on the driven element.

In the operating apparatus of the present invention, it is preferable that the first vibrating element is fixedly provided on the first frame.

In the operating apparatus of the present invention, it is preferable that the second contacted element is fixedly provided on the first frame.

In the operating apparatus of the present invention, it is preferable that the second vibrating element is fixedly provided on the second frame.

In the operating apparatus of the present invention, it is preferable that the second contacted element is fixedly provided on the second frame.

In the operating apparatus of the present invention, it is preferable that the second vibrating element is fixedly provided on the first frame.

In the operating apparatus of the present invention, it is preferable that the driven element and the first frame respectively have rotational axes in which an axial direction of the rotational axis of the driven element with respect to the first frame is different from that of the first frame with respect to the second frame.

In the operating apparatus of the present invention, it is preferable that the rotational axis of the driven element with respect to the first frame is substantially orthogonal to that of the first frame with respect to the second frame.

In another aspect of the present invention, the present invention is directed to an electric instrument. The electric instrument in one embodiment has an operating apparatus. The operating apparatus comprises:

a driven element;

a frame which rotatably supports the driven element;

a contacted element which is stationary with respect to the driven element; and a vibrating element which includes a first piezoelectric element that undergoes extension and contraction by application of an AC voltage, a reinforcing plate having a contact portion and an arm portion, and a second piezoelectric element that undergoes extension and contraction by application of an AC voltage, the first piezoelectric element, the reinforcing plate and the second piezoelectric element being laminated in this order, and the contact portion of the vibrating element abutting on the contacted element;

wherein the vibrating element transmits power to the driven element via the contacted element to rotate the driven element.

In another embodiment of the present invention, an electric instrument is provided with an operating apparatus. The operating apparatus comprises:

a driven element;

a first frame which receives the driven element;

a second frame which rotatably supports the first frame;

a contacted element which is stationary with respect to the first frame; and a vibrating element which includes a first piezoelectric element that undergoes extension and contraction by application of an AC voltage, a reinforcing plate having a contact portion and an arm portion, and a second piezoelectric element that undergoes extension and contraction by application of an AC voltage, the first piezoelectric element, the reinforcing plate and the second piezoelectric element being laminated in this order, and the contact portion of the vibrating element abutting on the contacted element;

wherein the vibrating element transmits power to the first frame via the contacted element to rotate the first frame.

In yet another embodiment of the present invention, an electric instrument is provided with an operating apparatus. The operating apparatus comprises:

a driven element;

a first frame which rotatably supports the driven element;

a first contacted element which is stationary with respect to the driven element;

a first vibrating element which includes a first piezoelectric element that undergoes extension and contraction by application of an AC voltage, a reinforcing plate having a contact portion and an arm portion, and a second piezoelectric element that undergoes extension and contraction by application of an AC voltage, the first piezoelectric element, the reinforcing plate and the second piezoelectric element of the first vibrating element being laminated in this order, and the contact portion of the first vibrating element abutting on the first contacted element;

a second frame which rotatably supports the first frame;

a second contacted element which is stationary with respect to the first frame; and a second vibrating element which includes a first piezoelectric element that undergoes extension and contraction by application of an AC voltage, a reinforcing plate having a contact portion and an arm portion, and a second piezoelectric element that undergoes extension and contraction by application of an AC voltage, the first piezoelectric element, the reinforcing plate and the second piezoelectric element of the second vibrating element being laminated in this order, and the contact portion of the second vibrating element abutting on the second contacted element;

wherein the first vibrating element transmits power to the driven element via the first contacted element to rotate the driven element with respect to the first frame, and the second vibrating element transmits power to the first frame via the second contacted element to rotate the first frame with respect to the second frame.

According to these electric instruments, it is possible to obtain effects similar to that of the operating apparatuses mentioned above.

BRIEF DESCRIPTION OF THE DRAWINGS

The preferred embodiments of an ultrasonic motor, an operating apparatus, an optical apparatus and electric instrument are described below with reference to the appended drawings.

PREFERRED EMBODIMENTS OF THE INVENTION

The preferred embodiments of an operating apparatus and electric instrument of the present invention will be described below with reference to the appended drawings. In this regard, it should be noted that the embodiments (disclosure) are to be considered as an exemplification, and therefore this structure should not be intended to limit the present invention to the specific embodiments illustrated. Further, components of the embodiments described later include ones that one skilled in the art could replace readily or substantial identities thereof.

(First Embodiment)

Figure 1:
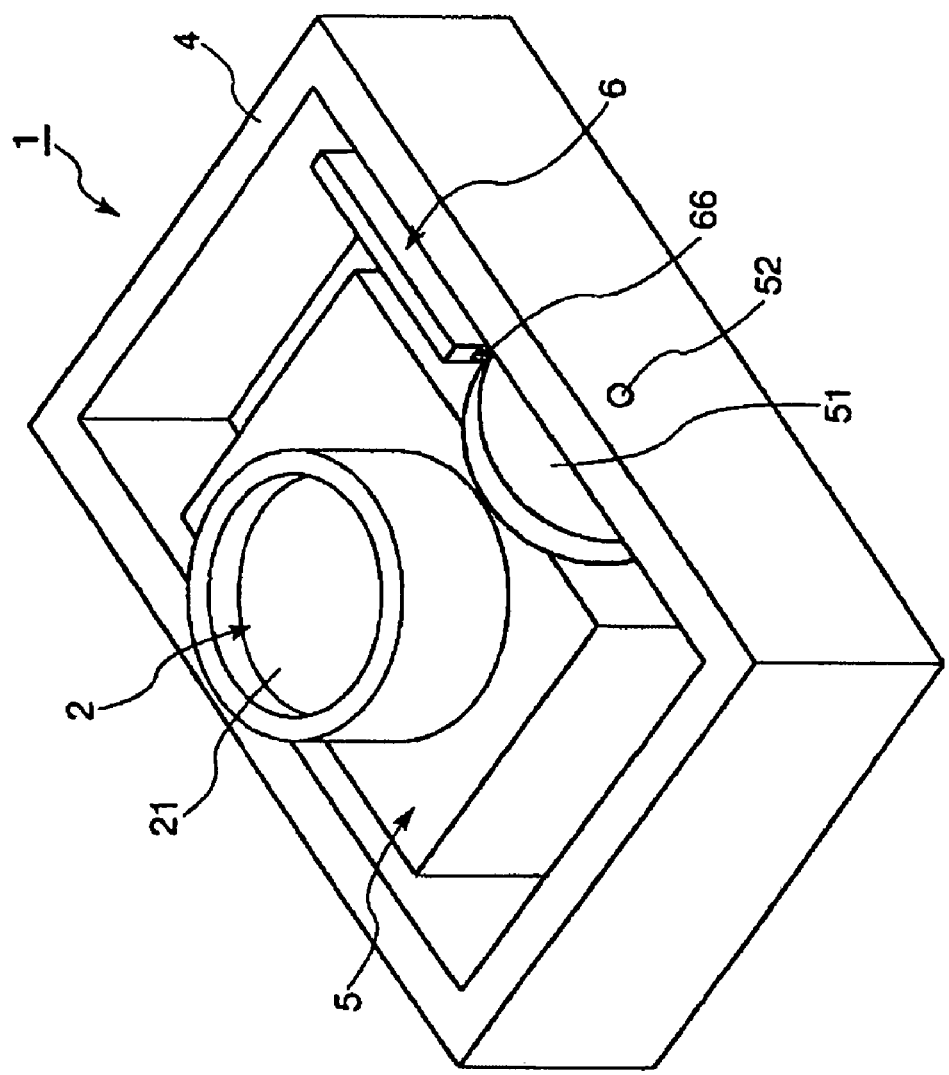
FIG. 1 is a perspective view illustrating an operating apparatus in a first embodiment according to the present invention.
Figure 2:
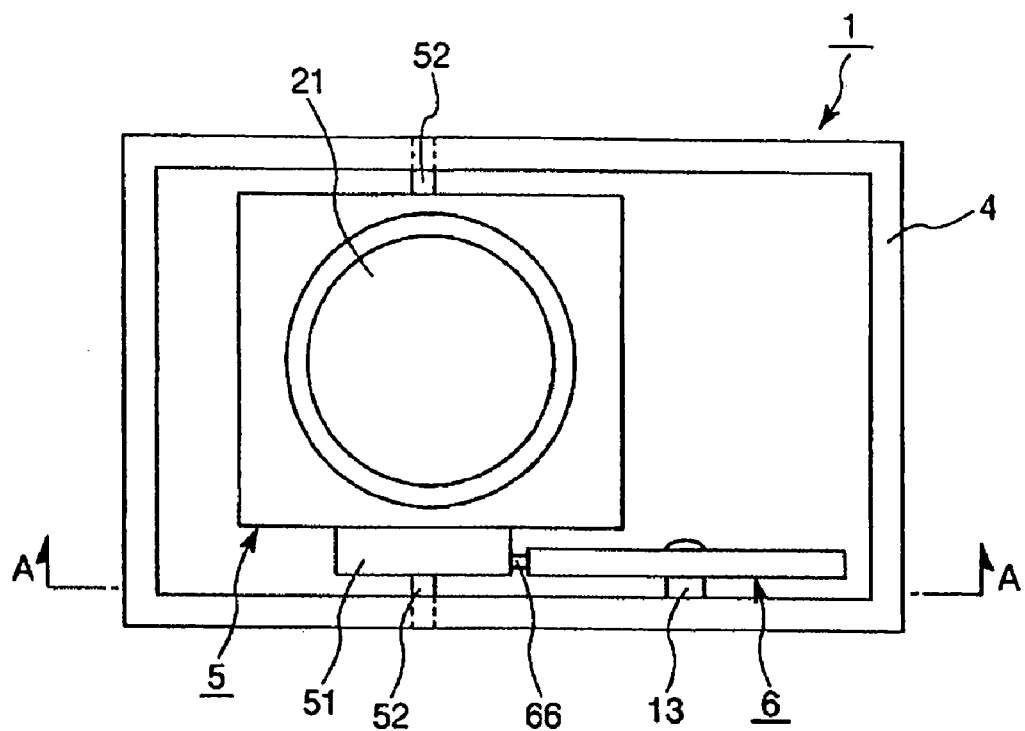
FIG. 2 is a plan view illustrating the operating apparatus shown in FIG. 1.
Figure 3:
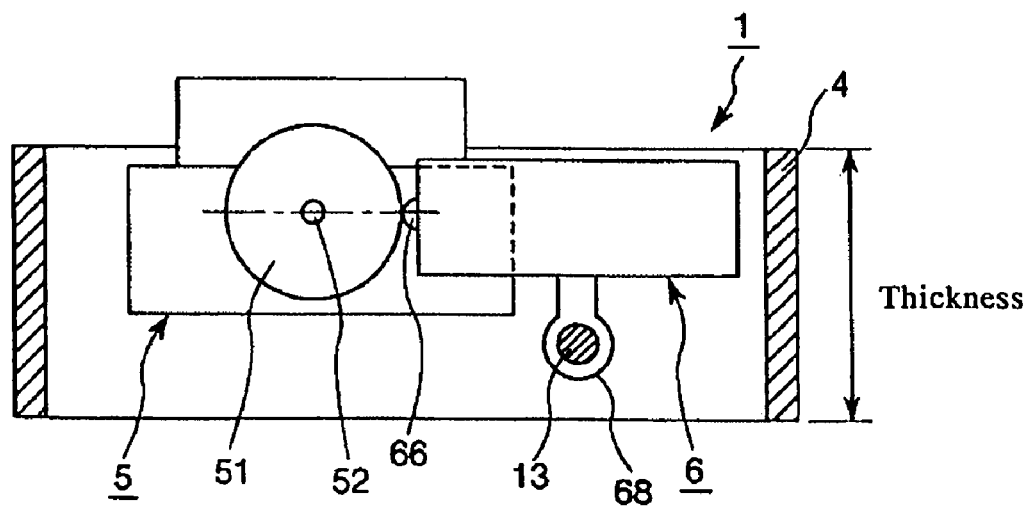
FIG. 3 is a cross-sectional view taken along line B—B of the operating apparatus shown in FIG. 2.
Figure 4:
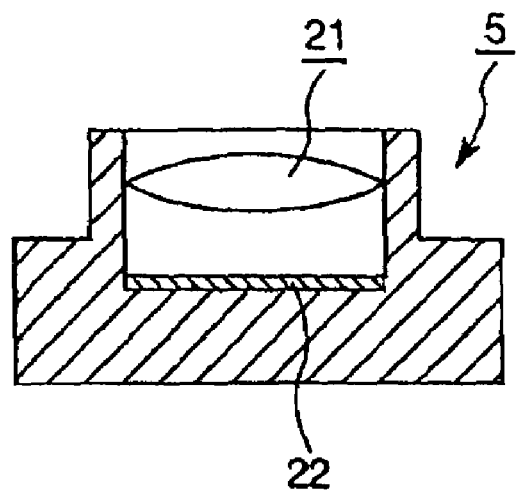
FIG. 4 is a cross-sectional view illustrating an optical system and a driven element shown in FIG. 1.

FIG. 1 is a perspective view illustrating an operating apparatus in a first embodiment according to the present invention. FIG. 2 is a plan view illustrating the operating apparatus shown in FIG. 1. FIG. 3 is a cross-sectional view taken along line B—B of the operating apparatus shown in FIG. 2. FIG. 4 is a cross-sectional view illustrating the optical system and the driven element shown in FIG. 1. The operating apparatus 1 includes an optical system 2, a frame 4, a driven element 5, and a vibrating element 6. The optical system 2 includes a lens 21 and an imaging element (solid imaging element) 22, and serves as an imaging section of the operating apparatus 1. In this regard, the lens 21 may be a pinhole, for example. Further, the imaging element 22 is an image sensor or a charge-coupled device (CCD), for example. The frame 4 is formed from a box frame-shaped member. The operating apparatus 1 is fixedly mounted at a predetermined position of a cradle, a wall surface or the like (not shown in the drawings) through the frame 4.

The driven element 5 has a box-type structure (box portion), and a cylinder portion is mounted on a top surface of the box portion (see FIGS. 1–4). The lens 21 is arranged in the cylinder portion, and the imaging element 22 is arranged in the box portion. Thus, the driven element 5 serves as an imaging means of the operating apparatus 1 (imaging unit). The driven element 5 is provided with shafts 52, 52 that respectively protrude from both side surfaces of the box portion. The driven element 5 is received inside the frame 4, and rotatably supported in the frame 4 through the shafts 52, 52. Further, the driven element 5 has a cylinder-shaped contacted element (rotor) 51 on a side surface of the box portion. The contacted element 51 is provided on the same axis as the rotational axis of the driven element 5. In this regard, it should be noted that a shape of the driven element 5 is not limited to the shape thereof in the first embodiment, and it may be changed its design in response to the function of the operating apparatus 1. Moreover, the driven element 5 has an IC chip for data processing (not shown in the drawings) within the box portion.

The vibrating element 6 has a substantially rectangular and thin plate-shaped structure, and is provided with an arm portion 68 at a side portion of one long side thereof. The vibrating element 6 is arranged at a state where it is floating in the air on an inner wall surface of the longitudinal direction of the frame 4 so that a major surface of the vibrating element 6 is substantially parallel to the inner wall surface of the frame 4 (see FIG. 2). In this case, the contacted element 51 and the vibrating element 6 are arranged in a substantially same plane. The vibrating element 6 is arranged so as to direct a longitudinal direction thereof toward an inner wall surface of the width direction of the frame 4. The contacted element 51 is arranged on an extension of the longitudinal direction of the vibrating element 6. Further, the vibrating element 6 is fixedly mounted on the inner wall surface of the longitudinal direction of the frame 4 via the arm portion 68 and a bolt 13. The vibrating element 6 has a contact portion 66 on a side portion of one short side thereof. The contact portion 66 of the vibrating element 6 is in contact with a circumferential surface of the contacted element 51. In other words, a tip of the contact portion 66 of the vibrating element 6 abuts on the circumferential surface of the contacted element 51 in a radial direction thereof. At this time, the contact portion 66 of the vibrating element 6 resiliently biases toward the side surface of the contacted element 51 by means of elasticity of the arm portion 68 and the bolt 13. This makes it possible to obtain enough frictional force at the contact surface between the contact portion 66 and the contacted element 51. Therefore, vibration of the vibrating element 6 is surely transmitted to the contacted element 51. The vibrating element 6 is connected to an outer conducting circuit (not shown, but described later) for controlling the drive of the vibrating element 6. The vibrating element 6 and the conducting circuit serve as an ultrasonic motor that drives the operating apparatus 1. The constitution and functions of the vibrating element 6 will be described later in detail.

Figure 5:
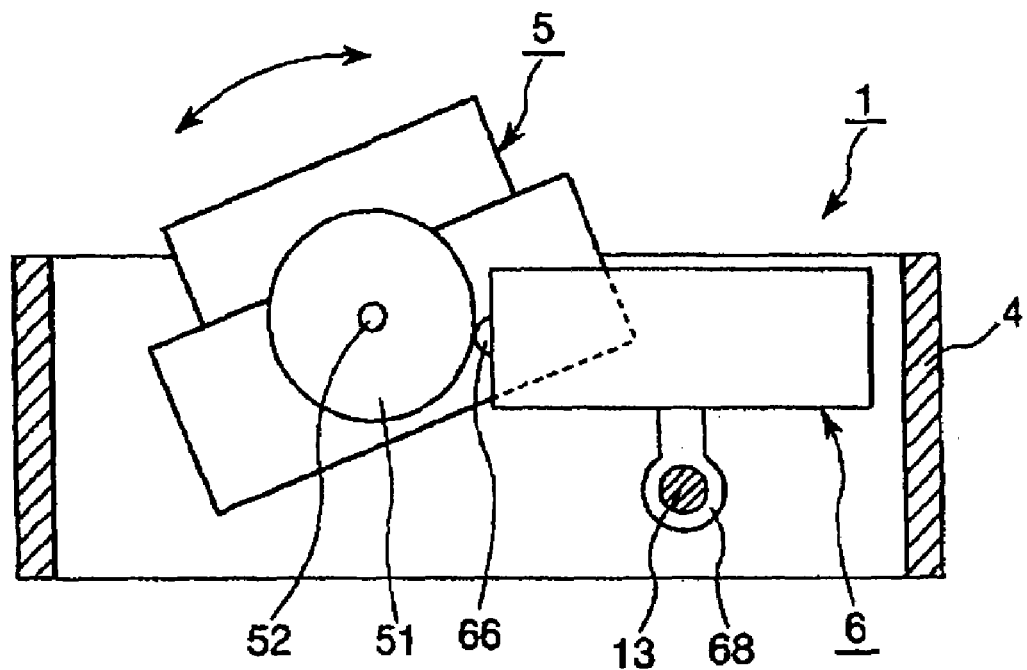
FIG. 5 is an explanatory drawing showing an action of the operating apparatus in the first embodiment.

FIG. 5 is an explanatory drawing showing an action of the operating apparatus in the first embodiment. In this operating apparatus 1, the vibrating element 6 undergoes expansion and contraction at a high speed by application of a high-frequency alternating current from the outer conducting circuit to repeatedly strike the contacted element 51 on the circumferential surface at a high speed by the contact portion 66. Then, the contacted element 51 is rotated by means of frictional contact with the contact portion 66, and the driven element 5 rotatively displaces around the shaft 52 together with the contacted element 51. Thus, an imaging direction of the optical system 2 is changed toward a rotative direction of the driven element 5. In this way, since the direction of the optical system 2 can be arbitrarily changed by the drive of the vibrating element 6 in this operating apparatus 1, it is suitable in particular for an electric instrument that requires a change of the imaging direction thereof. The rotative direction of the driven element 5 can be arbitrarily changed by selecting one of input patterns of the alternating current to the vibrating element 6. Thus, it is possible to rotate the driven element 6 in both forward and reverse directions. In this regard, the drive pattern of the vibrating element 6 will be described later.

According to the operating apparatus 1, since the thin plate-shaped vibrating element 6 is utilized as a drive unit of the driven element 5, it is possible to make the entire apparatus thinner and smaller. Further, since the vibrating element 6 has a plate-shaped structure, it is possible to constitute the drive unit of the driven element 5 (i.e., the vibrating element 6) with a thin and planar structure. Such a planar structure makes it possible to arrange the drive unit at a small gap between the inner wall surface of the frame 4 and the driven element 5 (see FIGS. 1–3).

In the first embodiment, the driven element 5 of the operating apparatus 1 is an imaging device (imaging unit) having an optical system 2 (imaging element 22). Namely, the operating apparatus 1 is an imaging apparatus having the optical system 2 (imaging element 22), and may be applied to an electro-optic instrument such as a monitoring camera, a door camera (camera for monitoring a door), a camera in a mobile phone (cellular phone), a videophone (TV phone), a personal computer with a camera, and the like. In particular, the operating apparatus 1 has an advantage that the posture of the driven element 5 can be controlled with a minute amount of change by means of the vibrating element 6 and a conducting device 20 (described later). Therefore, the operating apparatus 1 is suitable in particular for an electro-optic instrument that requires fine adjustment for focus or the like on imaging, for example. Further, since the operating apparatus 1 utilizes the thin plate-shaped vibrating element 6 as a drive unit, it is possible to make the entire apparatus thinner and smaller. Thus, for example, if the operating apparatus 1 is applied to a monitoring camera, it is possible to enhance flexibility (degree of freedom) of the installing location thereof. In this case, since such a monitoring camera is smaller than a conventional large monitoring camera, it may be obscure. Thus, it is possible to enhance effects of monitoring against crimes carried out away from the installing locations of monitoring cameras. Moreover, in the operating apparatus 1, an imaging direction thereof can be changed by rotating the driven element 5 in a normal or reverse direction. Thus, for example, if the operating apparatus 1 is applied to a door camera, it is possible to take an image of a direction other than the direction toward the front of the door, and to take an image of a small child or the like.

Further, in the first embodiment, the driven element 5 may be changed to one other than the imaging device (imaging unit).

For example, in the first embodiment, the driven element 5 of the operating apparatus 1 may be changed to a device for detecting sound waves (means for collecting sound waves) such as a microphone or the like. Namely, the operating apparatus 1 may be constructed as a sound collector with the device for detecting sound. In particular, the operating apparatus 1 has an advantage that a detecting direction of sound can be arbitrarily changed by means of the drive mechanism of the driven element 5. Therefore, the operating apparatus 1 is suitable in particular for a sound collector that adopts a directional microphone or the like as the device for detecting sound. Further, since the operating apparatus 1 can control the posture of the driven element 5 with a minute amount of change by means of the vibrating element 6 and the conducting device 20 (described later), it is possible to carry out detecting sound more suitably.

Moreover, in the first embodiment, the driven element 5 of the operating apparatus 1 may be changed to a device for adjusting the center of gravity with a weight. Namely, the operating apparatus 1 may be constructed as a mechanism for moving the center of gravity having the device for adjusting the center of gravity. In particular, since the operating apparatus 1 utilizes the thin plate-shaped vibrating element 6 as a drive mechanism for the driven element 5, it is possible to make the entire apparatus thinner and smaller. Therefore, the operating apparatus 1 is suitable for a mechanism for moving the center of gravity that is utilized for posture control of a minute flying object. Further, since the operating apparatus 1 can control the posture of the driven element 5 with a minute amount of change by means of the vibrating element 6 and the conducting device 20 (described later), it is possible to carry out the posture control of the minute flying object more accurately.

Furthermore, in the first embodiment, the driven element 5 of the operating apparatus 1 may be changed to a radio-wave detecting device having a portion for receiving radio waves such as a parabolic antenna, a CS (Communication Satellite) antenna, GPS (Global Positioning System) antenna or the like. Namely, the operating apparatus 1 may be constructed as a radio-wave detecting apparatus with the radio-wave detecting device. In particular, the operating apparatus 1 has an advantage that a detecting direction of radio waves can be arbitrarily changed by means of a drive mechanism of the driven element 5. Therefore, the operating apparatus 1 is suitable in particular for a device for detecting a particular-direction radio wave. Further, since the operating apparatus 1 can control the posture of the driven element 5 with a minute amount of change by means of the vibrating element 6 and the conducting device 20 (described later), it is possible to carry out detecting radio waves more suitably.

Figure 6:
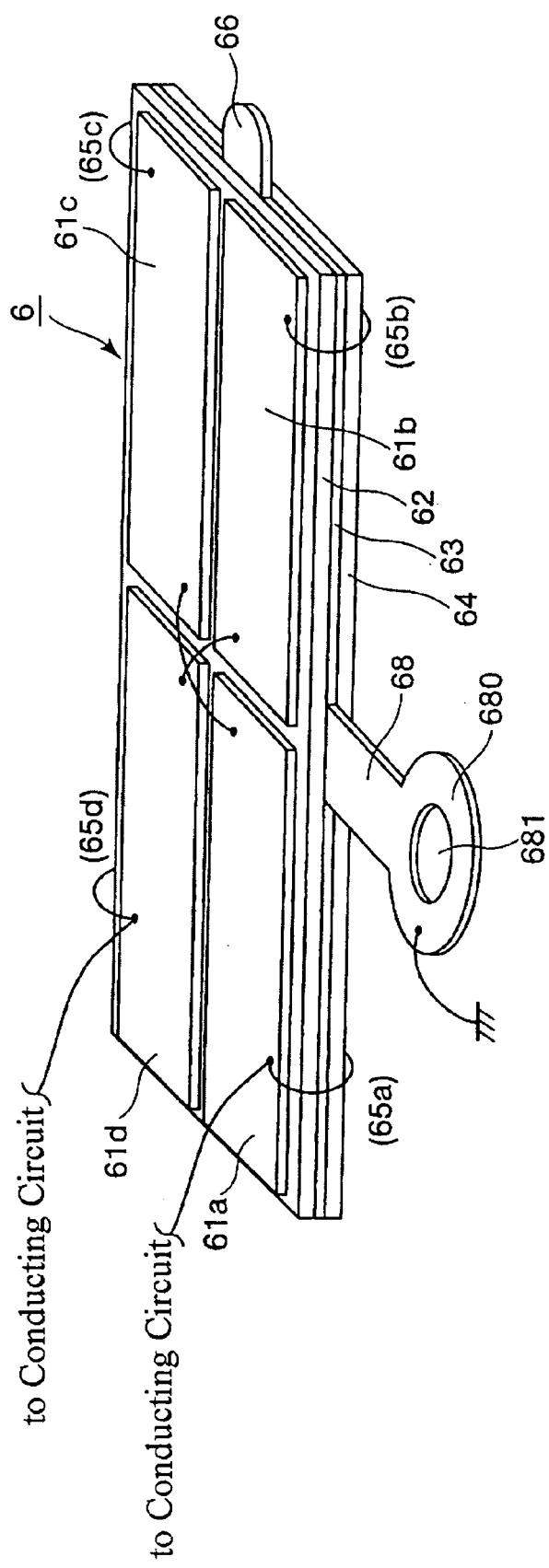
FIG. 6 is a perspective view of the vibrating element shown in FIG. 1.
Figure 7:
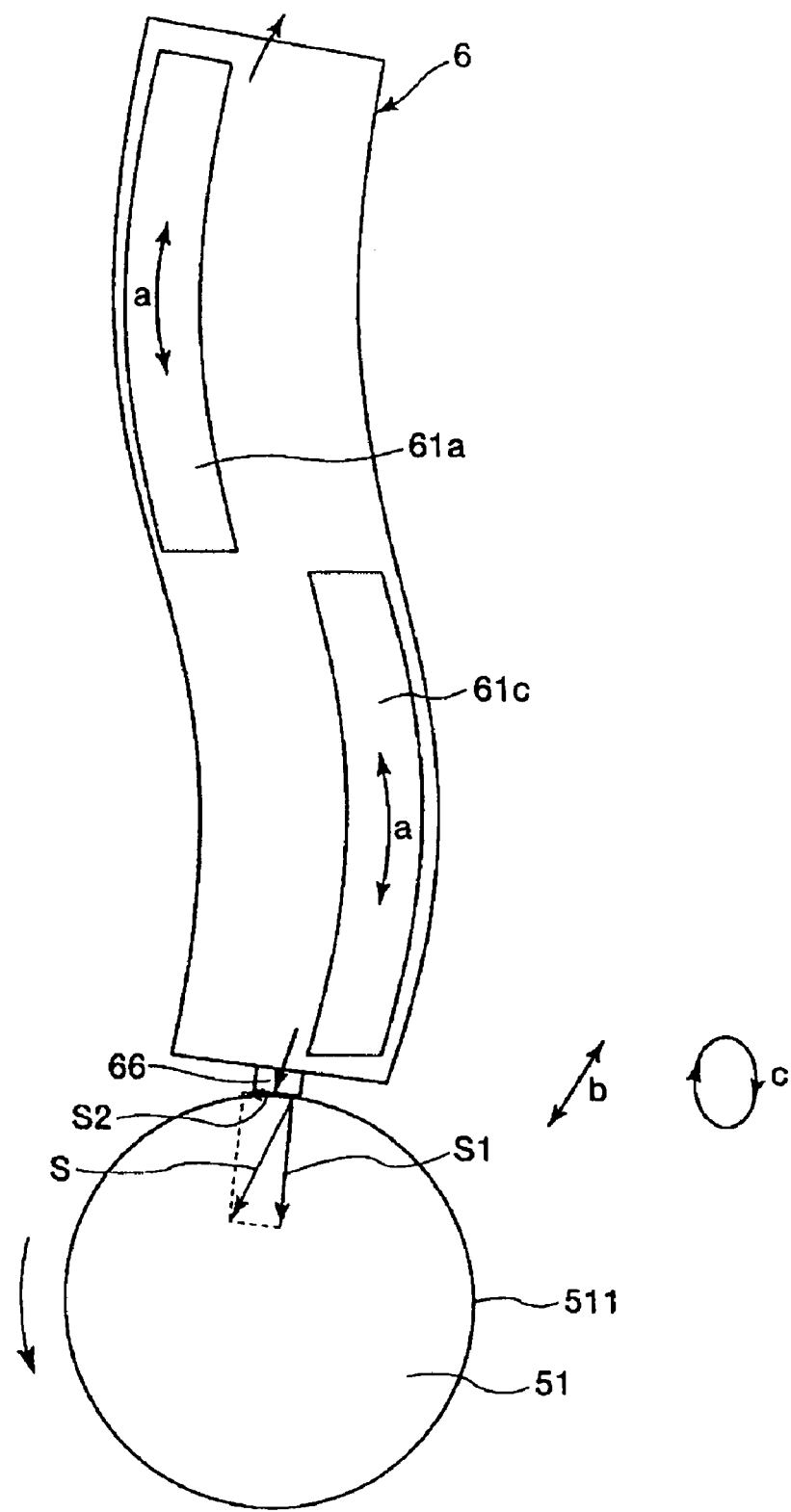
FIG. 7 is an explanatory drawing showing an action of the vibrating element shown in FIG. 6.
Figure 8:
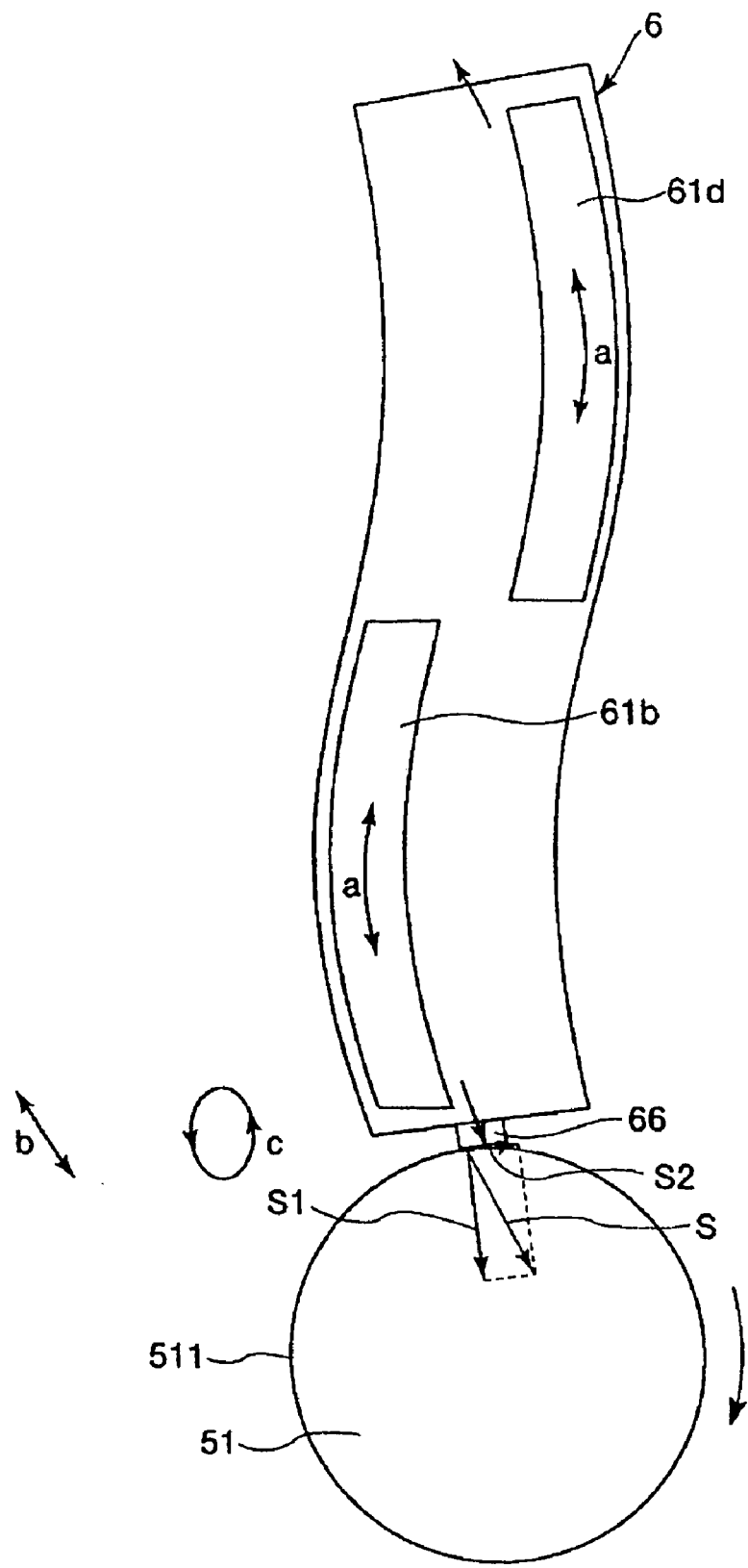
FIG. 8 is an explanatory drawing showing an action of the vibrating element shown in FIG. 6.

FIG. 6 is a perspective view of the vibrating element shown in FIG. 1. FIGS. 7 and 8 are explanatory drawings each showing an action of the vibrating element shown in FIG. 6. The vibrating element 6 is constructed by laminating a piezoelectric element 62, a single reinforcing plate 63, and a piezoelectric element 64 in this order so that the reinforcing plate 63 is arranged centrally and interposes between the pair of piezoelectric elements 62, 64. Further, in the vibrating element 6, electrodes 61*a*–61*d* and electrodes 65*a*–65*d* (These electrodes 65*a*–65*d* are not shown in FIG. 7, but reference numerals of these electrodes are merely designated using parentheses.) are arranged at predetermined positions on the both faces of the vibrating element 6.

The reinforcing plate 63 has a substantially rectangular plate-shaped structure, and a thickness of the reinforcing plate 63 is thinner than that of the each of the piezoelectric elements 62, 64. Thus, there is an advantage that the vibrating element 6 can undergo vibration with high efficiency. Material to constitute the reinforcing plate 63 is not especially limited. However, the material is preferably a kind of metal material such as stainless steel, aluminum or aluminum alloy, titan or titan alloy, and copper or copper system alloy or the like. The reinforcing plate 63 has a function to reinforce the entire vibrating element 6, thereby preventing the vibrating element 6 from being injured due to over-vibration of the vibrating element 6, external force or the like. Further, the reinforcing element 63 has a function as a common electrode for the piezoelectric elements 62, 64 to conduct these piezoelectric elements.

The piezoelectric elements 62, 64 respectively have substantially rectangular plate-shaped structures same as that of the reinforcing plate 63. The piezoelectric elements 62, 64 face each other so as to sandwich the reinforcing plate 63 from the both faces thereof, and are laminated so as to coordinate with these plan positions against the reinforcing plate 63. Further, the piezoelectric elements 62, 64 are fixed to the reinforcing plate 63 to integrate into a single structure. This makes it possible to improve strength of the vibrating element 6. The piezoelectric elements 62, 64 consist of material that can undergo expansion and contraction by applying an AC voltage to the elements 62, 64. Material to constitute the piezoelectric elements 62, 64 is not especially limited. For example, it is possible to use various kinds of materials such as plumbum zirconate titanate (PZT), quartz crystal, lithium niobate, barium titanate, plumbum titanate, plumbum metaniobate, polyvinylidene fluoride, zinc plumbum niobate, scandium plumbum niobate, and the like.

The electrodes 61*a*–61*d* and 65*a*–65*d* are made from rectangle-shaped metal members, and arranged at predetermined positions on the piezoelectric elements 62, 64, respectively. In this case, these electrodes have a length substantially half of the long side of the piezoelectric elements, and are arranged so that two of the electrodes are aligned in their longitudinal direction along the end portion of the long side on each of the piezoelectric elements 62, 64. Thus, the electrodes 61*a*–61*d*, 65*a*–65*d* are respectively arranged on the piezoelectric elements 62, 64, and respectively positioned symmetrical to both centerlines of the longitudinal and width directions on the piezoelectric elements 62, 64 (see FIG. 6).

In this regard, the electrodes 61*a*–61*d* and 65*a*–65*d* are respectively arranged on the both faces of the vibrating element 6 so as to face each other. Reference numerals designated using parentheses in FIG. 6 indicate the electrodes 65*a*–65*d* facing to the electrodes 61*a*–61*d* against the vibrating element 6 each other. The electrodes 61*a*, 61*c* lying at one diagonal line in a front face on the piezoelectric element 62 are electrically connected to the electrodes 65*a*, 65*c* lying at a corresponding diagonal line in the back face on the piezoelectric element 64, and these electrodes 61*a*, 61*c*, 65*a*, and 65*c* are connected to the outer conducting circuit. In a same way, the electrodes 61b, 61d lying at the other diagonal line in the front face on the piezoelectric element 62 are electrically connected to the electrode 65b, 65d lying at a corresponding diagonal line in the back face on the piezoelectric element 64, and these electrodes 61b, 61d, 65b, and 65d are connected to the outer conducting circuit. In this way, the electrodes 61a–61d and 65a–65d are conducted as these combinations by application of the voltage from the conducting circuit. In this regard, to conduct the electrodes in either combination can be arbitrarily selected based on the constitution of the conducting circuit described later.

Further, the vibrating element 6 has the contact portion 66 at the center of one short side, i.e., the center of the tip portion in the longitudinal direction. The contact portion 66 is integrally formed from a single member with respect to the reinforcing plate (vibrating plate) 63. Namely, in this embodiment, the contact portion 66 is formed as a protruding portion that protrudes from a part of the short side of the vibrating element 6. Thus, there is an advantage that the contact portion 66 can be placed on the vibrating element 6 tightly. In particular, the contact portion 66 repeatedly strikes on the contacted element 51 with high pushing force (suppress strength) at a high speed by means of the vibration of the vibrating element 6 during the operation of the operating apparatus 1. Therefore, this structure makes it possible to ruggedize (improve endurance of) the contact portion 66. The contact portion 66 has a semicircular (arched) tip portion (see FIG. 6). The contact portion 66 can stably come into frictional contact with the side surface of the contacted element 51 in comparison with the case where the contact portion 66 has a square-shaped tip portion. Thus, there is an advantage that the pushing force from the vibrating element 6 can be transmitted to the contacted element 51 surely in the case where the direction of application of the vibrating element 6 is out of alignment more or less.

Further, the vibrating element 6 has the arm portion 68 protruding substantially perpendicular to the long side thereof at the center of one long side, i.e., the center of the side surface in the longitudinal direction. The arm portion 68 is integrally formed from a single member to the reinforcing plate 63. Thus, there is an advantage that the arm portion 68 can be placed on the vibrating element 6 tightly. The vibrating element 6 is fixedly arranged to the frame 4 by means of the bolt 13 so that the bolt 13 is inserted through the aperture 681 provided on the tip portion of the arm portion 68. The vibrating element 6 is provided (supported) in a floating condition in the air with respect to an inner wall surface of the frame 4 by means of the arm portion 68 (see FIG. 2). Since there is no friction between the vibrating element 6 and the frame 4 in this structure, it is hard to restrict the vibration of the vibrating element 6, whereby there is an advantage that the vibrating element 6 can realize unlimited vibration. Further, since the reinforcing plate 63 is made from metal material, the arm portion 68 has elasticity. The vibrating element 6 is supported by means of the arm portion 68 at the condition where the contact portion 66 is biased to the side surface of the contacted element 51 due to the elasticity. Moreover, the reinforcing plate 63 of the vibrating element 6 is connected to ground via the arm portion 68.

Here, an arm portion 68 is arranged at a position of a vibrational node of the vibrating element 6 on the side surface of the vibrating element 6. The point of the vibrational node may be appropriately determined within an obvious scope of one skilled in the art using known methods such as vibration analysis. For example, in a case where the electrodes 61a–61d and the electrodes 65a–65d are symmetrically arranged in the longitudinal direction and the width direction of the vibrating element 6 as the operating apparatus 1, the vibrational node may be located at substantial center of the longitudinal direction of the vibrating element 6. Therefore, the arm portion 68 is provided at the substantial center of the long side of the vibrating element 6 in the operating apparatus 1. In this case, since the arm portion 68 does not prevent the vibration of the vibrating element 6, it is possible to reduce vibration leakage (extinction of the vibrational energy) from the arm portion 68 to an external portion. This makes it possible to efficiently rotate (drive) the contacted element 51.

FIGS. 7 and 8 are explanatory drawings each showing an action of the vibrating element shown in FIG. 6. FIG. 7 shows a case where the contacted element 51 rotates in a counterclockwise direction in the drawing (the driven element 5 rotates in a clockwise direction in this embodiment), while FIG. 8 shows a case where the contacted element 51 rotates in a direction reverse to the direction shown in FIG. 7 (i.e., in a clockwise direction) (the driven element 5 rotates in a counterclockwise direction in this embodiment).

In a condition shown in FIG. 7, first, an AC voltage is applied to the vibrating element 6 from an outer conducting circuit (not shown). Then, the electrodes 61a, 61c, 65a, and 65c lying at one diagonal line on both faces of the vibrating element 6 are conducted, whereby the AC voltage is applied between these electrodes and the reinforcing plate 63. The portions where these electrodes are provided on the piezoelectric elements 62, 64 repeatedly undergo expansion and contraction at a high speed. In this case, as shown in FIG. 8, the portions corresponding to the electrodes 61a, 61c, 65a, and 65c respectively repeatedly undergo extension and contraction in a direction represented by arrows a. Thus, as a whole, the vibrating element 6 undergoes micro vibration bending as a substantial S shape. By this vibration, the contact portion 66 of the vibrating element 6 undergoes vibration (reciprocates) in a slanting direction represented by an arrow b, or the contact portion 66 is displaced along a substantially elliptic shape, i.e., vibrates (moves) in an elliptical manner as represented by an arrow c. The contacted element 51 receives frictional force (or pushing force) from the contact portion 66 by this movement. In other words, great frictional force is provided between the contact portion 66 and the outer circumferential surface 511 by a component S1 corresponding to the radial direction of an vibrating displacement S of the contact portion 66 (displacement in a radial direction of the contacted element 51), and further turning force generated in the counterclockwise direction in FIG. 7 is provided to the contacted element 51 by a component S2 corresponding to circumferential direction of the vibrating displacement S (displacement in a circumferential direction of the contacted element 51). The contacted element 51 rotates in the counterclockwise direction by repeatedly receiving the pushing force from the contact portion 66 at a high speed.

On the other hand, in a condition shown in FIG. 8, the electrodes 61b, 61d, 65b, and 65d are conducted. These electrodes are conducted symmetrical to the condition shown in FIG. 7. Then, the vibrating element 6 undergoes vibration symmetrical to the condition shown in FIG. 7, whereby the contacted element 51 rotates in the clockwise direction in the drawing by receiving the pushing force from the contact portion 66. In this way, in the operating apparatus 1, there is an advantage that the contacted element 51 can rotate (be driven) in either the clockwise direction or the counterclockwise direction by selecting a conducting pattern. In this regard, in the condition shown in FIG. 8, the electrodes 61a, 61c, 65a, and 65c to which a power is not applied (not activated) constitute vibration detecting means for detecting the vibration of the vibrating element 6.

Figure 9:
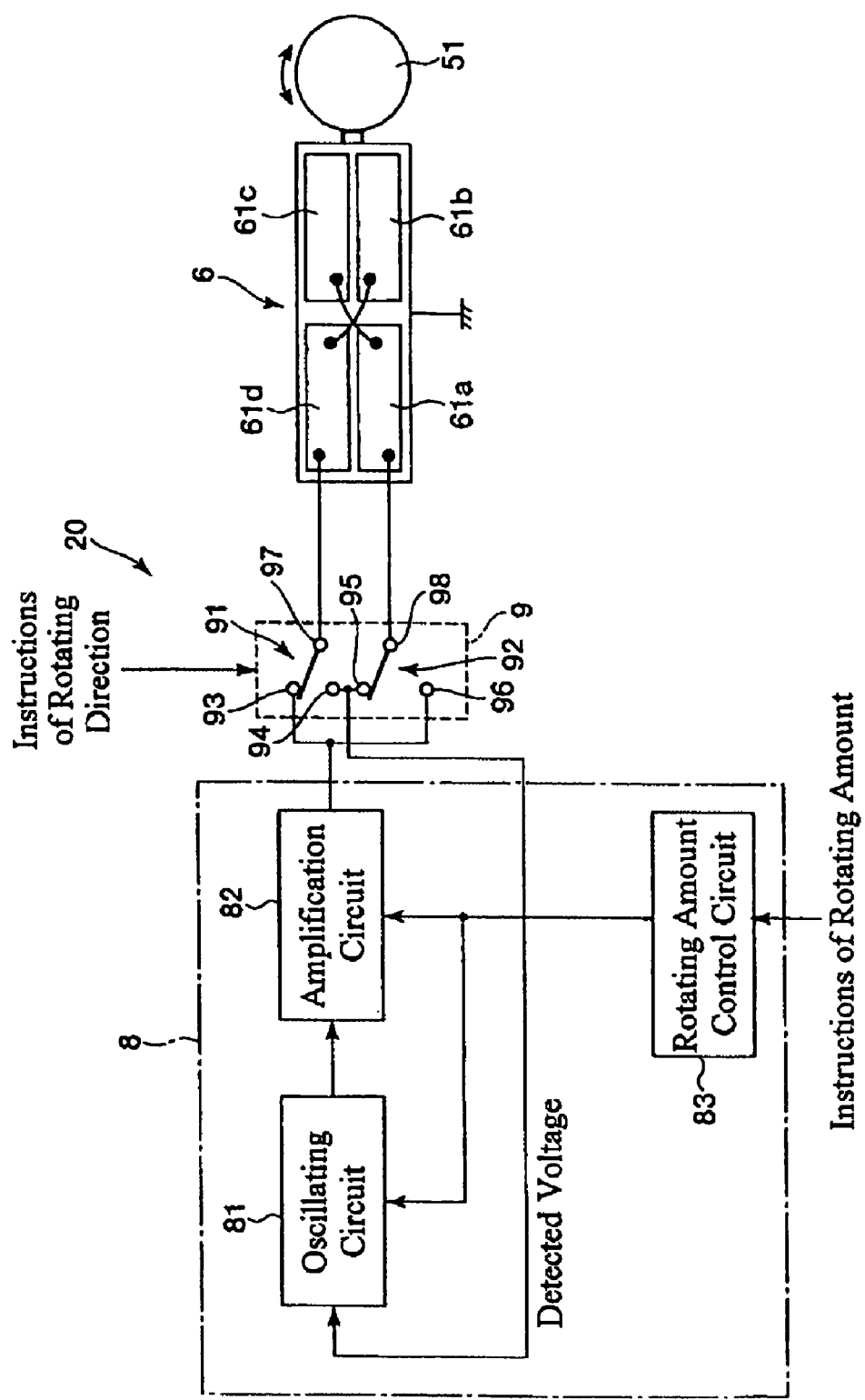
FIG. 9 is a block diagram illustrating a conducting circuit of the vibrating element.

FIG. 9 is a block diagram illustrating a conducting circuit of the vibrating element described in FIGS. 1–8. As shown in FIG. 9, the conducting circuit 20 is provided with a drive circuit 8 and a switch 9. The conducting circuit 20 applies an AC voltage to the vibrating element 6 to drive the vibrating element 6. Further, the conducting circuit 20 has a function for switching vibrating modes of the vibrating element 6 by selecting the conducting pattern, and a function for feedback controlling the vibration of the vibrating element 6 by detecting the voltage value of the vibrating element 6.

The drive circuit 8 includes an oscillating circuit 81, an amplification circuit 82, and a rotating amount control circuit 83. In the drive circuit 8, the oscillating circuit 81 generates an AC voltage to be outputted to the amplification circuit 82, and the amplification circuit 82 amplifies the AC voltage to apply the amplified AC voltage to the vibrating element 6. The rotating amount control circuit 83 controls both the oscillating circuit 81 and the amplification circuit 82, and adjusts the AC voltage applied to the vibrating element 6 so that the rotating amount of the contacted element 51 becomes a target value instructed.

The switch 9 switches between conducting electrodes to which the AC voltage is applied and electrodes to be used as vibration detecting means, thereby switching a rotative direction of the contacted element 51. The switch 9 has two switching sections 91, 92 that operate simultaneously with each other. The electrode 61d of the vibrating element 6 is connected to a terminal 97 of the switching section 91. The electrode 61a is connected to a terminal 98 of the switching section 92. Further, a terminal 93 of the switching section 91 and a terminal 96 of the switching section 92, each is connected to an output side of the amplification circuit 82 of the drive circuit 8, and an AC voltage from the amplification circuit 82 is applied to the vibrating element 6 via each of the terminals 93, 96. Moreover, a terminal 94 of the switching section 91 and a terminal 95 of the switching section 92, each is connected to an input side of the oscillating circuit 81 of the drive circuit 8.

Next, an operation of the operating apparatus 1 will be described with reference to FIG. 10.

First, instructions regarding the rotative direction and the rotating contacted element 51 are inputted to the rotating amount control circuit 83 in the conducting circuit 20 when the contacted element 51 is driven (rotated). In a case of the instructions that the contacted element 51 is rotated in the counterclockwise direction in FIG. 9 (in a forward direction), the switch 9 is switched so that the terminal 94 of the switching portion 91 is connected to the terminal 97, and that the terminal 96 of the switching portion 92 is connected to the terminal 98. Thus, the output side of the amplification circuit 82 of the drive circuit 8 is conducted to the electrodes 61a, 61c, 65a, and 65c of the vibrating element 6. When an AC voltage is applied to the piezoelectric elements 62, 64 of the vibrating element 6, the vibrating element 6 undergoes longitudinal vibration and bending vibration, whereby the contact portion 66 strikes on the outer circumferential surface 511 of the contacted element 51 so that the contacted element 51 rotates in the counterclockwise direction in FIG. 9.

Further, in this condition, the electrodes 61b, 61d, 65b, and 65d of the vibrating element 6 are conducted to the input side of the oscillating circuit 81 of the drive circuit 8. These electrodes constitute detecting electrodes during driven of the vibrating element 6, which are used for detecting a voltage to be induced between the reinforcing plate 63 and each of the electrodes 61b, 61d, 65b, and 65d (i.e., induced voltage). Based on the detected voltage, the oscillating circuit 81 outputs an AC voltage having a frequency (resonant frequency) at which amplitude of the vibrating element 6 becomes maximum, i.e., the detected voltage becomes maximum. Thus, there is an advantage that the contacted element 51 can be rotated efficiently. Further, the rotating amount control circuit 83 operates (controls) the oscillating circuit 81 and the amplification circuit 82 until the rotating amount of the contacted element 51 becomes the target value instructed, thereby driving the vibrating element 6 to rotate the contacted element 51.

On the other hand, in a case of the instructions that the contacted element 51 is rotated in a clockwise direction in FIG. 9 (in a reverse direction), the switch 9 is switched so that the terminal 93 of the switching portion 91 is connected to the terminal 97, and that the terminal 95 of the switching portion 92 is connected to the terminal 98. Thus, the output side of the amplification circuit 82 of the drive circuit 8 is conducted to the electrodes 61b, 61d, 65b, and 65d of the vibrating element 6. When an AC voltage is applied to the piezoelectric elements 62, 64 of the vibrating element 6, the vibrating element 6 undergoes longitudinal vibration and bending vibration, whereby the contact portion 66 strikes on the contacted element 51 so that the contacted element 51 rotates in the clockwise direction in FIG. 9. Further, in this condition, the electrodes 61a, 61c, 65a, and 65c of the vibrating element 6 are conducted to the input side of the oscillating circuit 81 of the drive circuit 8. These electrodes function as detecting electrodes during driven of the vibrating element 6. Explanation of following operations will be omitted, because the following operations are the same as the operations in the case of the instructions for rotating the contacted element 51 in the counterclockwise direction in FIG. 9.

According to the operating apparatus 1, since the vibrating element 6 has a thinner plate-shaped structure, it is possible to make the entire apparatus 1 thinner and to miniaturize the entire apparatus 1. In particular, in the electro-optic instrument field, since there are a great number of requests that such an apparatus is made thinner and miniaturized recently, one skilled in the art tends to spend a large amount of development costs on this point. Therefore, the operating apparatus 1 in which a drive member is constituted from the vibrating element 6 comes in very useful. Further, since the vibrating element 6 drives the contacted element 51 by means of the frictional force (pushing force), it is possible to obtain high drive torque and high efficiency in comparison with the motor driven by magnetic force. Therefore, there is an advantage that the contacted element 51 can be driven with enough force without a converting mechanism (decelerating mechanism).

Further, according to the operating apparatus 1, since electromagnetic noise of the vibrating element 6 is extremely smaller than that of the motor driven by the magnetic force, it is possible to reduce effects against peripheral equipments due to the electromagnetic noise. Moreover, since there is no need for a converting mechanism, it is possible to lower (reduce) energy loss. In addition, since the contacted element 51 is directly driven by the vibrating element 6 and therefore there is no need for a decelerating mechanism, it is possible to make the apparatus lighter and thinner, and to miniaturize the apparatus. Thus, since the structure of the apparatus can be simplified extremely and the apparatuses can be easily manufactured, there is an advantage the manufacturing cost can be reduced.

Furthermore, according to the operating apparatus 1, since in-plan vibration of the vibrating element 6 can be converted to rotation of the contacted element 51, it is possible to reduce energy loss caused by this conversion and to obtain high drive efficiency. Further, the contact portion 66 of the vibrating element 6 biases to the contacted element 51 with a frictional contact condition while the contacted element 51 is in a stopping state, it is possible to prevent the rotation of the contacted element 51 and to hold the contacted element 51 at a stopping position stably. Moreover, since the contacted element 51 can be alternatively rotated in the forward and reverse directions using a signal vibrating element 6, a number of components of the operating apparatus 1 can be reduced in comparison with a case where two dedicated vibrating elements are respectively provided for the moving (driving) directions.

In this regard, the operating apparatus 1 in this embodiment is constructed so that the driven element 5 rotatively displaces (rotates) around one axis (i.e., the shaft 52), but the present invention is not limited to this structure. For example, the operating apparatus 1 may be constructed so that the driven element 5 rotatively displaces (rotates) around two axes whose directions are different from each other, in particular, around two axes that mutually cross at right angles. An operating apparatus 1 in each of embodiments described later may be constructed in the similar manner as in the first embodiment.

(Second Embodiment)

Next, a description will be given for a second embodiment of the operating apparatus 1.

Figure 10:
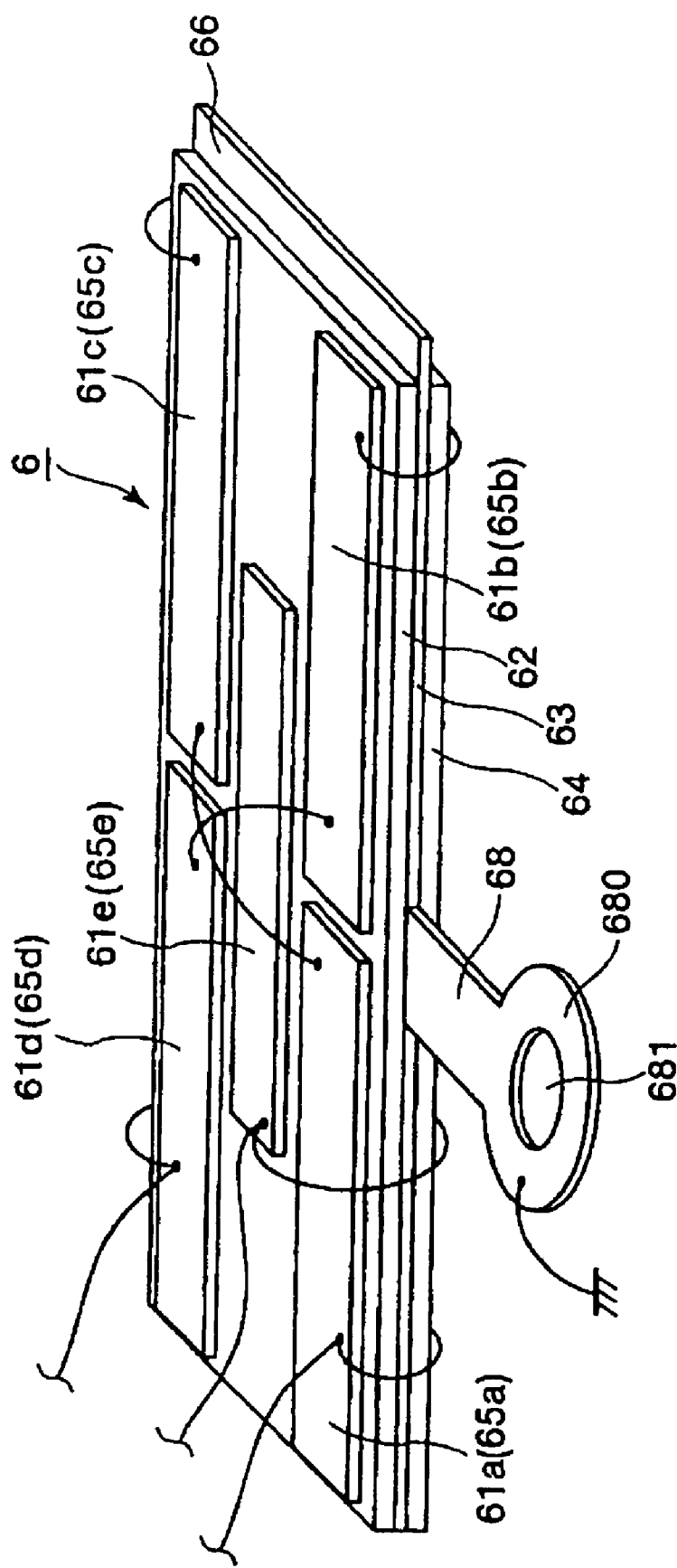
FIG. 10 is a perspective view of a vibrating element of an operating apparatus in a second embodiment according to the present invention.
Figure 11:
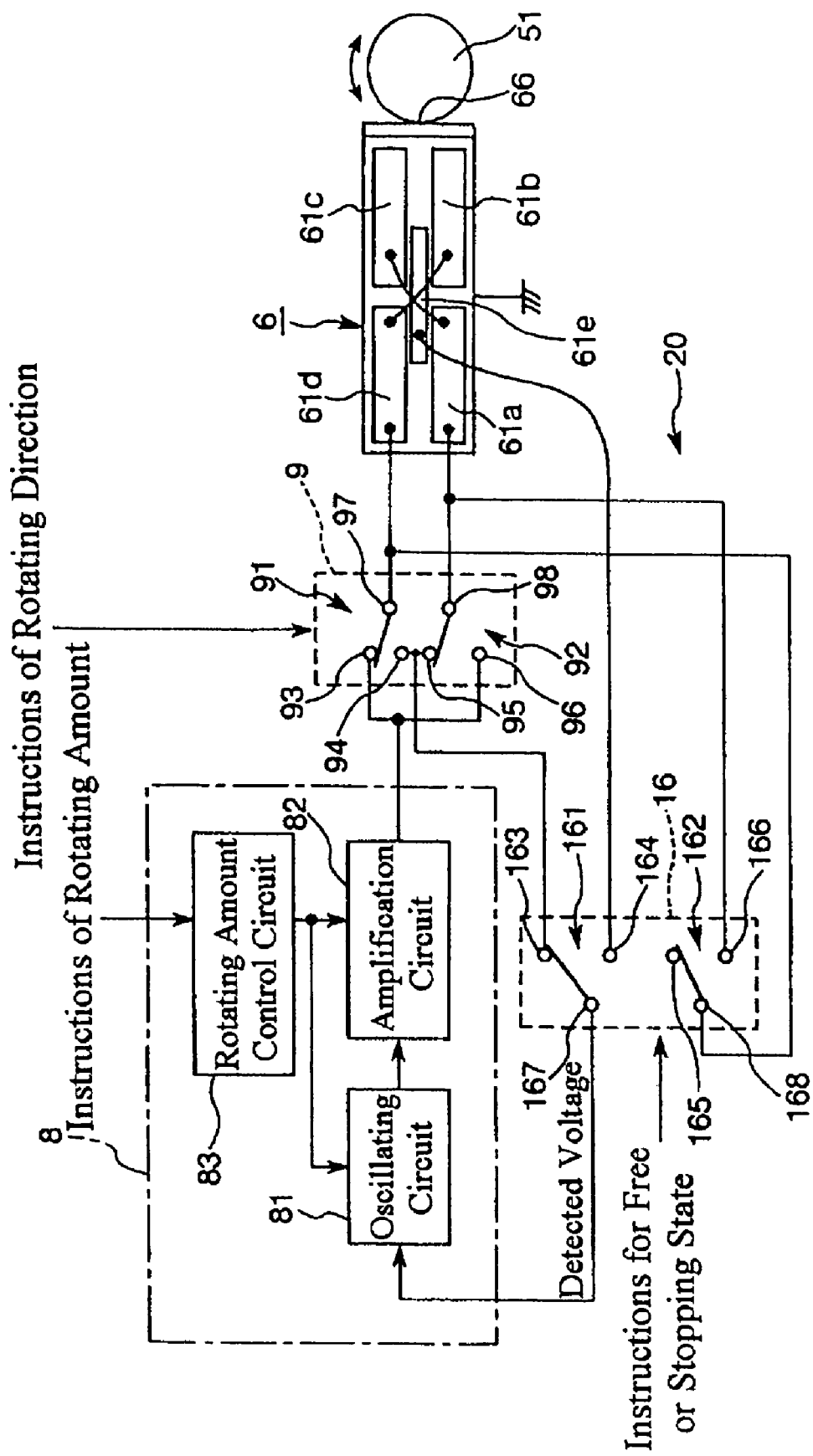
FIG. 11 is a block diagram illustrating circuitry of the operating apparatus in the second embodiment according to the present invention.

FIG. 10 is a perspective view of a vibrating element of an operating apparatus in the second embodiment according to the present invention. FIG. 11 is a block diagram illustrating circuitry of the operating apparatus in the second embodiment according to the present invention.

Hereinafter, the operating apparatus 1 in the second embodiment will be described, focusing on different points between the above-mentioned first embodiment and the second embodiment. In this regard, explanation of items including the same matters and the like is omitted.

The operating apparatus 1 in the second embodiment has four modes including a first mode in which a contacted element 51 is maintained in a stopping state; a second mode in which the contacted element 51 can be rotated (displaced) (i.e., the contacted element 51 lies in a free state); a third mode in which the contacted element 51 is rotated in a forward direction; and a fourth mode in which the contacted element 51 is rotated in a reverse direction. The operating apparatus 1 is adapted to select one of the first, second, third, and fourth modes by selecting any of conducting patterns to each of electrodes to change a vibrating pattern of a vibrating element 6. Hereinafter, more specific explanations will be given as follows.

As shown in FIG. 10, in the vibrating element 6, five plate-shaped electrodes 61*a*, 61*b*, 61*c*, 61*d*, and 61*e* are disposed at the upper side of a piezoelectric element 62 in FIG. 10, while five plate-shaped electrodes 65*a*, 65*b*, 65*c*, 65*d*, and 65*e* are disposed at the lower side of a piezoelectric element 64 in FIG. 10. (The electrodes 65*a*, 65*b*, 65*c*, 65*d*, and 65*e* are not shown in FIG. 10, but reference numerals of these electrodes are merely designated using parentheses.)

In other words, the piezoelectric element 62 is substantially equally divided (partitioned) into four rectangular areas. The rectangular electrodes 61*a*, 61*b*, 61*c*, and 61*d* are respectively disposed at the divided areas. In a same way, the piezoelectric element 64 is divided (partitioned) into four rectangular areas. The rectangular electrodes 65*a*, 65*b*, 65*c*, and 65*d* are respectively disposed at the divided areas.

Further, the rectangular electrode 61*e* is disposed at a central portion of the piezoelectric element 62, while the rectangular electrode 65*e* is disposed at a central portion of the piezoelectric element 64. The longitudinal direction of each of the electrodes 61*e*, 65*e* substantially corresponds with that (the long side direction) of the vibrating element 6. The electrodes 61*e* and 65*e* are detecting electrodes that are used for detecting a voltage to be induced between a reinforcing plate 63 and each of electrodes 61*e*, 65*e*, i.e., a voltage to be induced (an induced voltage) in response to a component in a longitudinal direction of the vibration of the vibrating element 6 (i.e., a component of the longitudinal vibration). Further, the electrodes 61*e*, 65*e* are used at the second mode.

In this case, the electrodes 65*a*, 65*b*, 65*c*, 65*d*, and 65*e* are disposed at the back faces of the electrodes 61*a*, 61*b*, 61*c*, 61*d*, and 61*e*, respectively.

The electrodes 61*a*, 61*c* lying at one diagonal line in a front face are electrically connected to the electrodes 65*a*, 65*c* lying at a corresponding diagonal line in a back face. In a same way, the electrodes 61*b*, 61*d* lying at the other diagonal line in the front face are electrically connected to the electrode 65*b*, 65*d* lying at a corresponding diagonal line in the back face. (Hereinafter, to "electrically connected" is merely referred to as "connected.")

As shown in FIG. 11, the conducting circuit 20 of the operating apparatus 1 in the second embodiment has: a switch 9; a switch 16; and a drive circuit 8 provided with an oscillating circuit 81, an amplification circuit 82, and a rotating amount control circuit 83.

The switch 9 is switching means for switching between conducting electrodes and electrodes to be used as vibration detecting means. When the switch 9 is switched, a rotative direction of the contacted element 51 can be changed.

The switch 9 has two switching sections 91, 92 that operate simultaneously with each other. The electrode 61*d* of the vibrating element 6 is connected to a terminal 97 of the switching section 91. The electrode 61*a* is connected to a terminal 98 of the switching section 92.

Further, each of a terminal 93 of the switching section 91 and a terminal 96 of the switching section 92 is connected to an output side of the amplification circuit 82 in the drive circuit 8. An AC voltage is applied from the amplification circuit 82 to each of the terminals 93, 96.

The reinforcing plate 63 of the vibrating element 6 is connected to ground.

Further, each of a terminal 94 of the switching section 91 and a terminal 95 of the switching section 92 is connected to an input side of the oscillating circuit 81 in the drive circuit 8.

The switch 16 has two switching sections 161, 162 that operate simultaneously with each other.

A terminal 163 of the switching portion 161 is connected to the terminals 94, 95 of the switch 9. A terminal 164 of the switching portion 161 is connected to the electrode 61*e* of the vibrating element 6.

Further, a terminal 167 of the switching portion 161 is connected to the input side of the oscillating circuit 81 in the drive circuit 8.

A terminal 166 of the switching portion 162 is connected to the terminal 98 of the switch 9 and the electrode 61*a* of the vibrating element 6. A terminal 168 of the switching portion 162 is connected to the terminal 97 of the switch 9 and the electrode 61*d* of the vibrating element 6.

In this regard, explanation of the drive circuit 8 will be omitted because it is the same as one in the first embodiment described above.

Next, each of the above-mentioned modes will be described.

In the first mode, there does not occur excitation with relative to the vibrating element 6. In other words, an electric power is not supplied to any of the above-mentioned electrodes. In this case, since the contact portion 66 of the vibrating element 6 abuts on (is pressed to) the contacted element 51, and the contacted element 51 is maintained in a stopping state by frictional force between the contact portion 66 and the contacted element 51. This makes it possible to maintain the driven element 5 in a stopping state. Namely, it is possible to prevent the contacted element 51 from being moved (rotated), and to maintain the driven element 5 at a desired position.

In the second mode, vibration is excited in a direction substantially perpendicular to a tangent line at a portion where the contact portion 66 abuts on an outer circumferential surface 511 of the contacted element 51. In other words, an electric power is supplied to the electrodes 61a, 61b, 61c, 61d, 65a, 65b, 65c, and 65d at both diagonal lines of both faces of the vibrating element 6, whereby an AC voltage is applied between the reinforcing plate 63 and each of the electrodes 61a, 61b, 61c, 61d, 65a, 65b, 65c, and 65d. This makes the vibrating element 6 repeatedly undergo extension and contraction in its longitudinal direction (in its long side direction), i.e., vibrate (longitudinally vibrate) with minute amplitude in its longitudinal direction. In other words, the contact portion 66 of the vibrating element 6 undergoes vibration (reciprocates) in its longitudinal direction (in its long side direction).

When the vibrating element 6 undergoes contraction, the contacted element 51 is away from the contact portion 66 so that frictional force between the contacted element 51 and the contact portion 66 disappears or decreased and therefore the driven element 5 is in a free state in FIG. 11. Thus, the driven element 5 can be freely rotated in both counterclockwise and clockwise directions. This makes it possible to freely move the driven element 5. On the other hand, when the vibrating element 6 undergoes extension, the contacted element 51 receives pushing force from the contact portion 66. However, since the direction of the pushing force is substantially perpendicular to the tangent line, the contacted element 51 does not rotate in either the counterclockwise direction or the clockwise direction in FIG. 11, and therefore the driven element 5 does not move.

Thus, the contacted element 51, i.e., the driven element 5 lies in a free state by vibration of the vibrating element 6, and can freely move in both directions.

In the third mode, vibration is excited, which at least has a displacing component of vibration in the forward rotating direction of the contacted element 51 (the circumferential direction component S2 shown in FIG. 7). In other words, an electric power is supplied to the electrodes 61a, 61c, 65a, and 65c that are located at one diagonal line of both faces of the vibrating element 6, whereby an AC voltage is applied between the reinforcing plate 63 and each of the electrodes 61a, 61c, 65a, and 65c. As mentioned in the first embodiment, this makes the contacted element 51 rotate in the counterclockwise direction in FIG. 11 (in the forward direction). At this time, the electrodes 61b, 61d, 65b, and 65d located at the other diagonal line of both faces of the vibrating element 6 to which the electric power is not applied are used as vibration detecting means for detecting vibration of the vibrating element 6.

In the fourth mode, vibration is excited, which at least has a displacing component of vibration in the reverse rotating direction of the contacted element 51 (the circumferential direction component S2 shown in FIG. 8). In other words, an electric power is supplied to the electrodes 61b, 61d, 65b, and 65d that are located at one diagonal line of both faces of the vibrating element 6, whereby an AC voltage is applied between the reinforcing plate 63 and each of the electrodes 61b, 61d, 65b, and 65d. As mentioned in the first embodiment, this makes the contacted element 51 rotate in the clockwise direction in FIG. 11 (in the reverse direction). At this time, the electrodes 61a, 61c, 65a, and 65c located at the other diagonal line of both faces of the vibrating element 6 to which the electric power is not applied are used as vibration detecting means for detecting vibration of the vibrating element 6.

Next, the operation of the operating apparatus 1 will be explained with reference to FIG. 11.

In a state where the power switch is ON, when instructions for stopping/freeing the contacted element 51 (i.e., the driven element 5) or instructions for a rotative direction and a rotating amount (for example, rotation number and/or rotation angle) of the contacted element 51 are given, the switch 9, the switch 16, and the rotating amount control circuit 83 of the drive circuit 8 are operated based on such instructions. Namely, any one of the first mode, the second mode, the third mode, and the fourth mode described above is established.

In the case (of the third mode) where instructions indicate that the contacted element 51 is to be rotated in the counterclockwise direction in FIG. 11 (in the forward direction), the switch 16 is switched so that the terminal 163 and the terminal 167 of the switch 16 are connected, and the terminal 165 and the terminal 168 of the switch 16 are connected, while the switch 9 is switched so that the terminal 94 and the terminal 97 of the switch 9 are connected, and the terminal 96 and the terminal 98 of the switch 9 are connected. Thus, the output side of the amplification circuit 82 in the drive circuit 8 is conducted to the electrodes 61a, 61c, 65a, and 65c of the vibrating element 6, and the input side of the oscillating circuit 81 in the drive circuit 8 is conducted to the electrodes 61b, 61d, 65b, and 65d of the vibrating element 6.

Each of the oscillating circuit 81 and the amplification circuit 82 of the drive circuit 8 is controlled by the rotating amount control circuit 83.

AC voltage outputted from the oscillating circuit 81 is amplified by the amplification circuit 82 and then applied between the reinforcing plate 63 and each of the electrodes 61a, 61c, 65a, and 65c. Thus, as mentioned above, each of the portions corresponding to the electrodes 61a, 61c, 65a, and 65c of the vibrating element 6 undergoes expansion and contraction repeatedly, and the contact portion 66 of the vibrating element 6 undergoes vibration (reciprocates) in a slanting direction as represented by the arrow b shown in FIG. 7, and vibrates (moves) in an elliptical manner as represented by the arrow c shown in FIG. 7. The contacted element 51 receives the frictional force (pushing force) from the contact portion 66 when the portions corresponding to the electrodes 61a, 61c, 65a, and 65c of the vibrating element 6 are extended, and this repeating frictional force (pushing force) makes the contacted element 51 to be moved (rotated) in the counterclockwise direction in FIG. 1 (in the forward direction).

When the contacted element 51 rotates in the counterclockwise direction in FIG. 1 (in the forward direction), the driven element 5 moves (rotates) in the same direction together with the contacted element 51.

At this time, the electrodes 61b, 61d, 65b, and 65d to which an AC voltage is not applied (not activated) function as detecting electrodes that are used to detect a voltage to be induced between the reinforcing plate 63 and each of the electrodes 61b, 61d, 65b, and 65d (induced voltage).

The detected induced voltage (detected voltage) is inputted to the oscillating circuit 81, and then based on such detected voltage, the oscillating circuit 81 outputs an AC voltage having a frequency (resonant frequency) at which amplitude of the vibrating element 6 becomes maximum, namely, the detected voltage becomes maximum. This makes it possible to move (rotate) the driven element 5 efficiently.

Further, the rotating amount control circuit 83 controls operation for conducting to each of those electrodes based on the instructed rotating amount (target value) of the contacted element 51.

Namely, the rotating amount control circuit 83 allows the oscillating circuit 81 and the amplification circuit 82 to activate until the rotating amount of the contacted element 51 reaches the instructed rotating amount (target value) of the contacted element 51, thereby driving the vibrating element 6 and rotating the driven element 5 together with the contacted element 51.

On the contrary thereto, in the case (of the fourth mode) where the instructions indicate that the contacted element 51 is to be rotated in the clockwise direction in FIG. 11 (in the reverse direction), the switch 16 is switched so that the terminal 163 and the terminal 167 of the switch 16 are connected, and the terminal 165 and the terminal 168 of the switch 16 are connected, while the switch 9 is switched so that the terminal 93 and the terminal 97 of the switch 9 are connected, and the terminal 95 and the terminal 98 of the switch 9 are connected. Thus, the output side of the amplification circuit 82 in the drive circuit 8 is conducted to the electrodes 61b, 61d, 65b, and 65d of the vibrating element 6, and the input side of the oscillating circuit 81 in the drive circuit 8 is conducted to the electrodes 61a, 61c, 65a, and 65c of the vibrating element 6. Since the following operations are the same as those of the case where the instructions indicate that the contacted element 51 is to be rotated in the counterclockwise direction in FIG. 11, a description thereof will be omitted.

In the case (of the first mode) where the instructions indicate that the contacted element 51, i.e., the driven element 5 is to be kept in the stopping state, as shown in FIG. 11, the switch 16 is switched so that the terminal 163 and the terminal 167 of the switch 16 are connected, and the terminal 165 and the terminal 168 of the switch 16 are connected.

The rotating amount control circuit 83 does not allow the oscillating circuit 81 and the amplification circuit 82 to activate. Namely, an AC voltage is not applied to any of the electrodes of the vibrating element 6.

The contact portion 66 of the vibrating element 6 is in pushing contact with (abuts on) the contacted element 51, and the frictional force between the contact portion 66 and the contacted element 51 keeps the contacted element 51 in the stopping state. This makes it possible to keep the driven element 5 in the stopping state. Namely, the driven element 5 is prevented from moving, thereby maintaining the driven element 5 at a desired position.

In this regard, in the case of the first mode, the switches 9 and 16 may be switched in any manner as long as an AC voltage is not applied to any of the electrodes of the vibrating element 6.

In the case (of the second mode) where the instructions indicate that the contacted element 51 is to be set in the free state, in other words, the instructions indicate that the driven element 5 is to be set in the free state, the switch 16 is switched so that the terminal 164 and the terminal 167 of the switch 16 are connected, and the terminal 166 and the terminal 168 of the switch 16 are connected. Thus, the output side of the amplification circuit 82 of the drive circuit 8 is conducted to the electrodes 61a, 61b, 61c, 61d, 65a, 65b, 65c, and 65d of the vibrating element 6, and the electrodes 61e and 65e of the vibrating element 6 are conducted to the input side of the oscillating circuit 81 of the drive circuit 8.

An AC voltage outputted from the oscillating circuit 81 is amplified by the amplification circuit 82 and then applied between the reinforcing plate 63 and each of the electrodes 61a, 61b, 61c, 61d, 65a, 65b, 65c, and 65d. Thus, as mentioned above, the contact portion 66 of the vibrating element 6 undergoes vibration (reciprocates) in its longitudinal direction, whereby the contacted element 51, i.e., the driven element 5 becomes a free state, and it is possible to freely rotate the contacted element 51, i.e., the driven element 5 in both clockwise and counterclockwise directions in FIG. 1.

At this time, the voltage (induced voltage) induced between the reinforcing plate 63 and each of the electrodes 61e and 65e is detected from each of the electrodes 61e and 65e. The detected induced voltage (detected voltage) is inputted to the oscillating circuit 81, and thereafter, based on the detected voltage, the oscillating circuit 81 outputs an AC voltage having a frequency at which amplitude of the longitudinal vibration of the vibrating element 6 becomes maximum, namely, the detected voltage becomes maximum. This makes it possible to rotate the contacted element 51, i.e., the driven element 5 more smoothly.

Here, in the case of the second mode, the switch 9 may be switched in any manner.

According to the operating apparatus 1 in the second embodiment of the present invention, it is possible to obtain effects similar to that of the first embodiment described above.

In this operating apparatus 1, since it is possible to select any state from the four states, which includes a state where the contacted element 51 (driven element 5) is kept in a stopping state, i.e., a state of high friction; a state where the contacted element 51 (driven element 5) is allowed to be rotated (or be moved) (i.e., the contacted element 51 and the driven element 5 are set in a free state), i.e., a state of low friction; a state where the contacted element 51 is rotated in the forward direction; and a state where the contacted element 51 is rotated in the reverse direction, there is wide applicability.

In the above-mentioned vibrating element 6, the case where the electrodes to drive the vibrating element 6 are divided into four sections has been described. However, this is just one example for selectively exciting the longitudinal vibration and the bending vibration of the vibrating element 6, and in the present invention, the structure and the method of driving the vibrating element 6 are not limited to the above-mentioned ones.

Additionally, in the present invention, the operating apparatus 1 is adapted so that the third mode or the fourth mode may be omitted, and the contacted element 51 may be rotated in only one direction. Even in this case, the driven element 5 can be moved (i.e., rotated) in both of the directions in FIG. 1 using the only one vibrating element 6.

(Third Embodiment)

Next, a description will be given for a third embodiment of the operating apparatus according to the present invention.

Figure 12:
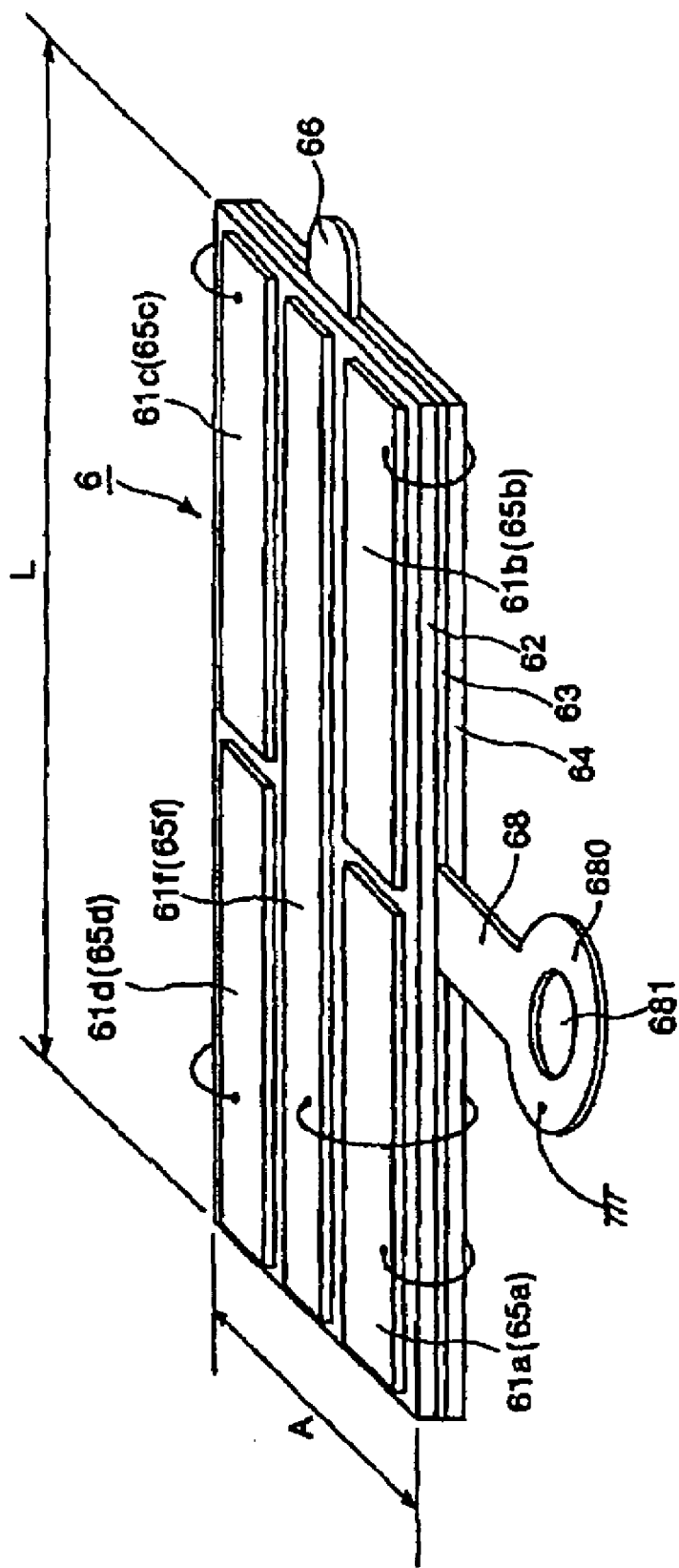
FIG. 12 is a perspective view illustrating a vibrating element of the operating apparatus in a third embodiment of the present invention.

FIG. 12 is a perspective view illustrating a vibrating element of the operating apparatus in a third embodiment according to the present invention. Now, in following explanations using FIG. 12, an upper side is referred to as "upper," a lower side is referred to as "lower," a right side is referred to as "right," and a left side is referred to as "left."

Hereinafter, an operating apparatus 1 in the third embodiment will be described, focusing on different points between the above-mentioned first or second embodiment and the third embodiment. In this regard, explanation of items including the same matters and the like is omitted.

The operating apparatus 1 in the third embodiment has characteristics on the point that the operating apparatus 1 can further employ a fifth mode and a sixth mode in which longitudinal vibration and bending vibration are combined, in addition to the first to fourth modes described in the second embodiment. The fifth mode and the sixth mode can be arbitrarily selected by changing a conducting pattern to each of electrodes 61a–61d, 61f, 65a–65d, and 65f in the same way as the first to fourth modes.

The vibrating element 6 of the operating apparatus 1 has an electrode 61f at the upper side of a piezoelectric element 62 in FIG. 12 and an electrode 65f at the lower side thereof in place of the detecting electrodes 61e and 65e in the second embodiment. The electrodes 61f and 65f are rectangular and plate-shaped, and has a substantially same length as a length in a longitudinal direction of the vibrating element 6. The electrodes 61f and 65f are located at a central portion of the vibrating element 6 along its longitudinal direction. Further, the electrode 61f and the electrode 65f are electrically connected between the front face and the back face of the vibrating element 6. The electrodes 61f and 65f are also electrically connected to a conducting circuit 20 (now shown) in the same way as the other electrodes 61a–61d and 65a–65d (the electrodes 65a–65d are not shown in FIG. 12.).

Figure 13:
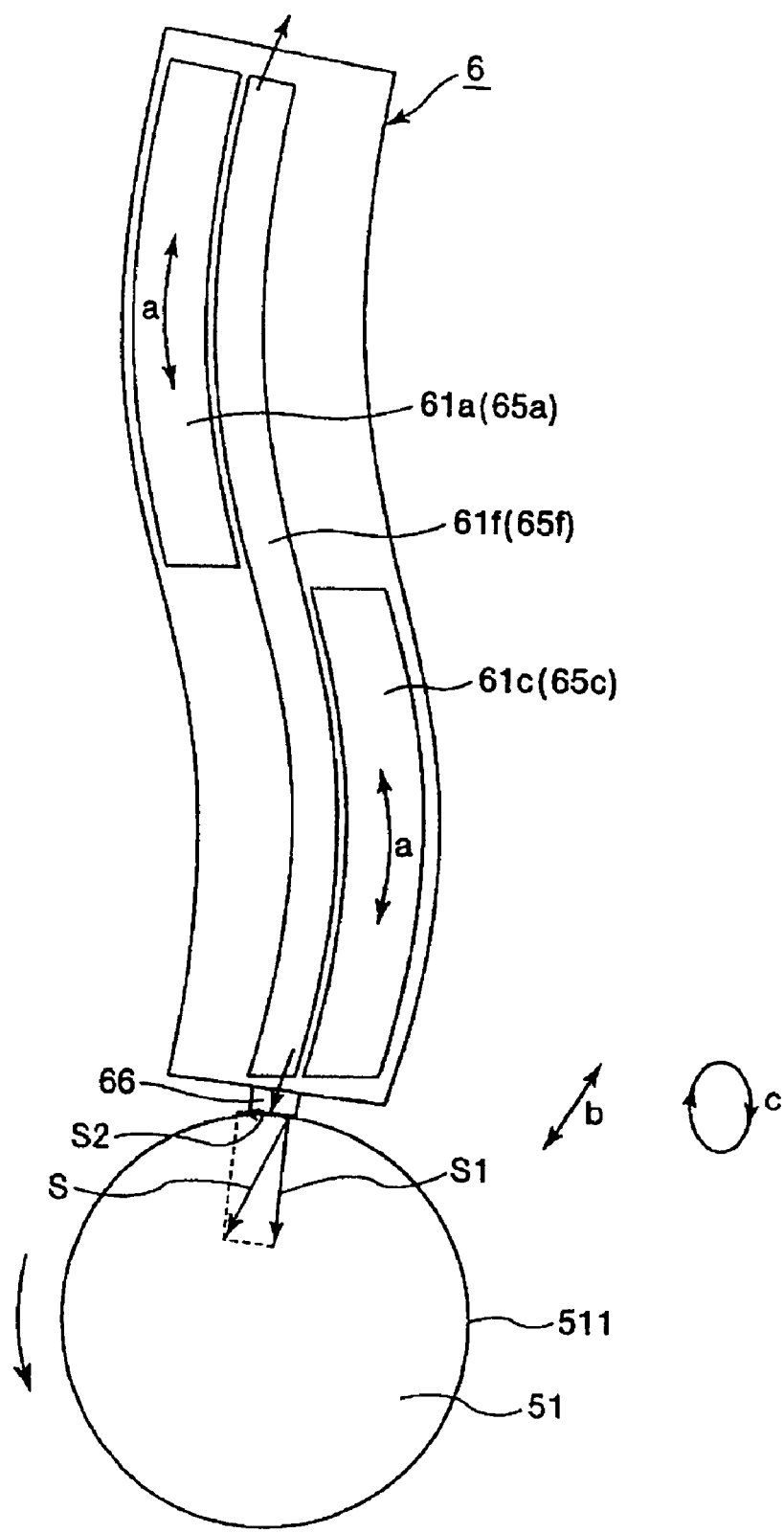
FIG. 13 is a plan view showing a vibrating state of the vibrating element shown in FIG. 12.

FIG. 13 is a plan view showing a vibrating state of the vibrating element of the operating apparatus shown in FIG. 12.

In the fifth mode of the operating apparatus 1, an electric power is applied to the electrodes 61a, 61c, 65a, and 65c that are located at one diagonal line of both faces of the vibrating element 6, whereby an AC voltage is applied between the reinforcing plate 63 and each of the electrodes 61a, 61c, 65a, and 65c. Then, each of portions of the vibrating element 6 corresponding to these electrodes repeatedly undergoes extension and contraction so that the entire vibrating element 6 undergoes bending secondary vibration. By the bending secondary vibration, the contact portion 66 of the vibrating element 6 undergoes vibration (reciprocates) in a slanting direction represented by an arrow b in FIG. 13, or vibrates (moves) in an elliptical manner as represented by an arrow c in FIG. 13. Thus, the contacted element 51 repeatedly receives frictional force (pushing force) from the contact portion 66 so that the contacted element 51 is rotated in the counterclockwise direction in FIG. 13 (in the forward direction).

In the fifth mode, an electric power is further applied to the electrodes 61f and 65f at the central portion of the vibrating element 6, whereby the portions of the piezoelectric elements 62, 64 corresponding to the electrodes 61f and 65f repeatedly and partly undergo extension and contraction at a high speed. Then, the portions on the centerline in the longitudinal direction of the vibrating element 6 undergo longitudinal vibration with minute amplitude along its longitudinal direction. This is referred to as longitudinal primary vibration. By the longitudinal primary vibration, the contact portion 66 increases the pushing force in the longitudinal direction of the vibrating element 6 to bias the contacted element 51 with the increased (stronger) pushing force. This makes it possible to obtain high driving force in comparison with the case where the vibrating element 6 is driven by only the bending secondary vibration.

In the fifth mode, the electrodes 61b, 61d, 65b, and 65d to which the electric power is not applied serve as vibration detecting means for detecting vibration of the vibrating element 6. The electrodes 61b, 61d, 65b, and 65d detect a voltage (induced voltage) to be induced between the reinforcing plate 63 and each of the electrodes 61b, 61d, 65b, and 65d to which the electric power is not applied when the vibrating element 6 is driven, and thereafter the induced voltage is inputted to an oscillating circuit 81. Based on the detected induced voltage, the oscillating circuit 81 outputs an AC voltage having a predetermined frequency (resonant frequency) at which amplitude of the vibrating element 6 becomes maximum, i.e., the induced voltage becomes maximum. This makes it possible to rotate the contacted element 51, i.e., the driven element 5 efficiently. In this regard, the electrodes 61b, 61d, 65b, and 65d to which the electric power is not applied operate in the same way as those in the first embodiment.

Figure 14:
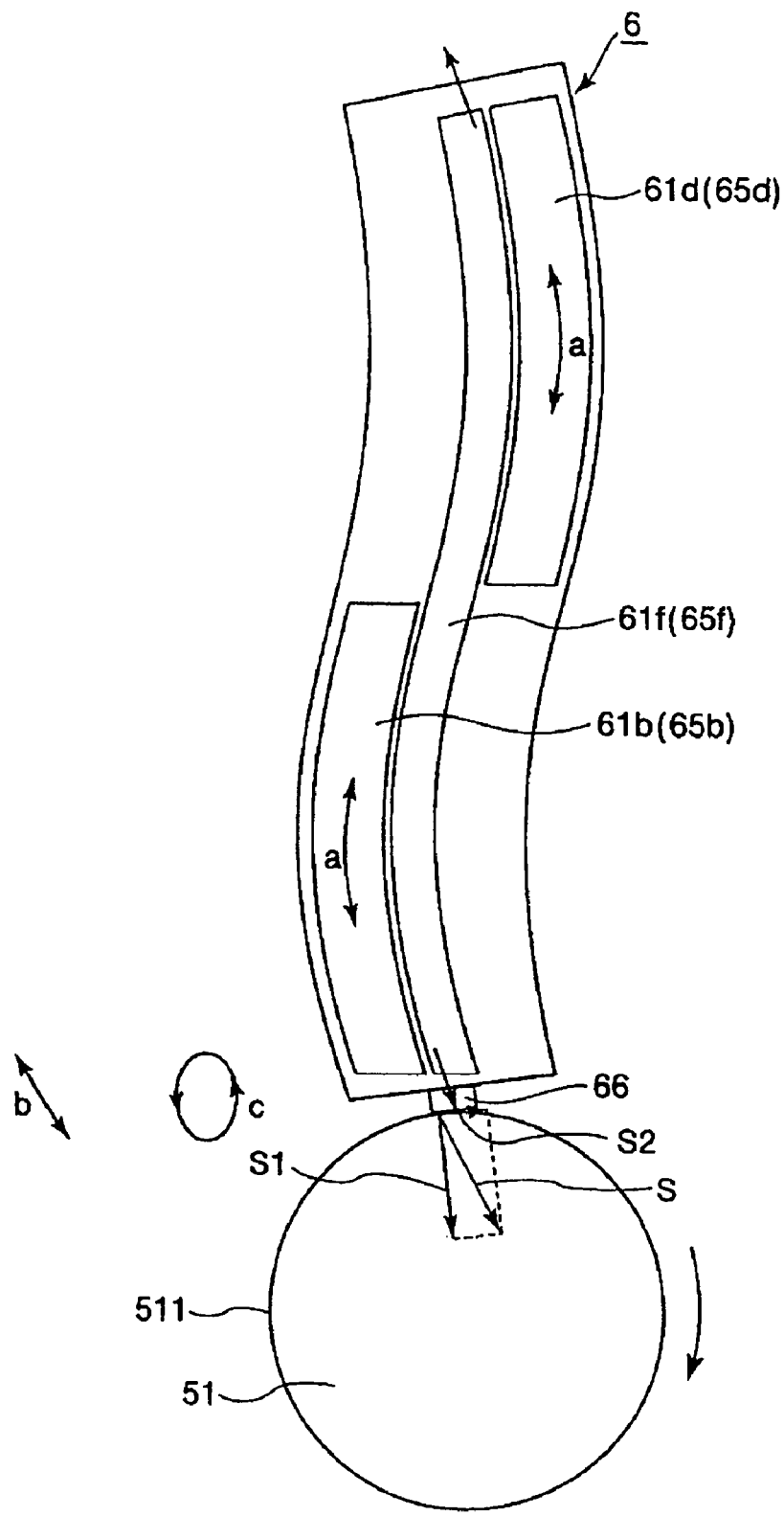
FIG. 14 is a plan view showing a vibrating state of the vibrating element shown in FIG. 12.

FIG. 14 is a plan view showing a vibrating state of the vibrating element shown in FIG. 12.

In the sixth mode of the operating apparatus 1, an electric power is applied to the electrodes 61b, 61d, 65b, and 65d that are located at the other diagonal line of both faces of the vibrating element 6, and to the electrodes 61f and 65f that are located at the central portion of the vibrating element 6. The vibrating element 6 undergoes vibration with motion symmetrical to that in case of the fifth mode, thereby rotating the contacted element 51 in the clockwise direction in FIG. 14 (in the reverse direction). This also makes it possible to obtain stronger driving force in the reverse direction.

In sixth mode, the electrodes 61a, 61c, 65a, and 65c to which the electric power is not applied serve as vibration detecting means for detecting vibration of the vibrating element 6. The electrodes 61a, 61c, 65a, and 65c detect a voltage (induced voltage) to be induced between the reinforcing plate 63 and each of the electrodes 61a, 61c, 65a, and 65c to which the electric power is not applied when the vibrating element 6 is driven, and thereafter the induced voltage is inputted to an oscillating circuit 81. Based on the detected induced voltage, the oscillating circuit 81 outputs an AC voltage having a predetermined frequency (resonant frequency) at which amplitude of the vibrating element 6 becomes maximum, i.e., the induced voltage becomes maximum. This makes it possible to rotate the contacted element 51, i.e., the driven element 5 efficiently. In this regard, the electrodes 61b, 61d, 65b, and 65d to which the electric power is not applied operate in the same way as those in the first embodiment.

Here, as shown in FIG. 12, in the case where a length of a body portion of the vibrating element 6 in the longitudinal direction (the direction in which the vibrating element 6 undergoes expansion and contraction by the application of the AC voltage), i.e., a length of the long side of the vibrating element 6 is determined to be a length L, and where a length of the body portion of the vibrating element 6 in a direction substantially perpendicular to the longitudinal direction (the length of the body portion in the direction substantially perpendicular to the direction in which the contact portion 66 protrudes), i.e., a length of the short side of the vibrating element 6 is determined to be a width length A, a ratio between the width A and the length L is not especially limited. However, it is preferable that the ratio is about 2 to 5. Further, it is more preferable that the ratio is about 3 to 4. Furthermore, it is most preferable that the ratio is about 3.54. The relationship between the resonant frequencies of the longitudinal primary vibration and the bending secondary vibration becomes appropriate in the above-mentioned conditions, and it is possible to obtain satisfactory drive efficiency.

In this regard, in the operating apparatus 1, the vibrating modes of the vibrating element 6 are not limited to the first to sixth modes mentioned above, and any optional vibrating mode may be employed within an obvious scope of one skilled in the art. For example, in the vibrating element 6 described in FIG. 12, longitudinal primary vibration may be excited in the vibrating element 6 by applying the AC voltage only to the electrodes 61f, 65f, or complex vibration of combination of longitudinal primary vibration and bending tertiary vibration may be excited in the vibrating element 6 by applying the AC voltage to all of the electrodes 61a–61f and 65a–65f and delaying the application timing to predetermined electrodes.

Figure 17:
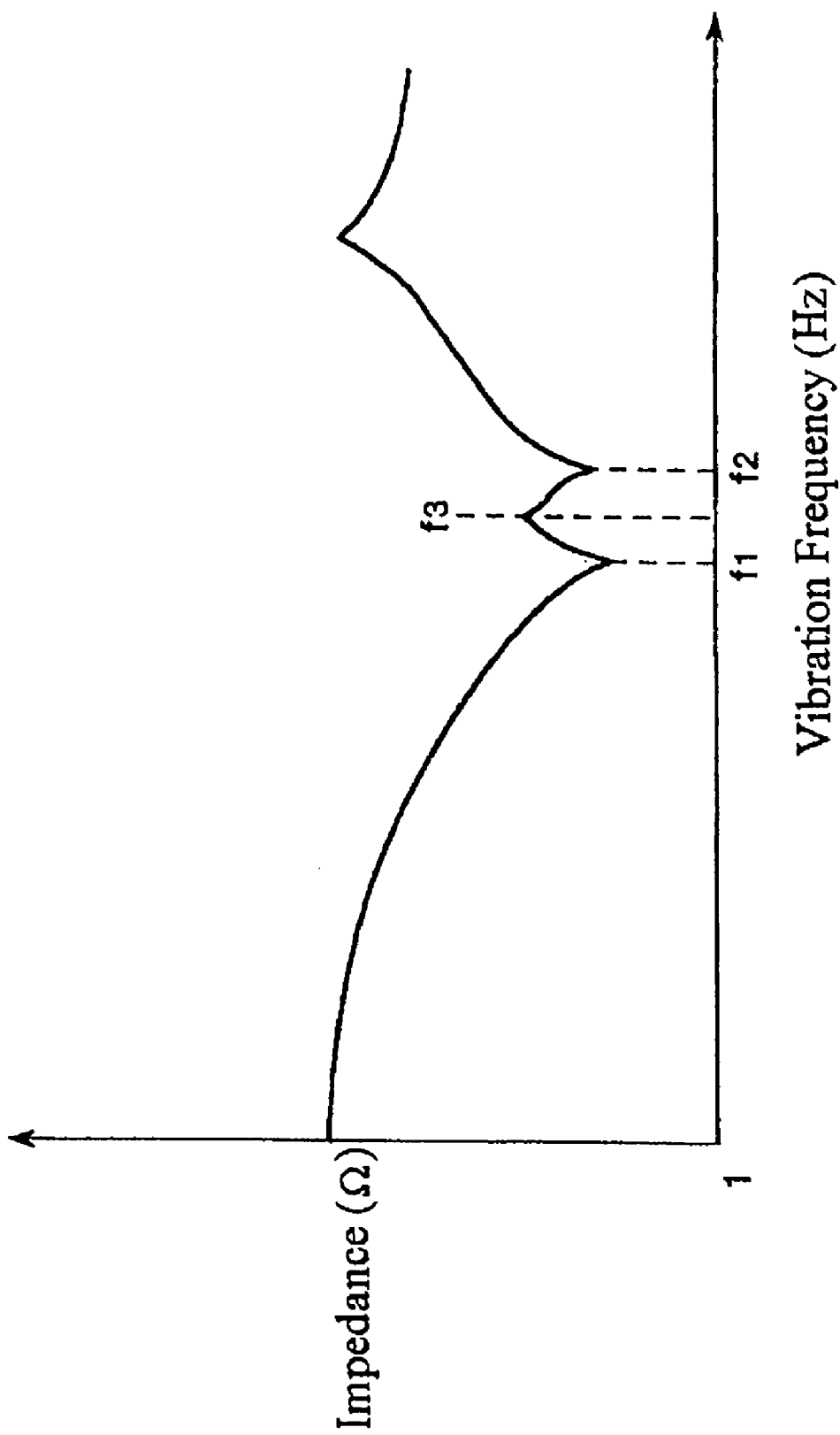
FIG. 17 is a graph showing electric characteristics of the vibrating element.

FIG. 17 is a graph showing electric characteristics of the vibrating element shown in FIG. 12. In this graph shown in FIG. 17, the horizontal axis represents the vibration frequency (Hz) of the vibrating element 6 during driving, and the perpendicular axis represents impedance (□) of the piezoelectric elements 62, 64 while the vibrating element 6 is not in pushing contact with (abuts on) the contacted element 51.

As shown in FIG. 17, the vibrating element 6 has a resonant frequency f1 for the longitudinal primary vibration and a resonant frequency f2 for the bending secondary vibration. There are minimum values of impedance at these resonant frequencies f1, f2. Here, these resonant frequencies f1, f2 are frequencies peculiar to the vibrating element 6. The resonant frequencies f1, f2 can be arbitrarily changed by selecting a shape or a size of the vibrating element 6, a position of the contact portion 66, or the like. In this vibrating element 6 of the present invention, the resonant frequencies f1, f2 are set so as to be close each other. For example, in this vibrating element 6, the resonant frequency f2 of the bending secondary vibration is higher than the resonant frequency f1 of the longitudinal primary vibration by about 1 to 2%. In the constitution of the vibrating element 6, when the vibrating element 6 is driven at a frequency near the resonant frequencies f1, f2, in particular, at a frequency between the resonant frequencies f1 and f2, complex vibration of combination of the longitudinal primary vibration and the bending secondary vibration can be obtained. Further, the complex vibration noticeably has the drive characteristics of both the longitudinal primary vibration and the bending secondary vibration because the drive frequency is near both the resonant frequency f1 of the longitudinal primary vibration and the resonant frequency f2 of the bending secondary vibration. This makes it possible to the drive characteristics of both the longitudinal primary vibration and the bending secondary vibration when the vibrating element 6 is driven.

Further, in the vibrating element 6, these resonant frequencies f1, f2 are set so as to be predetermined values different from each other (see FIG. 17). Thus, a change of impedance of the piezoelectric elements 62, 64 becomes sluggish near the resonance point in the pushing state, whereby the boundary between the resonant frequency f1 of the longitudinal primary vibration and the resonant frequency f2 of the bending secondary vibration becomes unclear. Moreover, it is possible to constitute a wide frequency band where the value of the impedance becomes lower near the resonant frequencies f1, f2, in particular, at a frequency between the resonant frequencies f1 and f2. This makes it possible to carry out the excitation combining the longitudinal primary vibration and the bending secondary vibration at a wide frequency band, and to stabilize an input power to the vibrating element 6 while driving.

In the operating apparatus 1, the vibrating element 6 is driven at a vibration frequency (drive frequency) between the resonant frequency f1 of the longitudinal primary vibration and the resonant frequency f2 of the bending secondary vibration. In this case, when the drive frequency of the vibrating element 6 is brought close to the resonant frequency f1 of the longitudinal primary vibration, the amplitude of the longitudinal vibration in the direction in which the pushing force is increased becomes larger. Thus, the frictional force between the contact portion 66 of the vibrating element 6 and the contacted element 51 increases, and therefore the driving force of the vibrating element 6 is enhanced (i.e., it becomes a high driving force type). On the other hand, when the drive frequency of the vibrating element 6 is brought close to the resonant frequency f2 of the bending secondary vibration, the component in the rotating direction of the contacted element 51 (i.e., the driven element 5) within the vibrating displacement of the vibrating element 6 becomes larger. Thus, the rotating amount of the contacted element 51 per unit vibration increases, and therefore the drive speed (rotational speed) of the driven element 5 is enhanced (i.e., it becomes a high speed type). In this way, by shifting the resonant frequency f1 of the longitudinal primary vibration against the resonant frequency f2 of the bending secondary vibration, and appropriately setting (selecting) the drive frequency of the vibrating element 6 within the frequency band between the resonant frequencies f1 and f2, it is possible to obtain arbitrary drive characteristics with respect to driving force, drive speed, or the like, for example.

In this regard, in this vibrating element 6, it is preferable that the resonant frequency f2 of the bending secondary vibration is higher than the resonant frequency f1 of the longitudinal primary vibration by about 0.5 to 3.0%. It is more preferable that the resonant frequency f2 is higher than the resonant frequency f1 by about 1.0 to 2.0%.

By setting a difference between the resonant frequencies f1 and f2 to the range mentioned above, since the longitudinal primary vibration and the bending secondary vibration occur simultaneously (i.e., both vibrations are combined), it is possible to obtain the frictional force and the driving force simultaneously, thereby being able to obtain satisfactory drive characteristics.

In this regard, the present invention is not limited to this constitution. The resonant frequency f1 of the longitudinal primary vibration may be higher than the resonant frequency f2 of the bending secondary vibration. In this case, it is preferable that the resonant frequency f1 of the longitudinal primary vibration is higher than the resonant frequency f2 of the bending secondary vibration by about 0.5 to 3.0%. It is more preferable that the resonant frequency f1 is higher than the resonant frequency f2 by about 1.0 to 2.0%. In addition, in order to obtain a lager mechanical output by applying (inputting) larger electric power to the operating apparatus 1, it is preferable that the impedance at the drive frequency is reduced.

Further, in the vibrating element 6, the impedance at the resonant frequency f2 of the bending secondary vibration is larger than that at the resonant frequency f1 of the longitudinal primary vibration. Moreover, as shown in FIG. 17, there is a frequency f3 at which the impedance has a maximum value between the resonant frequencies f1 and f2. It is preferable that the vibrating element 6 is driven at a predetermined drive frequency between the resonant frequency f1 of the longitudinal primary vibration and the resonant frequency f2 of the bending secondary vibration. It is more preferable that the vibrating element 6 is driven at a predetermined drive frequency between the resonant frequency f2 and the frequency f3. This makes it possible to excite the vibrating element 6 while driving with a vibrating phase-lag between the longitudinal vibration and the bending vibration. Therefore, it is possible to vibrate (move) the contact portion 66 along an elliptical orbit c (see FIGS. 7 and 8), and it is possible to efficiently transmit force from the vibrating element 6 to the contacted element 51 without generating the force to draw the contacted element 51 back.

In this regard, this constitution in which the resonant frequencies f1, f2 are different from and/or close to each other as described above may be applied to the first and second embodiments of the present invention. This makes it possible to obtain effects similar to that of the third embodiment described above.

In the operating apparatus 1 of the third embodiment, five electrodes 61*a*–61*d* and 61*f*, and 65*a*–65*d* and 65*f* are respectively disposed on the piezoelectric elements 62, 64 to realize bi-directional drive of the contacted element 51 including the forward and reverse directions (see FIGS. 13 and 14). However, the present invention is not limited to this structure. For example, in the case where the contacted element 51 is to be rotated in one direction, the vibrating element 6 may has more simplified structure.

Figure 15:
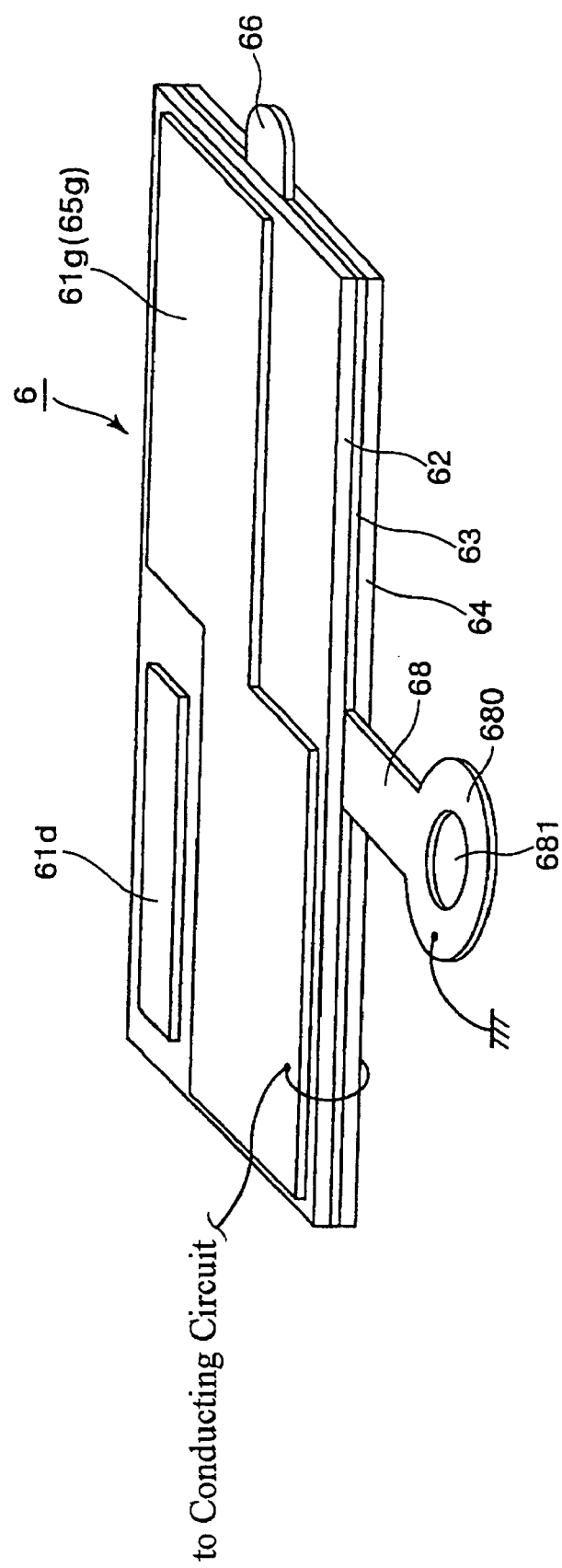
FIG. 15 is a perspective view illustrating a variant of the vibrating element.

FIG. 15 is a perspective view illustrating a variant of the vibrating element shown in FIG. 12. The vibrating element 6 has a single electrode 61*g* integrating the electrodes 61*a*, 61*c*, and 61*f* at the same positions as those of the electrodes in place of these electrodes 61*a*, 61*c*, and 61*f* in comparison with the vibrating element 6 described in FIG. 12. Similarly, the vibrating element 6 has a single electrode 65*g* integrating the electrodes 65*a*, 65*c*, and 65*f* at the same position as those of the electrodes in place of these electrodes 65*a*, 65*c*, and 65*f*. The electrode 65*g* is not shown in FIG. 24, but reference numeral of the electrode is merely designated using parentheses. Further, the electrode 61*d* is provided independent of the electrode 65*d*. In addition, the electrodes 61*b*, 65*b*, and 65*d* are omitted in this vibrating element 6.

Figure 16:
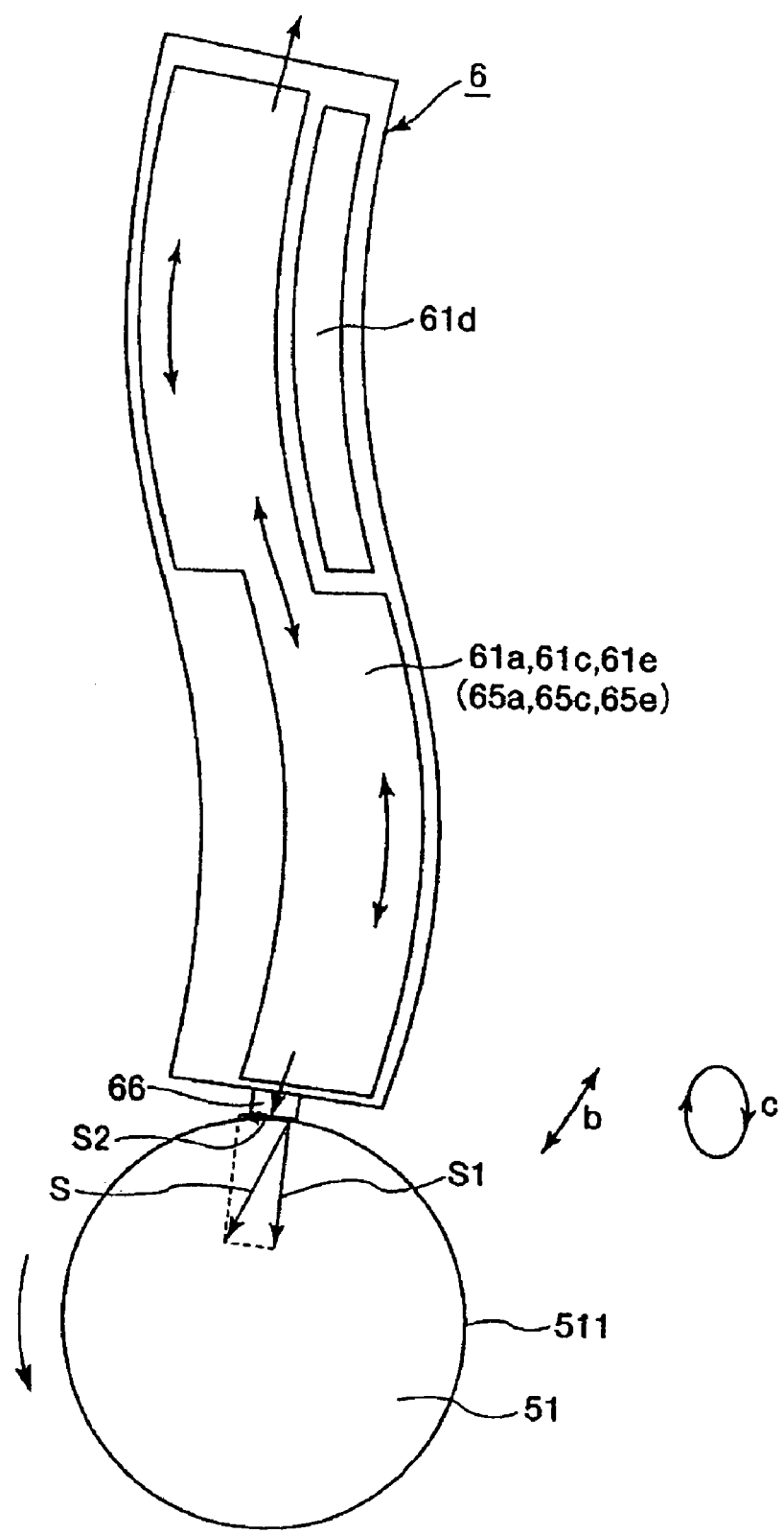
FIG. 16 is a plan view illustrating a vibrating state of the vibrating element shown in FIG. 15.

FIG. 16 is a plan view illustrating a vibrating state of the vibrating element shown in FIG. 15. An electric power is supplied to these single electrode 61*g*, 65*g* of the vibrating element 6. Portions corresponding to the electrodes 61*g*, 65*g* of the piezoelectric elements 62, 64 repeatedly undergo expansion and contraction at a high speed (see FIG. 16). Then, by the expansion and contraction of portions corresponding to the electrodes 61*a*, 61*c*, 65*a*, and 65*c* within the portions corresponding to the electrodes 61*g*, 65*g*, bending secondary vibration is generated as well as the operation of the fifth mode mentioned above. Further, by the expansion and contraction of portions corresponding to the electrodes 61*f* and 65*f* within the portions corresponding to the electrodes 61*g*, 65*g*, longitudinal primary vibration is generated as well as the operation of the fifth mode. Thus, complex vibration of combination of the longitudinal primary vibration and the bending secondary vibration is generated, and the contacted element 51 is rotated in a counterclockwise direction in FIG. 16 by means of the same operation as that of the fifth mode.

The electrode 61*d* is connected to the oscillating circuit 81 of the drive circuit 8 (not shown), and used to hold its oscillating frequency to a proper value.

In this regard, the rotating direction of the contacted element 51 is only one direction in this vibrating element 6. According to this vibrating element 6, since the number of electrodes is reduced in comparison with the vibrating element 6 described in FIG. 12, it is possible to simplify the structure of a production (vibrating element), and to shorten (cut down) the manufacturing steps of the production. In addition, since the driven element 5 is driven (rotated) in only one direction, the switch 9 of the conducting circuit 20 can be omitted. This makes it possible to further simplify the production.

On the other hand, a single electrode 61*h* (not shown) integrating the electrodes 61*b*, 61*d*, and 61*f* may be disposed at the same positions as those of these electrodes in place of the electrodes 61*b*, 61*d*, and 61*f*, and a single electrode 65*h* (not shown) integrating the electrodes 65*b*, 65*d*, and 65*f* may be disposed at the same positions as those of these electrodes in place of the electrodes 65*b*, 65*d*, and 65*f*. Further, the other electrodes 61*a*, 61*c*, 65*a*, and 65*c* may be omitted. In this case, the contacted element 51 can be rotated in the direction reverse to that mentioned above (the clockwise direction in FIG. 16), namely, the driven element 5 can be rotated in the counterclockwise direction in FIG. 1.

(Fourth Embodiment)

Next, a description will be given for an operating apparatus 1 of a fourth embodiment according to the present invention.

Figure 18:
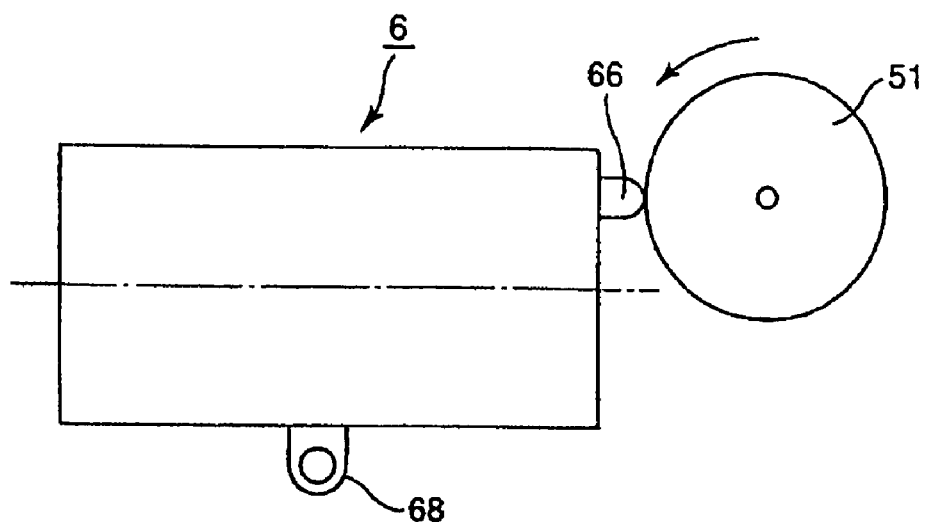
FIG. 18 is a plan view illustrating an operating apparatus in a fourth embodiment according to the present invention.

FIG. 18 is a plan view illustrating an operating apparatus in the fourth embodiment according to the present invention.

Hereinafter, an operating apparatus 1 in the fourth embodiment will be described, focusing on different points between the above-mentioned first embodiment and the fourth embodiment. In this regard, explanation of items including the same matters and the like is omitted.

In the operating apparatus 1 of the first embodiment described above, the contact portion 66 was arranged at the center of the short side of the vibrating element 6. However, the position of the contact portion 66 is not limited to this position. For example, as shown in FIG. 18, the contact portion 66 may be located at a position offset from the central portion of the short side of the vibrating element 6, i.e., at a position offset from on the centerline in the longitudinal direction of the vibrating element 6. According to such a configuration, there occur (1) unbalanced state of weight of the vibrating element 6 by offset of the setting position of the contact portion 66; (2) unbalanced state of arrangement of the electrodes 61*a*–61*f* and 65*a*–65*f* for driving the vibrating element 6; (3) unbalanced state owing that reaction force from the driven element 5 acts on the vibrating element 6 out the centerline of the vibrating element 6; and the like. In this case, when the vibrating element 6 undergoes extension and contraction by supplying the electric power to the vibrating element 6, complex vibration of combination of longitudinal vibration and bending vibration is readily induced. This makes it possible to enhance a drive efficiency of the vibrating element 6.

In this regard, in terms of reason for the item (3) mentioned above, if the center of the contacted element 51 is offset from the centerline of the vibrating element 6 even though the contact portion 66 protrudes from the entire short side of the vibrating element 6 as shown in FIG. 10, the vibrating element 6 has similar effects. Therefore, such a structure is also included in the present invention.

In the same way, if the center of the contacted element 51 is offset from the centerline of the vibrating element 6 even though the contact portion 66 protrudes from the center portion of the short side of the vibrating element 6, the vibrating element 6 has similar effects, and the complex vibration may be induced. Therefore, such a structure is also included in the present invention.

Figure 20:
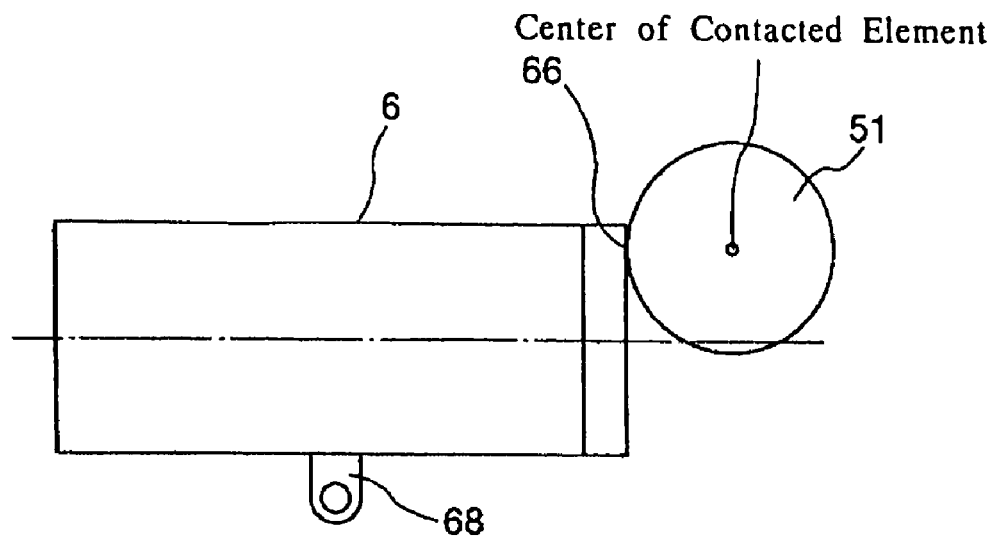
FIG. 20 is a perspective view illustrating a variant of the vibrating element.

Hereinafter, a further explanation will be given with reference to FIGS. 20 and 21.

Since the operations of the items (1)–(3) described above are independent from each other, they can be freely combined. For example, as shown in FIG. 20, by adopting the constitution in which the contact portion 66 is provided throughout the short side of the vibrating element 6 and the contact portion 66 is in contact with the contacted element 51 at a point offset from the centerline of the vibrating element 6, the operations of the items (2) and (3) make the complex vibration of combination of the longitudinal vibration and the bending vibration be induced. Therefore, it is possible to improve the drive efficiency.

Figure 21:
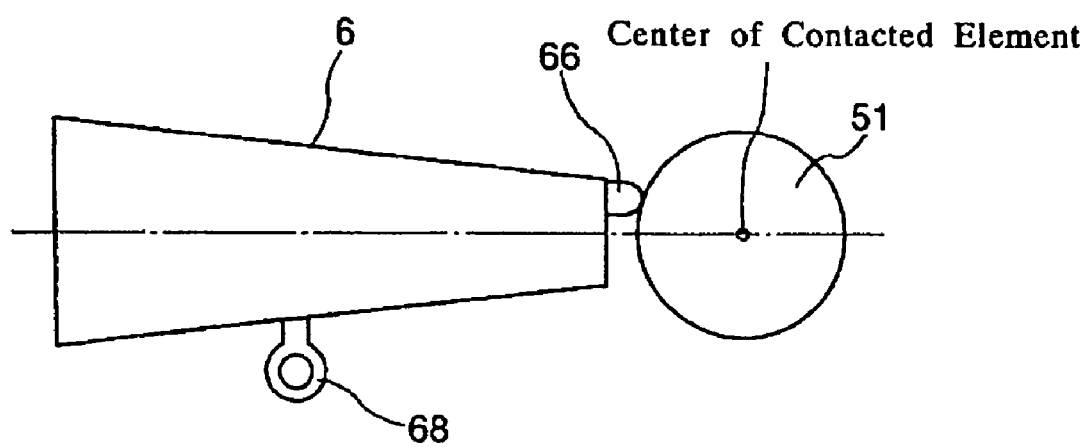
FIG. 21 is a perspective view illustrating a variant of the vibrating element.

Further, as shown in FIG. 21, by adopting the constitution in which the vibrating element 6 has a trapezoid-shaped body portion and the contact portion 66 is provided at a position offset from the centerline in the longitudinal direction of the vibrating element 6 to bring into contact with the contacted element 51, the reaction force from the driven element 5 can act offset from the centerline of the vibrating element 6, and the displacement in a direction orthogonal to the longitudinal direction of the vibrating element 6 can be generated. Thus, it is possible to improve the drive efficiency.

Figure 19:
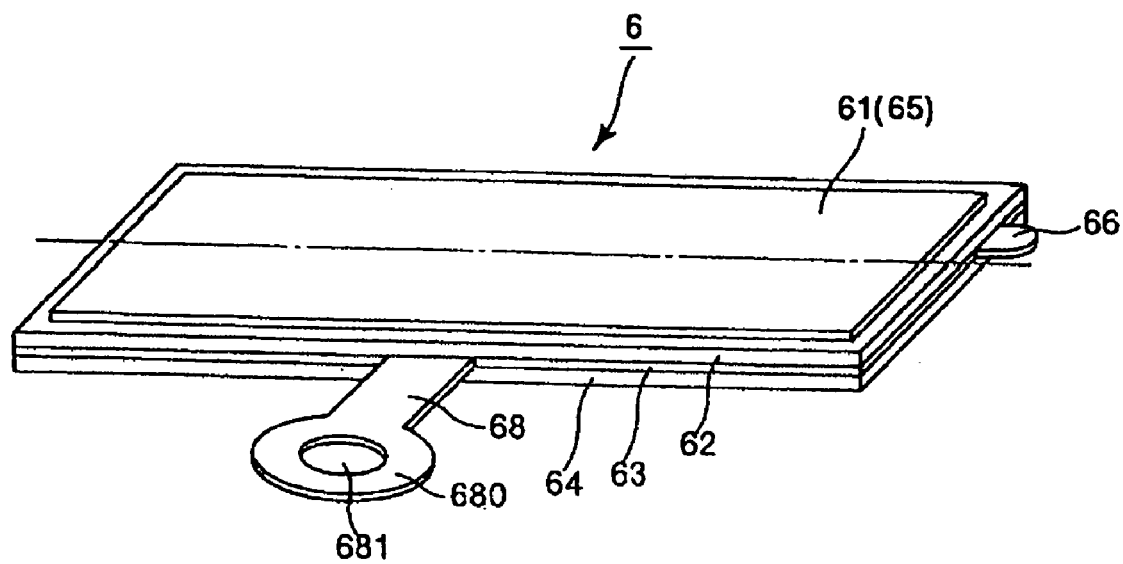
FIG. 19 is a perspective view illustrating a variant of the vibrating element shown in FIG. 18.

In addition, in the fourth embodiment, it is possible to adopt the constitution in which single electrodes 61, 65 are disposed at almost whole areas of the piezoelectric elements 62, 64. FIG. 19 is perspective view illustrating a variant of the vibrating element shown in FIG. 18. According to such a structure, since complex vibration of longitudinal vibration and bending vibration is induced by unbalanced states of the vibrating element 6, it is possible to drive the contacted element 51 efficiently with a simplified construction of electrodes.

Figure 34:
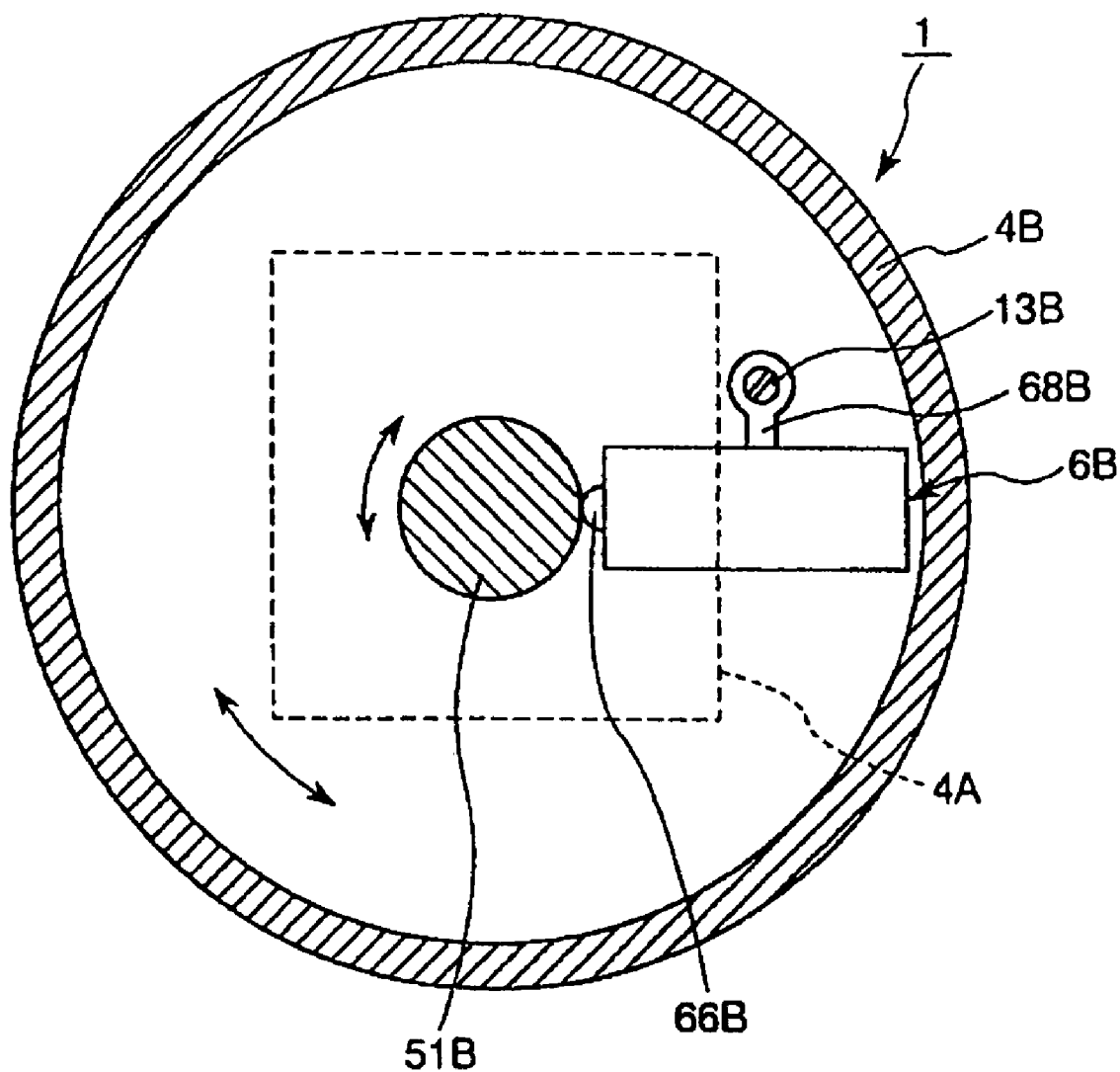
FIG. 34 is a cross-sectional view taken along line D—D of the operating apparatus shown in FIG. 34.
Figure 42:
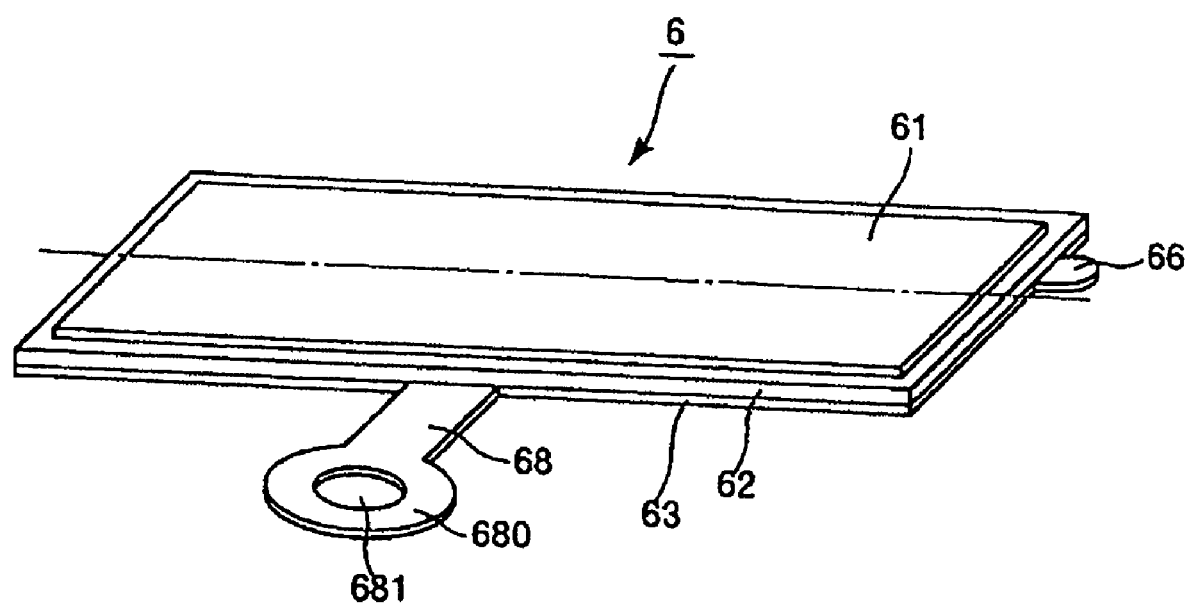
FIG. 42 is a cross-sectional view illustrating a variant of the operating apparatus shown in FIG. 40.

FIG. 42 is a perspective view illustrating a variant of the vibrating element shown in FIG. 19. As shown in FIG. 34, the vibrating element 6 may be constructed so that a piezoelectric element 62 is provided on one face (one side) of a reinforcing plate 63 and a single electrode 61 is provided on the entire piezoelectric element 62.

According to such a structure, since complex vibration of longitudinal vibration and bending vibration is induced by unbalanced states of the vibrating element 6, it is possible to drive the contacted element 51 efficiently with a simplified construction of electrodes.

Further, since the piezoelectric element 62 and the electrode 61 are disposed on one face of the reinforcing plate 63, it is possible to simplify the structure of the vibrating element 6 and to make the thickness of the vibrating element 6 thinner. Therefore, it is possible to reduce a manufacturing cost of the operating apparatus 1.

Moreover, the constitution in which the piezoelectric element 62 and the electrode 61 are provided on one face of the reinforcing plate 63 can be applied to the vibrating elements (ultrasonic motors) such as one having various structures described above, and one having structures described later. A shape or a size of the vibrating element 6, a position of the contact portion 66, or the like is not especially limited.

In other words, in the present invention, the vibrating element 6 may have a structure (plan structure) in which the piezoelectric element 62 that undergoes extension and contraction by application of an AC voltage is provided on the reinforcing plate 63 (one face of the reinforcing plate 63) on which the contact portion 66 and the arm portion 68 are integrally formed.

Further, the vibrating element 6 in which the piezoelectric element 62 is provided on only one face of the reinforcing plate 63 can be applied to each embodiment described above or described later.

(Fifth Embodiment)

Next, a description will be given for an operating apparatus in a fifth embodiment of the present invention.

Figure 22:
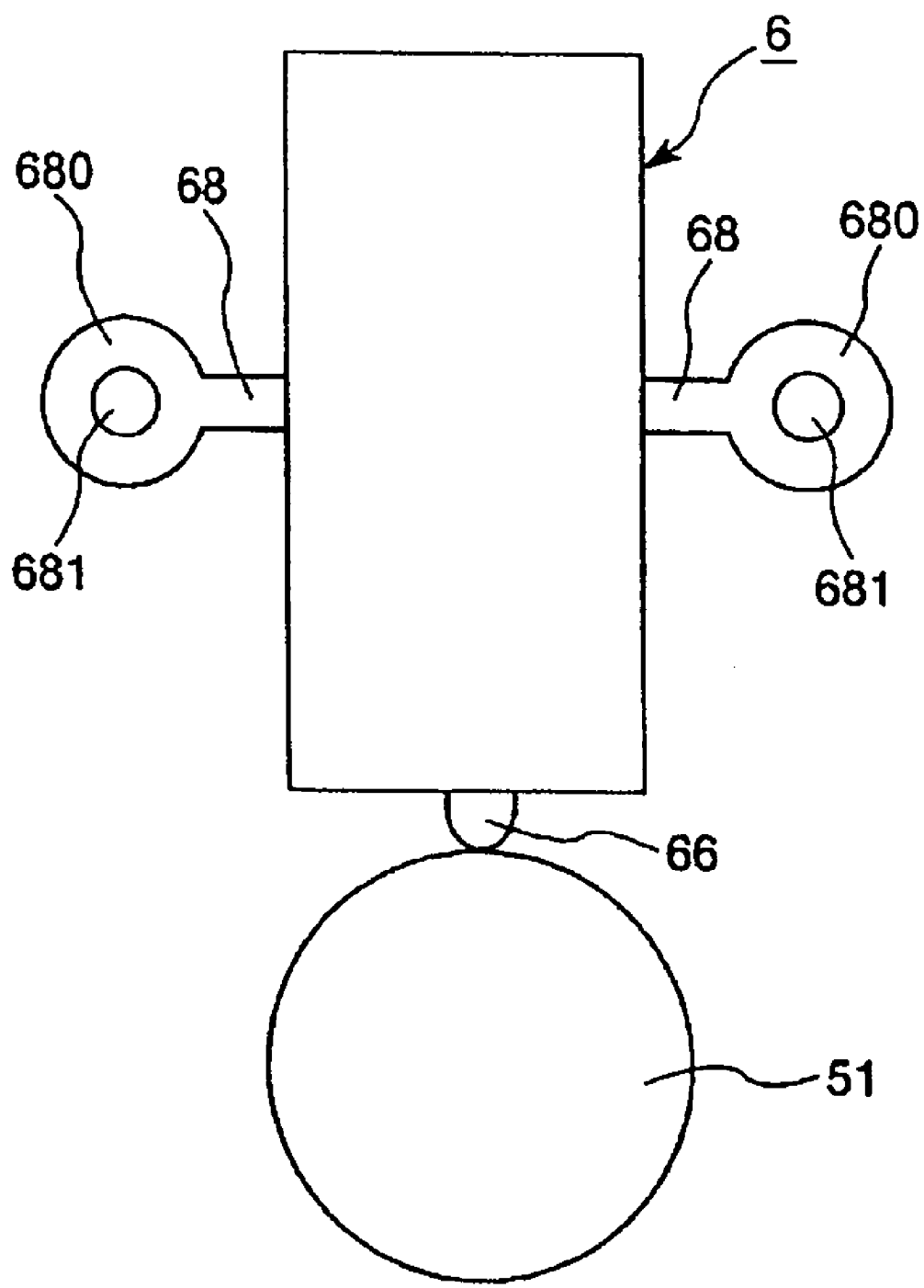
FIG. 22 is a plan view illustrating an ultrasonic motor in the fifth embodiment according to the present invention.

FIG. 22 is a plan view illustrating an ultrasonic motor of an operating apparatus in the fifth embodiment according to the present invention. Now, in following explanations using FIG. 29, an upper side is referred to as "upper," a lower side is referred to as "lower," a right side is referred to as "right," and a left side is referred to as "left."

Hereinafter, an operating apparatus 1 in the fifth embodiment will be described, focusing on different points between the above-mentioned first embodiment and the fifth embodiment. In this regard, explanation of items including the same matters and the like is omitted.

As shown in FIG. 22, in the operating apparatus 1 (ultrasonic motor) of the fifth embodiment according to the present invention, a pair of (two) arm portions 68, 68 each having elasticity (flexibility) are integrally formed on the reinforcing plate 63 of the vibrating plate 6.

The pair of arm portions 68, 68 are respectively provided at substantially central portions of both long sides in the longitudinal direction of the reinforcing plate 63 (a upper-and-lower direction in FIG. 22) so as to protrude in the direction substantially perpendicular to the longitudinal direction thereof and in mutually opposite directions via the reinforcing plate 63 (the body portion of the vibrating element 6) (i.e., they are symmetrical with respect to a vertical direction in FIG. 22).

According to the operating apparatus 1 of the fifth embodiment, it is possible to obtain effects similar to that of the first embodiment described above.

Further, since the pair of arm portions 68, 68 are provided on the vibrating element 6 in this operating apparatus 1, rigidity against the support can be enhanced, whereby it is possible to stably support the vibrating element 6 against external force such as reaction force of the drive or the like. Moreover, since the pair of arm portions 68, 68 are symmetrical, influence on the drive characteristics in both clockwise and counterclockwise directions in FIG. 22 (in right and left directions) can be uniformized. Therefore, the constitution where drive characteristics in both forward and reverse directions are equal can be realized.

Furthermore, each of the constitutions described in the second to fourth embodiments can be applied to this constitution of the fifth embodiment. It is preferable that the constitution of the third embodiment is applied to this constitution of the fifth embodiment.

(Sixth Embodiment)

Next, a description will be given for an operating apparatus in a sixth embodiment according to the present invention.

Hereinafter, an operating apparatus 1 in the sixth embodiment will be described, focusing on different points between the above-mentioned first embodiment and the sixth embodiment. In this regard, explanation of items including the same matters and the like is omitted.

In the operating apparatus 1 of the first embodiment described above, a driven element 5 having a cylinder-shaped contacted element 51 is driven (moved) using a vibrating element 6. However, the present invention is not limited to this structure. The operating apparatus 1 may be constructed so that a driven element 5 having other shape and structure is driven using the vibrating element 6. For example, the contacted element 51 of this operating apparatus 1 is the cylinder-shaped contacted element 51, but the present invention is not limited to this constitution. The contacted element 51 may be a rotational structure having a cylinder shape, a shape having cross-sectional surface of sector form, circular arc form, or the like (not shown in the drawings).

(Seventh Embodiment)

Figure 23:
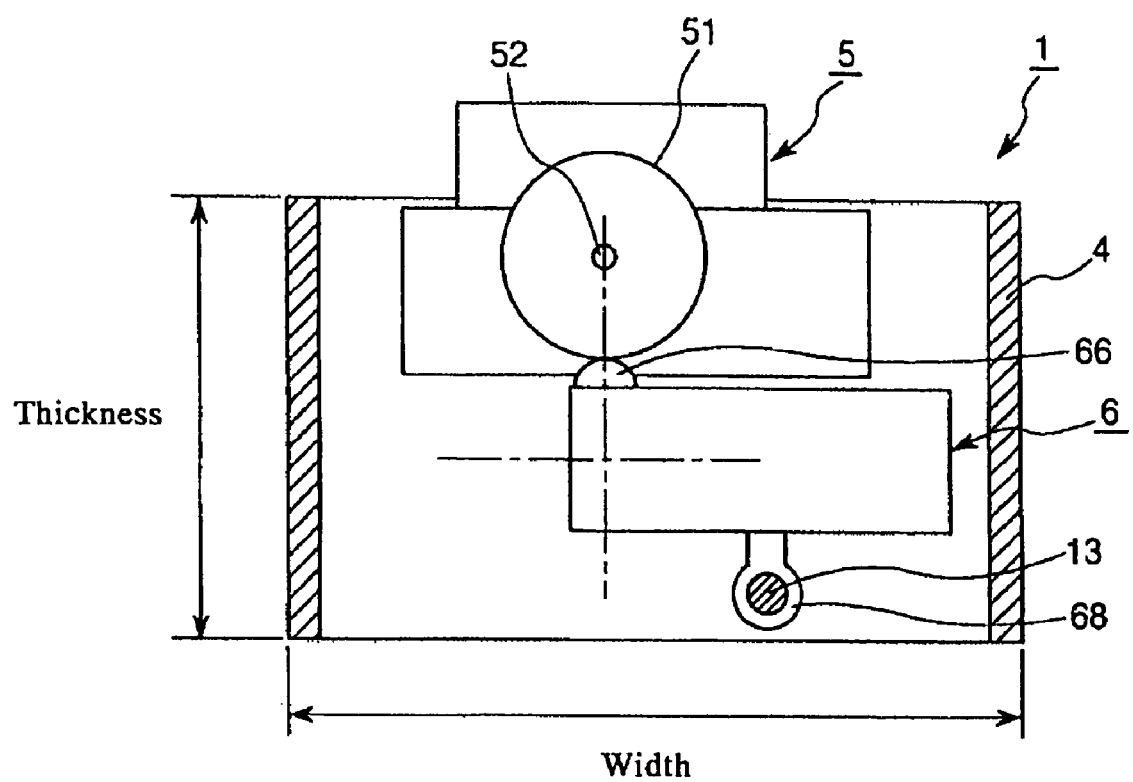
FIG. 23 is a cross-sectional view of a main part of an operating apparatus in a seventh embodiment according to the present invention.

FIG. 23 is a cross-sectional view of a main part of an operating apparatus in a seventh embodiment according to the present invention. In FIG. 23, the same parts (components) as those of the operating apparatus 1 in the embodiments described above are designated as the same reference numerals, and explanations thereof will be omitted. The operating apparatus 1 has a characteristic on the point that the constitution and arrangement of the vibrating element 6 are improved in comparison with the operating apparatus 1 in the first embodiment (see FIG. 6). The vibrating element 6 of the operating apparatus 1 in the first embodiment has the contact portion 66 on a substantially central portion of the short side thereof. Further, the contacted element 51 is arranged on a line extended to the longitudinal direction of the vibrating element 6 (see FIG. 3). Such a structure is preferable because the thickness of the operating apparatus 1 can be minimized. On the other hand, in this operating apparatus 1 of the seventh embodiment, the vibrating element 6 has a contact portion 66 on one end portion of the long side thereof. Further, the contacted element 51 is arranged at a position offset from the side of the vibrating element 6, i.e., the line extended to the longitudinal direction of the vibrating element 6 (see FIG. 23). Thus, since the vibrating element 6 and the contacted element 51 can be arranged so as to overlap each other on a same plane with respect to a width direction of the operating apparatus 1 (namely, the vibrating element 6 and the contacted element 51 are arranged so as to overlap each other when viewed from a top of the operating apparatus 1), it is possible to minimize the width of the operating apparatus 1. In this regard, whether the configuration of the vibrating element 6 and the contacted element 51 in the operating apparatus 1 is adopted from that of the first embodiment or the seventh embodiment may be appropriately selected within an obvious scope of one skilled in the art in accordance with the installing location of the operating apparatus 1 or the intended use thereof.

(Eighth Embodiment)

Figure 24:
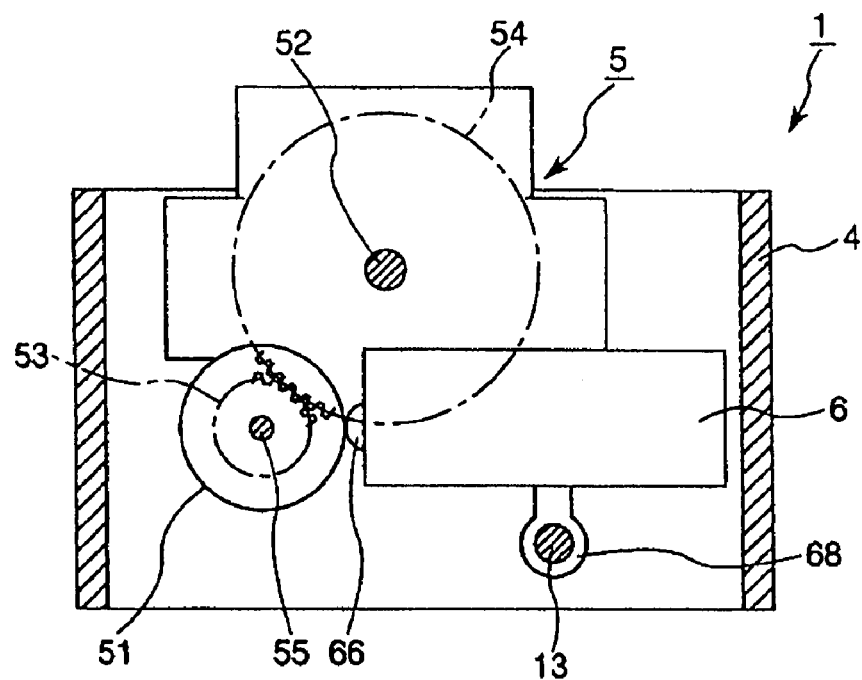
FIG. 24 is a cross-sectional view of a main part of an operating apparatus in an eighth embodiment according to the present invention.

FIG. 24 is a cross-sectional view of a main part of an operating apparatus in an eighth embodiment according to the present invention. In FIG. 24, the same parts (components) as those of the operating apparatus 1 in the embodiments described above are designated as the same reference numerals, and explanations thereof will be omitted. The operating apparatus 1 has a characteristic on the point that the contacted element 5 has a decelerating mechanism in comparison with the operating apparatus 1 in the first embodiment (see FIG. 6). The decelerating mechanism is constituted from a small gear 53 and a large gear 54, which lie between the contacted element 51 and the driven element 5. The small gear 53 is arranged on the same axis as a rotational axis of the contacted element 51, and fixedly provided with respect to the contacted element 51. The small gear 53 and the contacted element 51 are rotatably provided on the inner wall surface of the frame 4 via the shaft 55. The small gear 53 is in meshing engagement with the large gear 54. The large gear 54 is arranged on the same axis as a rotational axis of the driven element 5, and fixedly provided on the side surface of the box portion of the driven element 5. The large gear 54 and the driven element 5 are rotatably provided on the inner wall surface of the frame 4 via the shaft 52.

Figure 25:
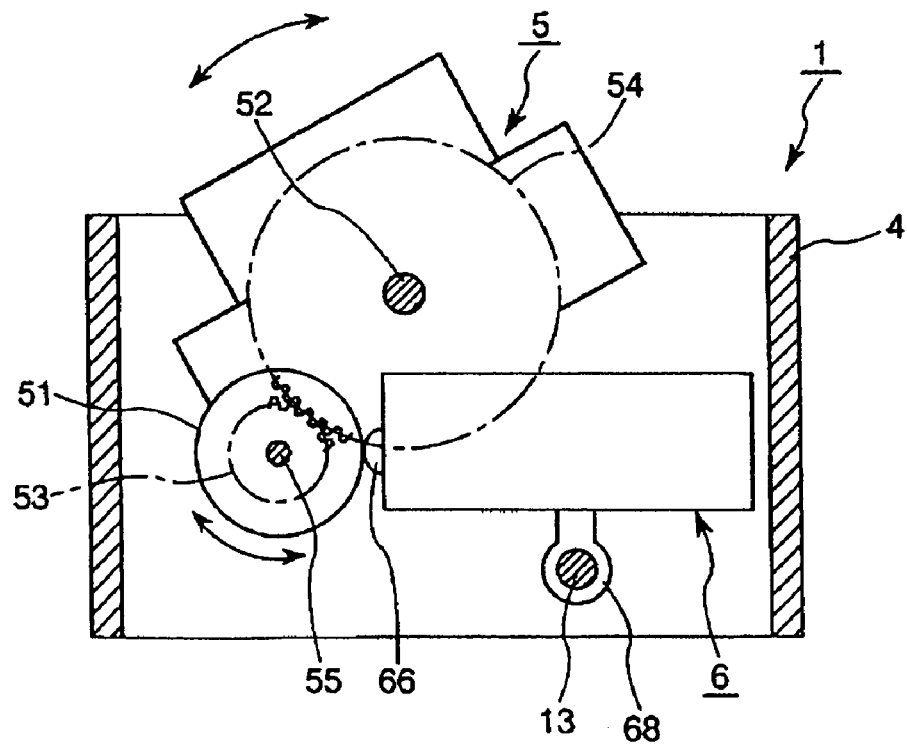
FIG. 25 is an explanatory drawing showing an action of the operating apparatus shown in FIG. 24.

FIG. 25 is an explanatory drawing showing an action of the operating apparatus shown in FIG. 24. In this operating apparatus 1, when the vibrating element 6 undergoes vibration by application of a high-frequency alternating current from an outer conducting circuit 20 (not shown), the contacted element 51 rotates by being struck by means of the contact portion 66 of the vibrating element 6. Then, the small gear 53 is rotated together with the contacted element 51 to transmit power thereof to the large gear 54, whereby the large gear 54 rotates at a lower speed than that of the small gear 53. The driven element 5 is rotated together with the large gear 54, thereby changing an imaging direction of the optical system 2. According to the operating apparatus 1, it is possible drive the driven element 5 with great torque by means of the decelerating mechanism. Further, it is possible to arbitrarily change the arrangement of the vibrating element 6 with respect to the driven element 5 by changing the arrangement or size of the gears 53, 54 that lie between the driven element 5 and the contacted element 51. This makes it possible to freely enhance flexibility (degree of freedom) of the arrangement of the vibrating element 6.

(Ninth Embodiment)

Figure 26:
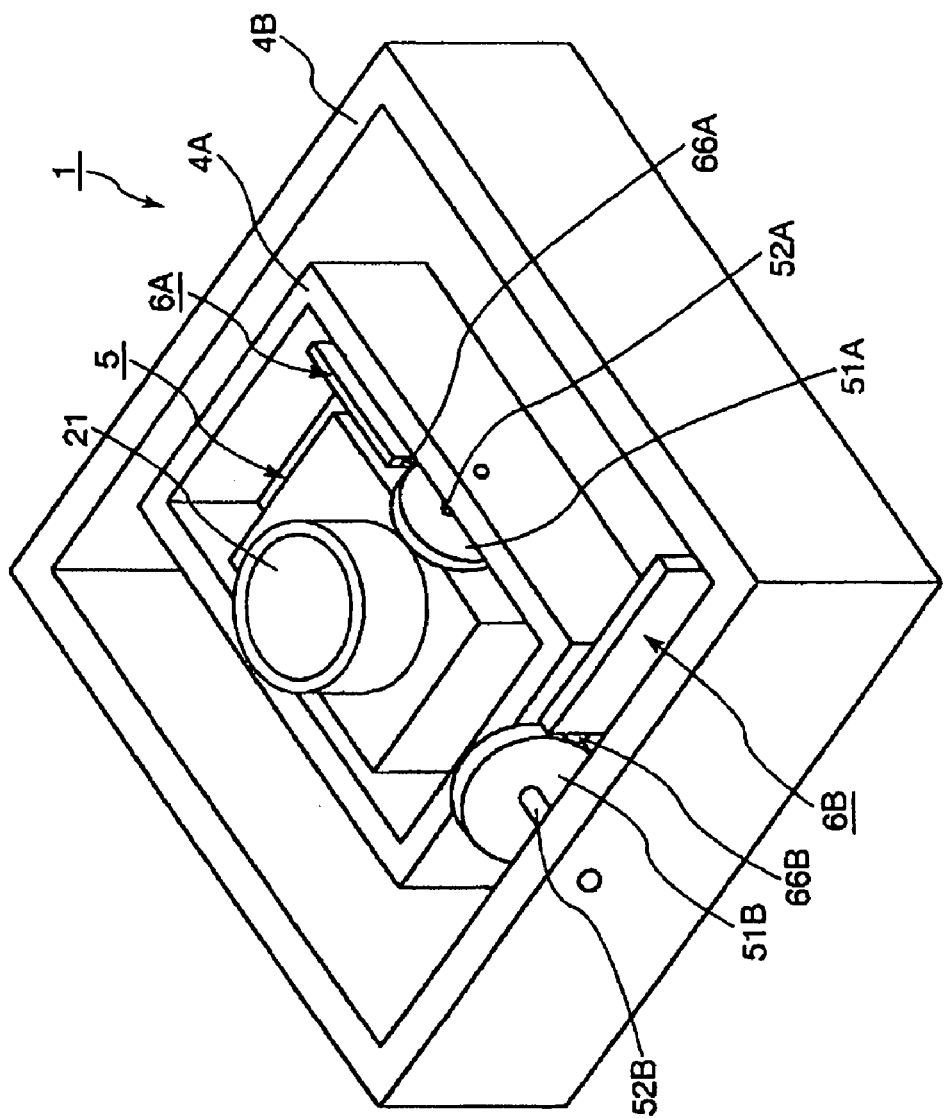
FIG. 26 is a perspective view illustrating an operating apparatus in a ninth embodiment according to the present invention.
Figure 27:
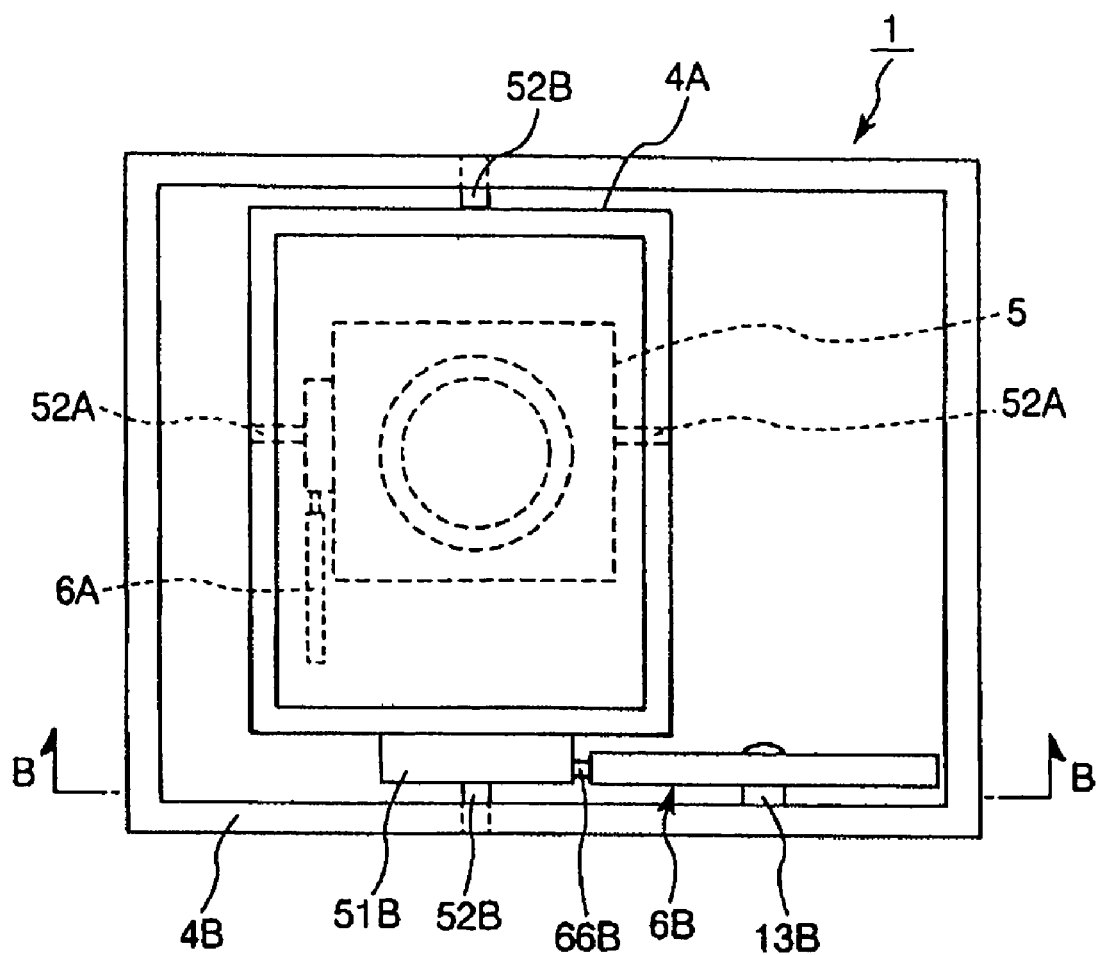
FIG. 27 is a plan view illustrating the operating apparatus shown in FIG. 26.
Figure 28:
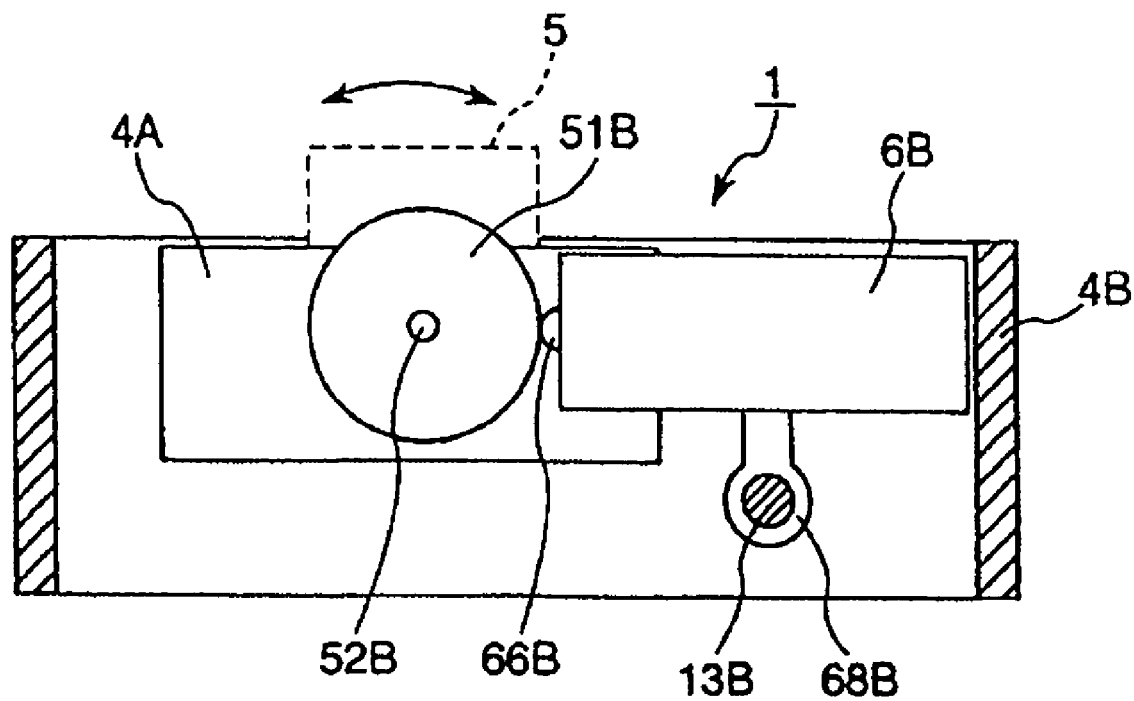
FIG. 28 is a cross-sectional view taken along line B—B of the operating apparatus shown in FIG. 27.

FIG. 26 is a perspective view illustrating an operating apparatus in a ninth embodiment according to the present invention. FIG. 27 is a plan view illustrating the operating apparatus shown in FIG. 26. FIG. 28 is a cross-sectional view taken along line B—B of the operating apparatus shown in FIG. 27. In these drawings, the same parts (components) as those of the operating apparatus 1 in the embodiments described above are designated as the same reference numerals, and explanations thereof will be omitted. The operating apparatus 1 has a characteristic on the point that a pan-tilt mechanism is realized by two frames 4A, 4B constituting dual structure in comparison with the operating apparatus 1 in the first embodiment (see FIG. 6). Namely, the operating apparatus 1 has a first frame 4A receiving the contacted element 51 and a second frame 4B receiving the first frame 4A. Hereinafter, a symbol "A" is appended to a reference numeral of each of components corresponding to the first frame, and a symbol "B" is appended to a reference numeral of each of components corresponding to the second frame.

The first frame 4A of the operating apparatus 1 has a contacted element 51 and two shafts 52B, 52B on outer circumferential wall surfaces perpendicular to the rotational axis of the driven element 5 (see FIG. 27). The first frame 4a is rotatably supported in the second frame 4B through these shafts 52B, 52B. In this regard, the constitution of the first frame 4A in the operating apparatus 1 is the same as that of the operating apparatus 1 in the first embodiment. Further, the constitution of the driven element 5, the first contacted element 51A and the first vibrating element 6A in the first frame 4A may be adopted from that in any one of the embodiments described above. In the operating apparatus 1, the driven element 5 and the first frame 4A are in a freely rotatable state, and the second frame 4B is fixedly mounted at a predetermined position of a cradle, a wall surface or the like (not shown in the drawings).

Next, the second frame 4B has a second vibrating element 6B on a wall surface on which the second contacted element 51B is mounted. The second vibrating element 6B is fixedly mounted on this wall surface through the second arm portion 68B by means of a second bolt 13B. Further, the second contact portion 66B of the second vibrating element 6B resiliently biases toward the circumferential surface of the second contacted element 51B by means of elasticity of the second arm portion 68B. In this regard, a relationship between the second contacted element 51B and the second vibrating element 6B in the second frame 4B is the same as that between the contacted element 51 and the vibrating element 6 in the first embodiment.

In this operating apparatus 1, first, when the second vibrating element 6B undergoes vibration by application of a high-frequency alternating current from an outer conducting circuit (not shown), the second contacted element 51B rotates by being struck by means of the second contact portion 66B of the second vibrating element 6B. Then, the first frame 4A is rotated around the shafts 52B by the rotation of the second contacted element 51B (see FIG. 28). The action of the first frame 4A is the same as a case where the driven element and the frame 4 are respectively replaced to the first frame 4A and the second frame 4B. On the other hand, the driven element 5 in the first frame 4A rotates with respect to a rotational axis (i.e., around the shaft 52A) perpendicular to the rotational axis of the first frame 4A (namely, the first frame 4A rotates around the shaft 52B). The action of this driven element 5 is the same as that of the driven element 5 of the operating apparatus 1 in the first embodiment. Further, rotation angles of the first frame 4A and the driven element 5 can be arbitrarily adjusted by independently controlling the first and second vibrating elements 6A, 6B, respectively. Since this makes it possible to arbitrarily drive the driven element 5 around the shaft 52A and/or the shaft 52B that are perpendicular to each other, it is possible to freely adjust the imaging direction of the driven element 5.

Figure 29:
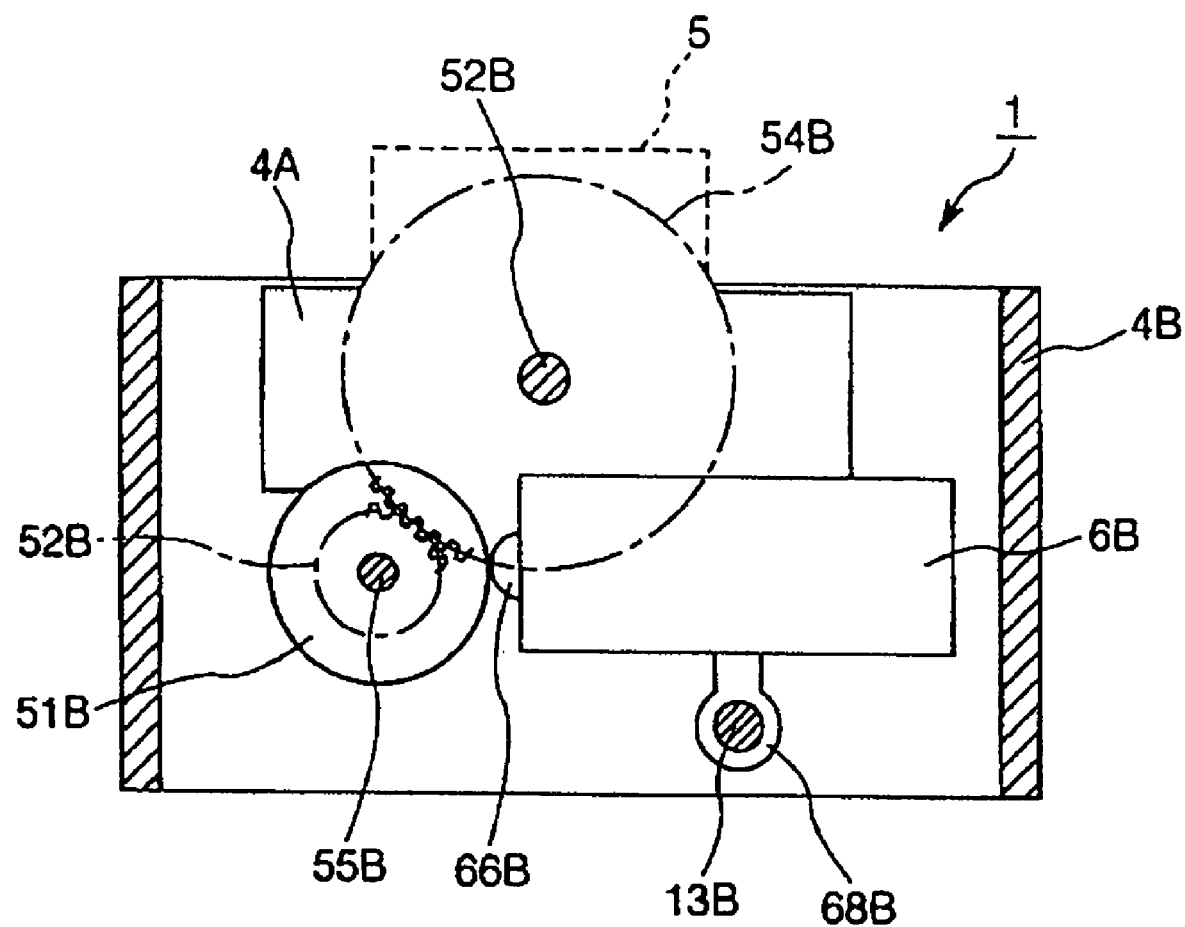
FIG. 29 is a cross-sectional view illustrating a variant of the operating apparatus shown in FIG. 26.

In this case, a variant of the relationship between the driven element 5, the frame 4 and the vibrating element 6 in the operating apparatus 1 of each of the embodiments described above may be applied to the relationship between the first frame 4A, the second frame 4B and the first and second vibrating elements 6A, 6B within an obvious scope of one skilled in the art. FIG. 29 is a cross-sectional view illustrating a variant of the operating apparatus shown in FIG. 26. An example to which the variant of the operating apparatus 1 in the eighth embodiment is applied is shown in FIG. 29 (see FIG. 24). In this way, a decelerating mechanism may be provided between the first frame 4A and the second vibrating element 6B. This makes it possible to drive the first frame 4A with great torque.

(Tenth Embodiment)

Figure 30:
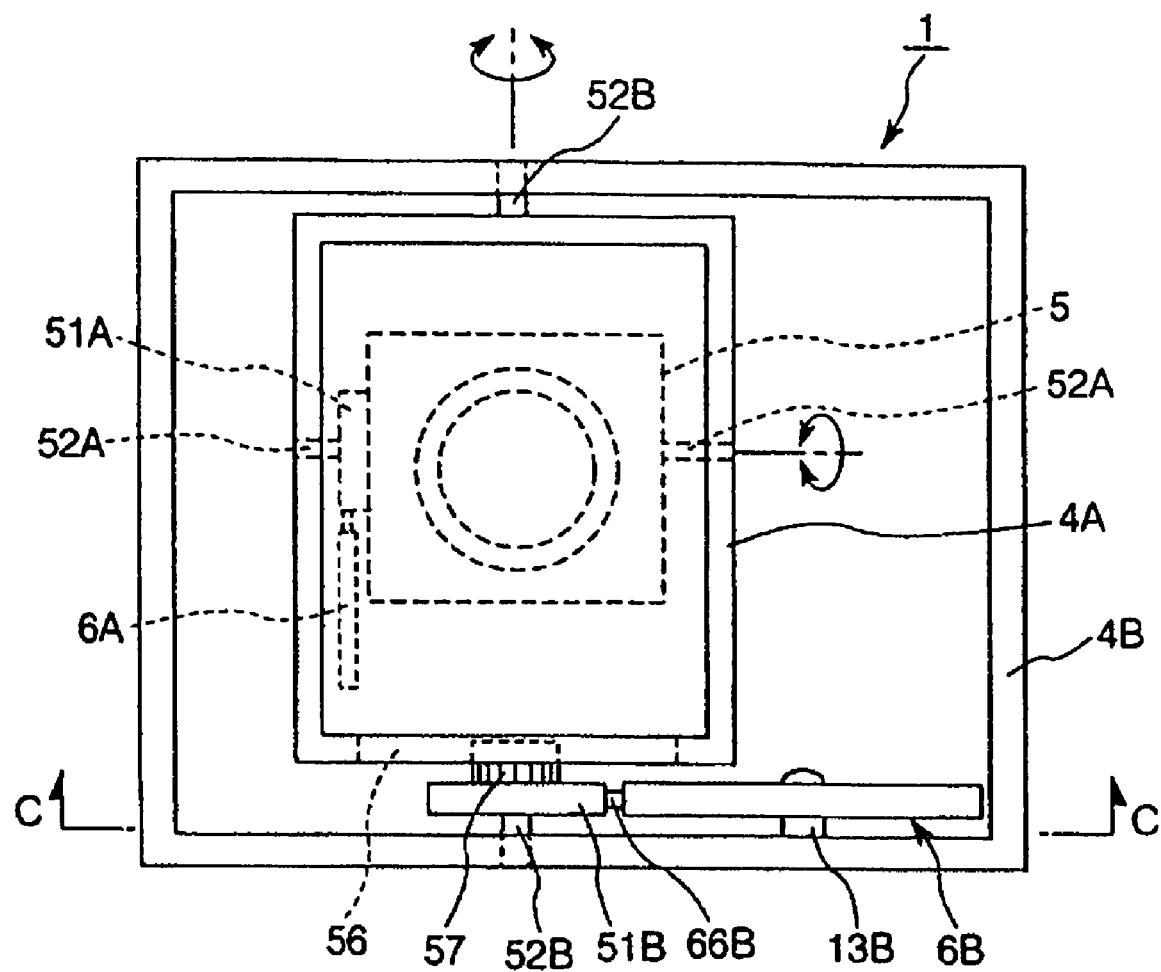
FIG. 30 is a plan view illustrating an operating apparatus in a tenth embodiment according to the present invention.
Figure 31:
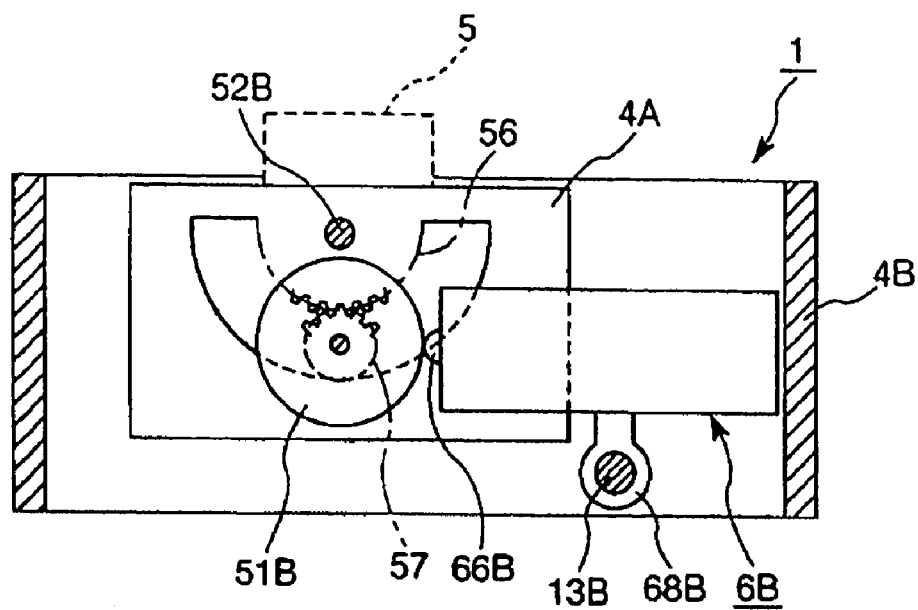
FIG. 31 is a cross-sectional view taken along line C—C of the operating apparatus shown in FIG. 30.

FIG. 30 is a plan view illustrating an operating apparatus in a tenth embodiment according to the present invention. FIG. 31 is a cross-sectional view taken along line C—C of the operating apparatus shown in FIG. 30. In these drawings, the same parts (components) as those of the operating apparatus 1 in the embodiments described above are designated as the same reference numerals, and explanations thereof will be omitted. In the operating apparatus 1, a first frame 4A has tooth grooves (or slits) 56 on the wall surface on which a second contacted element 51B is provided. A gear 57 is fixedly mounted on the same axis as that of the second contacted element 51B. Further, the second contacted element 51B is provided so that the gear 57 is in meshing engagement with the tooth grooves 56 of the first frame 4A.

Figure 32:
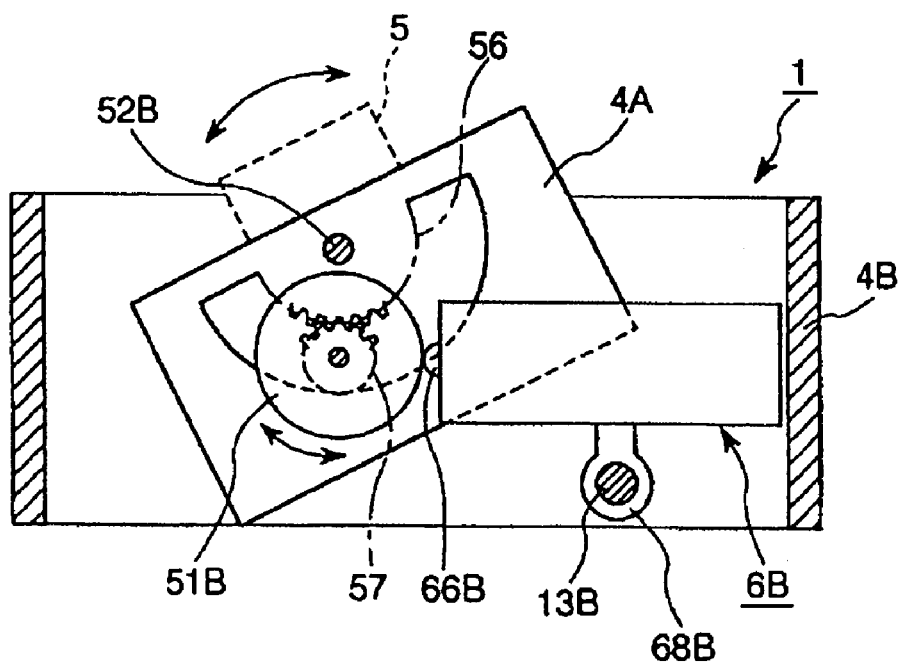
FIG. 32 is an explanatory drawing showing an action of the operating apparatus shown in FIG. 30.

FIG. 32 is an explanatory drawing showing an action of the operating apparatus shown in FIG. 30. In this operating apparatus 1, first, when the second vibrating element 6B undergoes vibration by application of a high-frequency alternating current from an outer conducting circuit (not shown), the second contacted element 51B rotates by being struck by means of the second contact portion 66B of the second vibrating element 6B. Then, the gear 57 is rotated together with the second contacted element 51B, and thus the tooth grooves 56 that is in meshing engagement with the gear 57 is fed. This makes the first frame 4A rotate around the shaft 52B, thereby rotatively displacing an imaging direction of the driven element 5. On the other hand, the driven element 5 rotatively displaces around the shaft 52A in the first frame 4A by means of vibration of the first vibrating element 6A independently (see FIG. 30). Further, rotation angles of the first frame 4A and the driven element 5 can be arbitrarily adjusted by independently controlling the first and second vibrating elements 6A, 6B, respectively. Since this makes it possible to arbitrarily drive the driven element 5 around the shaft 52A and/or the shaft 52B that are perpendicular to each other, it is possible to freely adjust the imaging direction of the driven element 5.

(Eleventh Embodiment)

Figure 33:
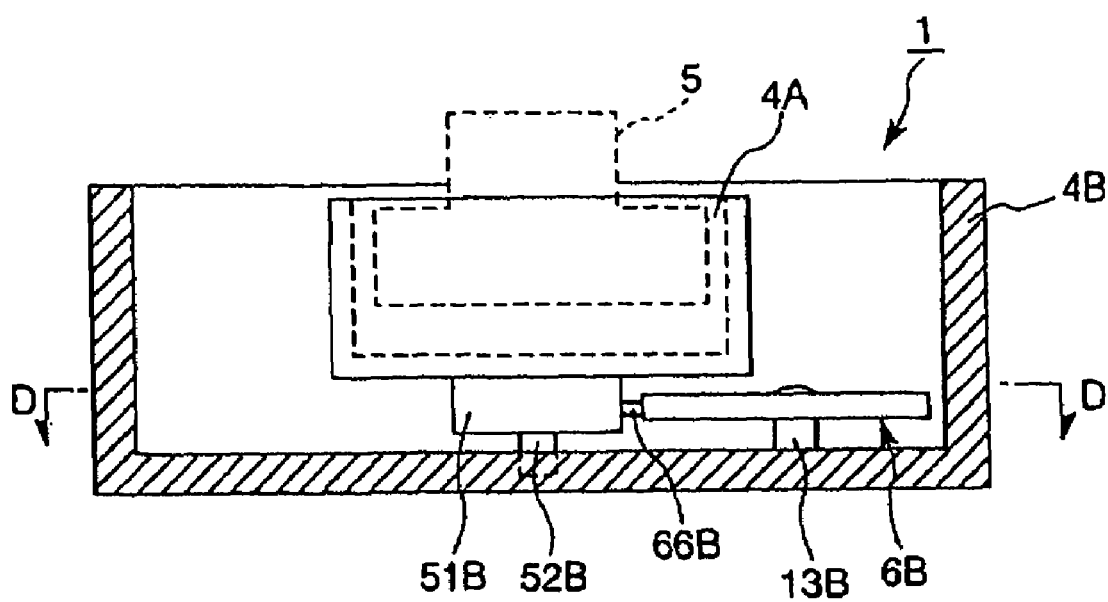
FIG. 33 is a cross-sectional view of a side face of an operating apparatus in an eleventh embodiment according to the present invention.

FIG. 33 is a cross-sectional view of a side face of an operating apparatus in an eleventh embodiment according to the present invention. FIG. 34 is a cross-sectional view taken along line D—D of the operating apparatus shown in FIG. 34. In these drawings, the same parts (components) as those of the operating apparatus 1 in the embodiments described above are designated as the same reference numerals, and explanations thereof will be omitted. In the operating apparatus 1, a second frame 4B has a cylindrical structure with a bottom portion, and a unit including a driven element 5 and a first frame 4A is arranged in the second frame 4B so that the unit is received in a substantial central portion of the second frame 4B. The first frame 4A has a box-shaped structure with a bottom portion, and a second contacted element 52B and a second shaft 52B are fixedly provided on the bottom portion thereof. Further, the first frame 4A is rotatably supported on the second frame 4B via the second shaft 52B. Each of the first frame 4A, the second contacted element 51B and the second shaft 52B has a same rotational axis, and the rotational axis (rotative shaft) is arranged substantially perpendicular to the bottom portion of the second frame 4B.

The second vibrating element 6B is arranged at a state where it is slightly floating in the air on a bottom surface of the second frame 4B so that a major surface of the second vibrating element 6B is substantially parallel to the bottom surface, and fixedly mounted on the second frame 4B through a second arm portion 68 thereof by means of a second bolt 13B. Further, the second contact portion 66B of the second vibrating element 6B resiliently biases toward a circumferential surface of the second contacted element 51B by means of elasticity of the second arm portion 68B. This makes it possible to obtain enough frictional force at the contact surface between the second contact portion 66B and the second contacted element 51B. In this regard, the constitution of the inside of the first frame 4A in the operating apparatus 1 is the same as that of the operating apparatus 1 in the first embodiment. Further, the constitution of the driven element 5, the first contacted element 51A and the first vibrating element 6A in the first frame 4A may be adopted from that in any one of the embodiments described above. In the operating apparatus 1, the driven element 5 and the first frame 4A are in a freely rotatable state, and the second frame 4B is fixedly mounted at a predetermined position of a cradle, a wall surface or the like (not shown in the drawings).

In this operating apparatus 1, first, when the second vibrating element 6B undergoes vibration by application of a high-frequency alternating current from an outer conducting circuit (not shown), the second contacted element 51B rotates by being struck by means of the second contact portion 66B of the second vibrating element 6B. Then, the first frame 4A is rotated around the second shaft 52B together with the second contacted element 51B, thereby rotatively displacing the driven element 5. Further, the driven element 5 rotatively displaces around the first shaft 52A in the first frame 4A independently, thereby changing a tilt angle of the driven element 5 (see FIG. 5). The first shaft 52A (i.e., a rotational axis of the driven element 5) is perpendicular to the second shaft 52B (i.e., a rotational axis of the first frame 4A). Thus, the operating apparatus 1 can arbitrarily change an imaging direction of the driven element 5 by rotating the driven element 5 around the first shaft 52A and/or the second shaft 52B.

Figure 35:
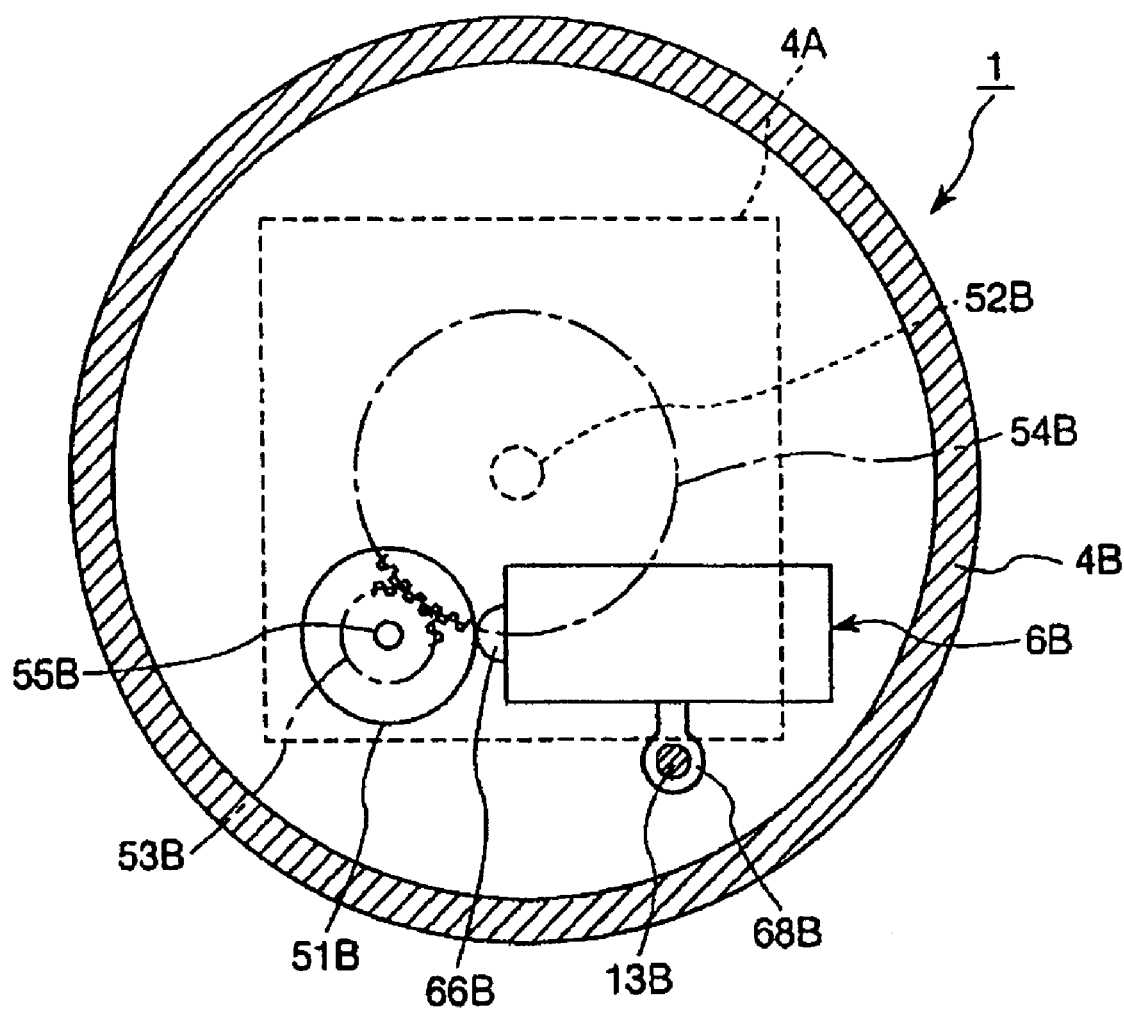
FIG. 35 is a cross-sectional view illustrating a variant of the operating apparatus shown in FIG. 33.

In this case, a variant of the relationship between the driven element 5, the frame 4 and the vibrating element 6 in the operating apparatus 1 of each of the embodiments described above may be applied to the relationship between the first frame 4A, the second frame 4B and the first and second vibrating elements 6A, 6B within an obvious scope of one skilled in the art. FIG. 35 is a cross-sectional view illustrating a variant of the operating apparatus shown in FIG. 33. An example to which the variant of the operating apparatus 1 in the eighth embodiment is applied is shown in FIG. 35 (see FIG. 24). In this way, a decelerating mechanism may be provided between the first frame 4A and the second vibrating element 6B. This makes it possible to drive the first frame 4A with great torque.

(Twelfth Embodiment)

Figure 36:
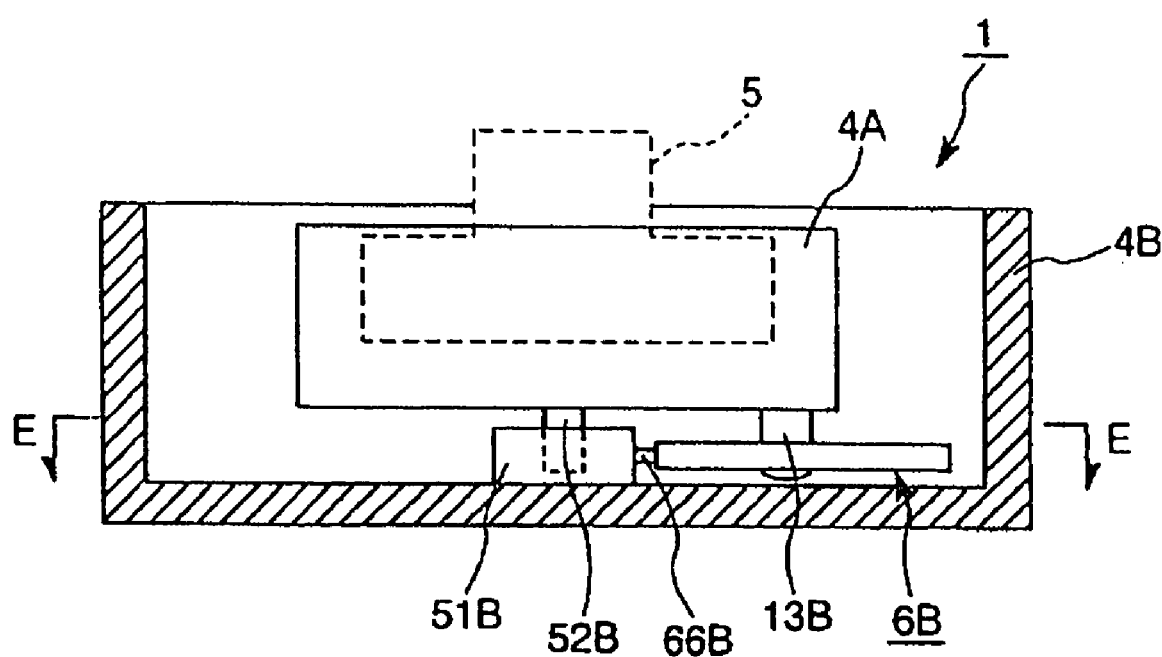
FIG. 36 is a cross-sectional view of a side face of an operating apparatus in a twelfth embodiment according to the present invention.
Figure 37:
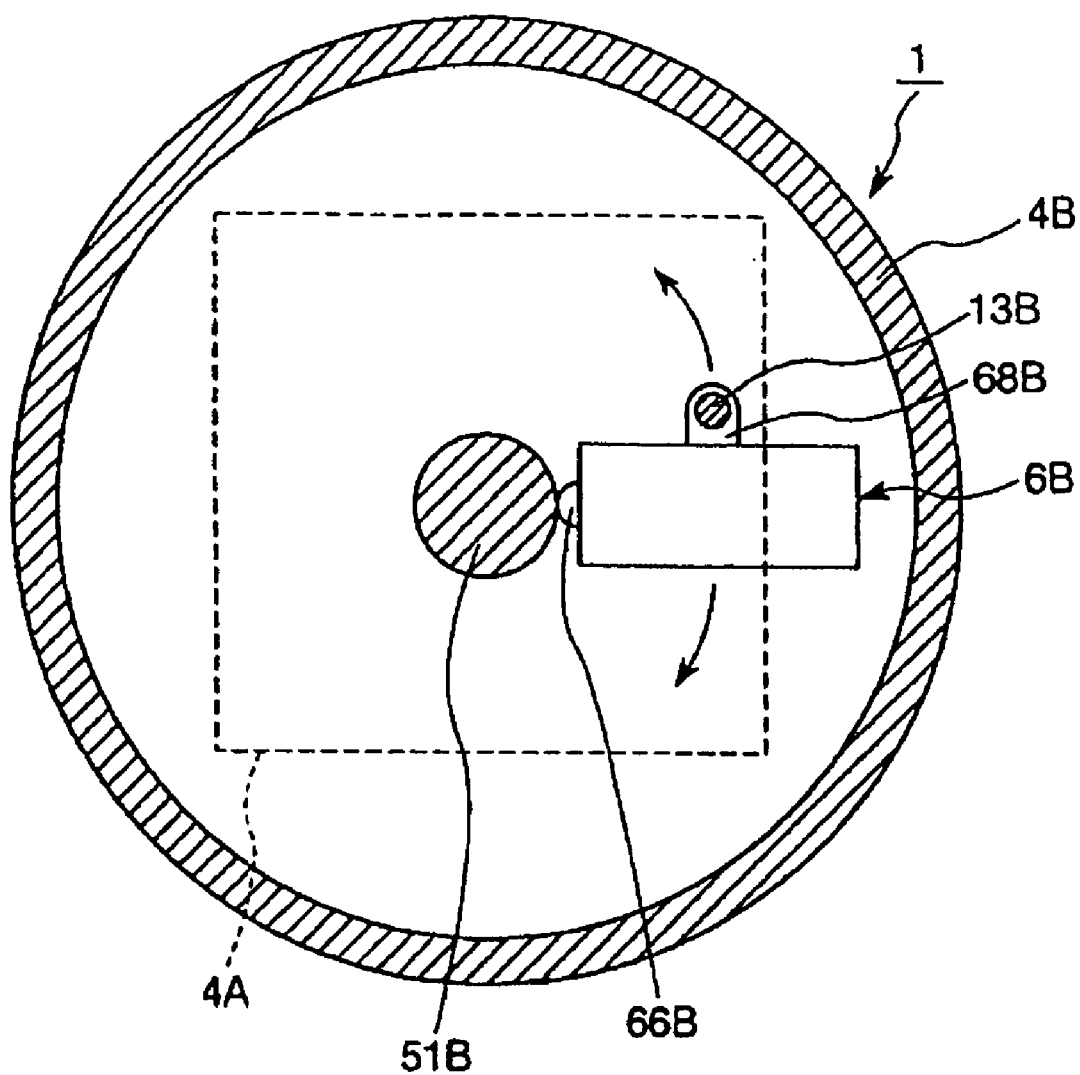
FIG. 37 is a cross-sectional view taken along line E—E of the operating apparatus shown in FIG. 36.

FIG. 36 is a cross-sectional view of a side face of an operating apparatus in a twelfth embodiment according to the present invention. FIG. 37 is a cross-sectional view taken along line E—E of the operating apparatus shown in FIG. 36. In these drawings, the same parts (components) as those of the operating apparatus 1 in the embodiments described above are designated as the same reference numerals, and explanations thereof will be omitted. The operating apparatus 1 has a characteristic on the point that a second contacted element 51B is mounted on a second frame 4B and a second vibrating element 6B is mounted on a first frame 4A in comparison with the operating apparatus 1 in the eleventh embodiment. In this regard, the constitution of the inside of the first frame 4A in the operating apparatus 1 is the same as that of the operating apparatus 1 in the first embodiment. Further, the constitution of the driven element 5, the first contacted element 51A and the first vibrating element 6A in the first frame 4A may be adopted from that in any one of the embodiments described above. In the operating apparatus 1, the driven element 5 and the first frame 4A are in a freely rotatable state, and the second frame 4B is fixedly mounted at a predetermined position of a cradle, a wall surface or the like (not shown in the drawings).

In this operating apparatus 1, first, the second vibrating element 6B undergoes vibration by application of a high-frequency alternating current from an outer conducting circuit (not shown) to repeatedly strike the second contacted element 51B on the circumferential surface by the second contact portion 66B of the second vibrating element 6B. Since the second contacted element 51B is fixed on the second frame 4B, the second vibrating element 6B itself is displaced by means of reactive force thereof based on frictional contact between the second contact portion 66B of the second vibrating element 6B and the second contacted element 51B. Since the second vibrating element 6B is fixed on the first frame 4A, the first frame 4A rotatively displaces around the second shaft 52B together with the second vibrating element 6B. In this regard, the second vibrating element 6B is arranged at a predetermined position on the first frame 4A so that the contact between the second contact portion 66B and the second contacted element 51B does not drop off when the first frame 4A rotates around the second shaft 52B. Further, the driven element 5 rotatively displaces around the first shaft 52A in the first frame 4A independently, thereby changing a tilt angle of the driven element 5 (see FIG. 5). The first shaft 52A (i.e., a rotational axis of the driven element 5) is perpendicular to the second shaft 52B (i.e., a rotational axis of the first frame 4A). Thus, the operating apparatus 1 can arbitrarily change an imaging direction of the driven element 5 by rotating the driven element 5 around the first shaft 52A and/or the second shaft 52B.

(Thirteenth Embodiment)

Figure 38:
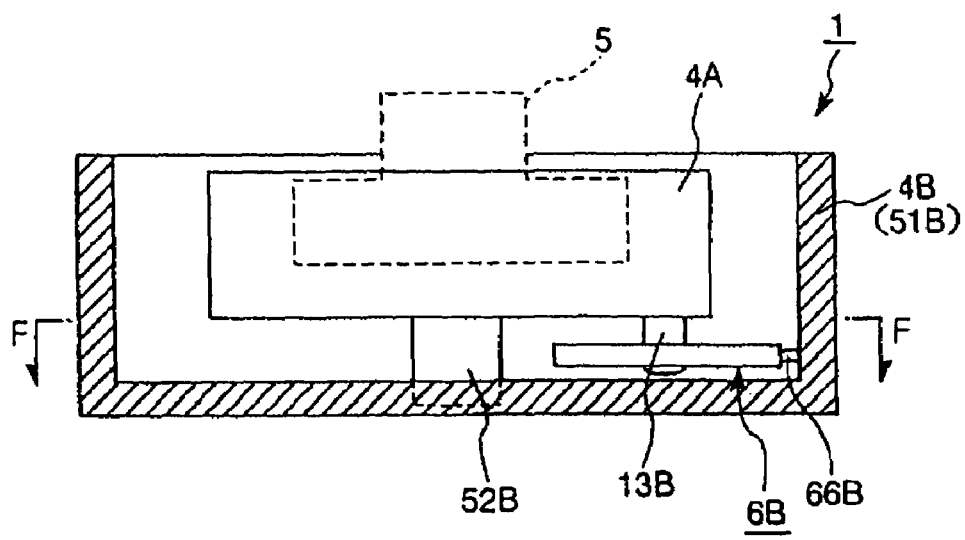
FIG. 38 is a cross-sectional view of a side face of an operating apparatus in a thirteenth embodiment according to the present invention.
Figure 39:
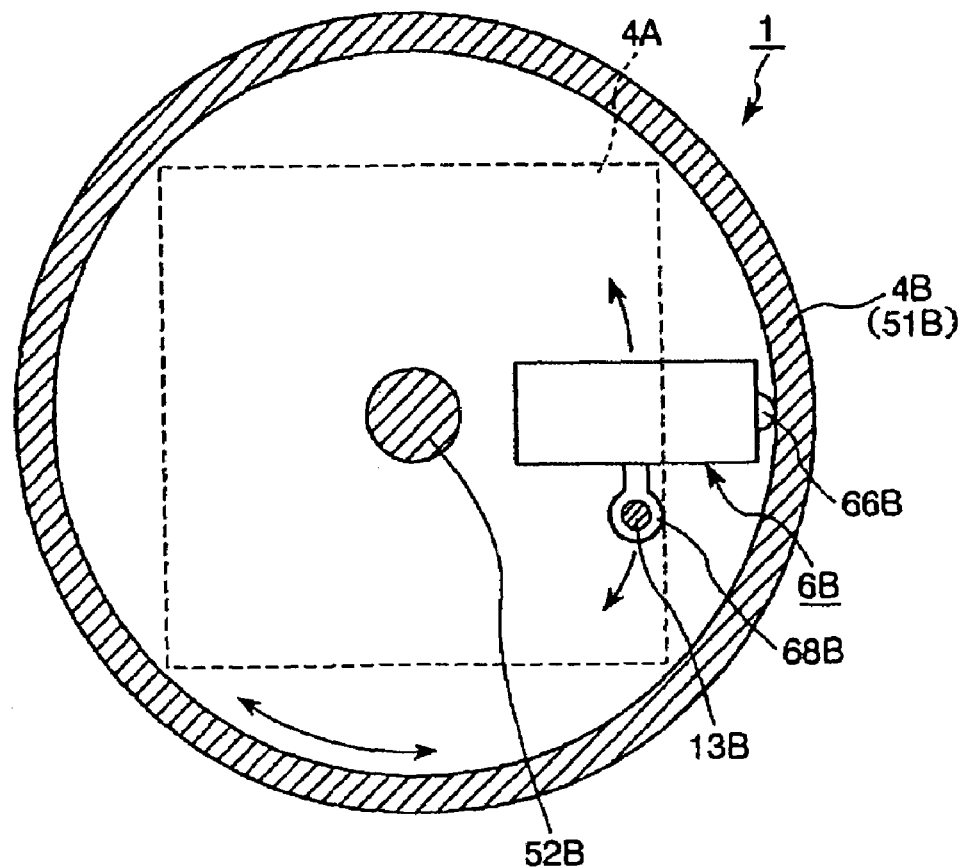
FIG. 39 is a cross-sectional view taken along line F—F of the operating apparatus shown in FIG. 38.

FIG. 38 is a cross-sectional view of a side face of an operating apparatus in a thirteenth embodiment according to the present invention. FIG. 39 is a cross-sectional view taken along line F—F of the operating apparatus shown in FIG. 38. In these drawings, the same parts (components) as those of the operating apparatus 1 in the embodiments described above are designated as the same reference numerals, and explanations thereof will be omitted. The operating apparatus 1 has a characteristic on the point that a second vibrating element 6B strikes a second frame 4B on a circumferential surface thereof in comparison with the operating apparatus 1 in the twelfth embodiment. Namely, in the operating apparatus 1, the second vibrating element 6B is fixedly mounted on a bottom surface of the second frame 4B so that a second contact portion 66B of the second vibrating element 6B faces toward the outside from a second shaft 52B in a radial direction of the second frame 4B. Further, an inner wall surface of the second frame 4B corresponds to a second contacted element 51B, and the second vibrating element 6B is in frictional contact with the inner wall surface of the second frame 4B.

In this operating apparatus 1, first, the second vibrating element 6B undergoes vibration by application of a high-frequency alternating current from an outer conducting circuit (not shown) to repeatedly strike the second contacted element 51B (i.e., the inner wall surface of the second frame 4B) by the second contact portion 66B of the second vibrating element 6B. Since the second frame 4B is fixed with respect to a first frame 4A, the second vibrating element 6B itself is displaced by means of reactive force thereof based on frictional contact between the second contact portion 66B of the second vibrating element 6B and the second contacted element 51B (i.e., the inner wall surface of the second frame 4B). Since the second vibrating element 6B is fixed on the first frame 4A, the first frame 4A rotatively displaces around the second shaft 52B together with the second vibrating element 6B. In this regard, the second vibrating element 6B is arranged at a predetermined position on the first frame 4A so that the contact between the second contact portion 66B and the second contacted element 51B does not drop off when the first frame 4A rotates around the second shaft 52B. Further, the driven element 5 rotatively displaces around the first shaft 52A in the first frame 4A independently, thereby changing a tilt angle of the driven element 5 (see FIG. 5). The first shaft 52A (i.e., a rotational axis of the driven element 5) is perpendicular to the second shaft 52B (i.e., a rotational axis of the first frame 4A). Thus, the operating apparatus 1 can arbitrarily change an imaging direction of the driven element 5 by rotating the driven element 5 around the first shaft 52A and/or the second shaft 52B.

(Fourteenth Embodiment)

Figure 40:
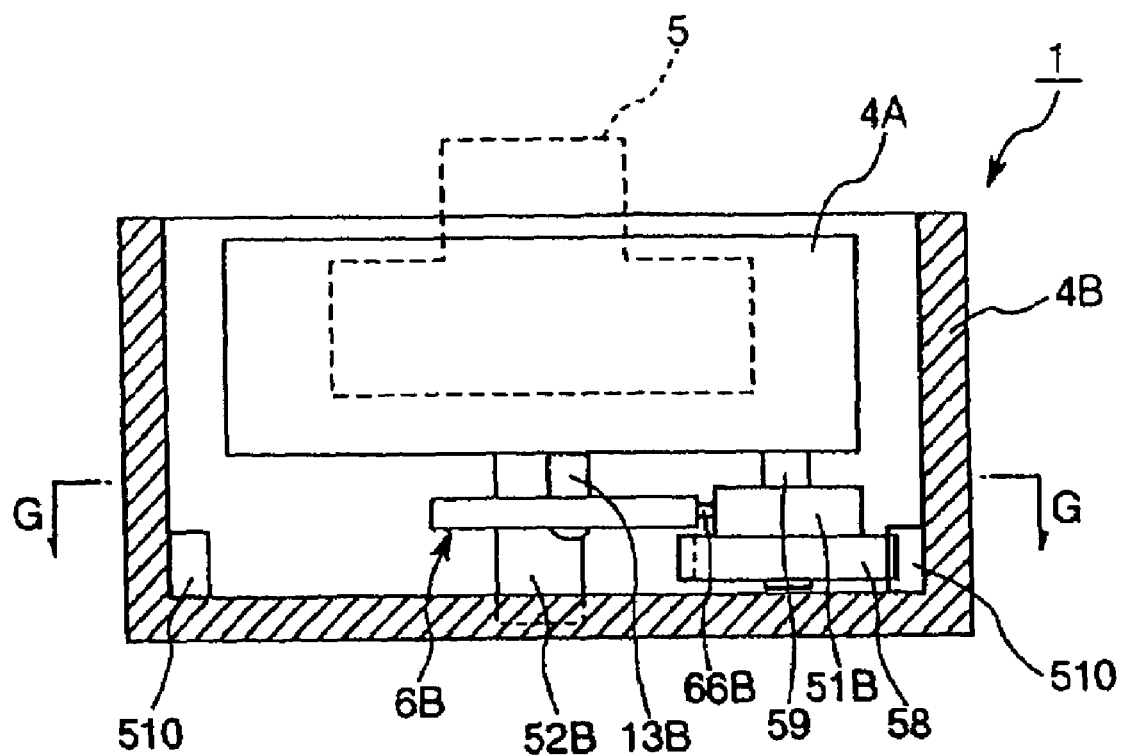
FIG. 40 is a cross-sectional view of a side face of an operating apparatus in a fourteenth embodiment according to the present invention.
Figure 41:
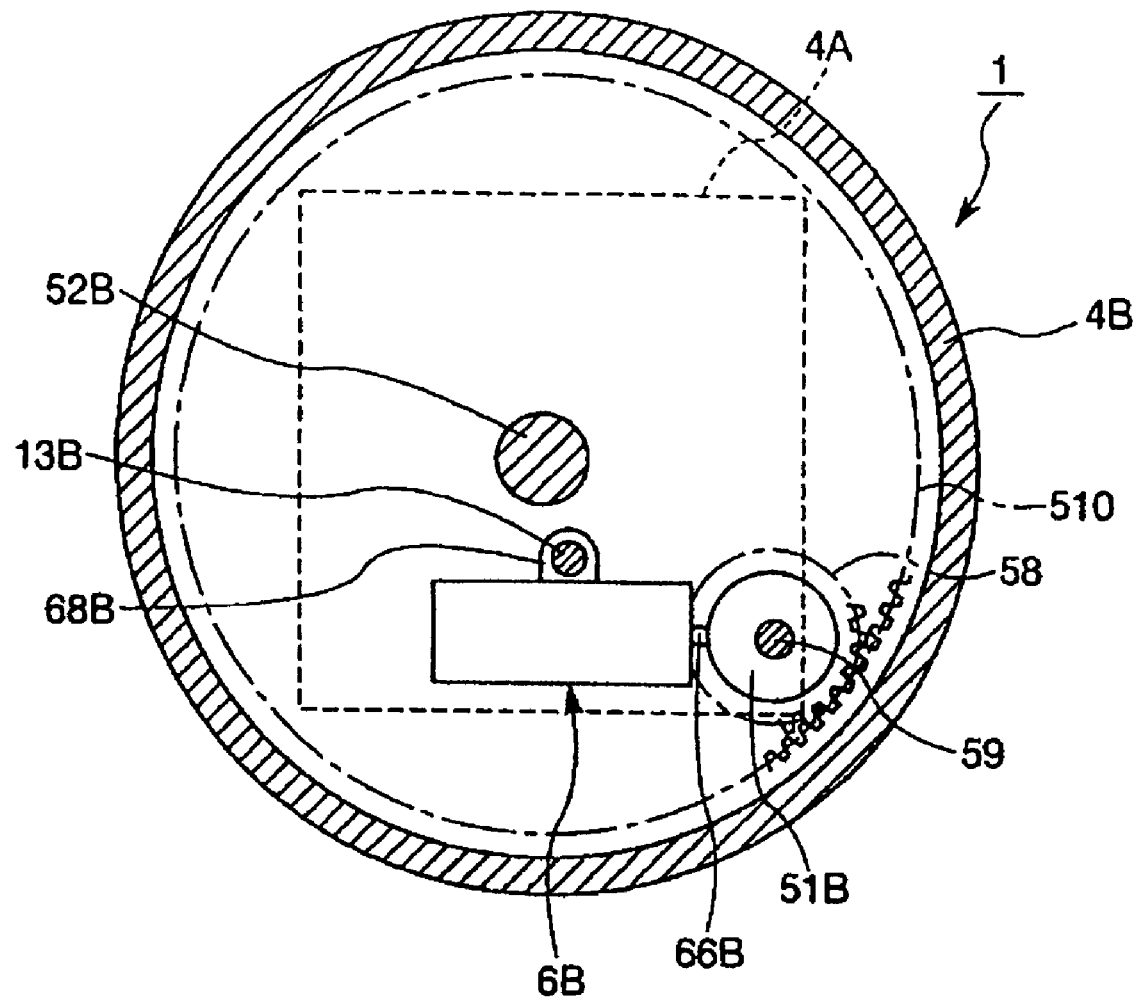
FIG. 41 is a cross-sectional view taken along line G—G of the operating apparatus shown in FIG. 40.

FIG. 40 is a cross-sectional view of a side face of an operating apparatus in a fourteenth embodiment according to the present invention. FIG. 41 is a cross-sectional view taken along line G—G of the operating apparatus shown in FIG. 40. In these drawings, the same parts (components) as those of the operating apparatus 1 in the embodiments described above are designated as the same reference numerals, and explanations thereof will be omitted. The operating apparatus 1 has a characteristic on the point that a decelerating mechanism is provided between a second vibrating element 6B and a second frame 4B in comparison with the operating apparatus 1 in the thirteenth embodiment. Similar to the thirteenth embodiment, in the operating apparatus 1, the second vibrating element 6B is fixedly mounted on a bottom surface of the second frame 4B so that a second contact portion 66B of the second vibrating element 6B faces toward the outside from a second shaft 52B in a radial direction of the second frame 4B. Further, a second contacted element and a gear 58 are mounted on a bottom surface of the second frame 4B through a shaft 59. The second contacted element 51B and the gear 58 are provided on a same axis so that the shaft 59 is a rotational axis and fixed mutually. The second contact portion 66B of the second vibrating element 6B is in frictional contact with a circumferential surface of the second contacted element 51B. On the other hand, tooth grooves 510 are provided on the inner wall surface of the second frame 4B. The gear 58 is arranged so as to engage with the tooth grooves 510.

In this operating apparatus 1, first, the second vibrating element 6B undergoes vibration by application of a high-frequency alternating current from an outer conducting circuit (not shown) to repeatedly strike the second contacted element 51B by the second contact portion 66B of the second vibrating element 6B. Then, the second contacted element 51B is rotated around the shaft 59, and the gear 58 rotates together with the second contacted element 51B. In this case, since the gear 58 is in meshing engagement with the tooth grooves 510 and the second frame 4B on which the tooth grooves 510 are provided is fixed, the gear 58 itself is fed by means of reactive force thereof, and therefore the entire first frame 4A rotatively displaces around the second shaft 52B. In this regard, the gear 58 is arranged at a predetermined position on the bottom of the first frame 4A so that the contact between the gear 58 and the tooth grooves 510 does not drop off when the first frame 4A rotates around the second shaft 52B. Further, the driven element 5 rotatively displaces around the first shaft 52A in the first frame 4A independently, thereby changing a tilt angle of the driven element 5 (see FIG. 5). The first shaft 52A (i.e., a rotational axis of the driven element 5) is perpendicular to the second shaft 52B (i.e., a rotational axis of the first frame 4A). Thus, the operating apparatus 1 can arbitrarily change an imaging direction of the driven element 5 by rotating the driven element 5 around the first shaft 52A and/or the second shaft 52B.

(Fifteenth Embodiment)

Figure 43:
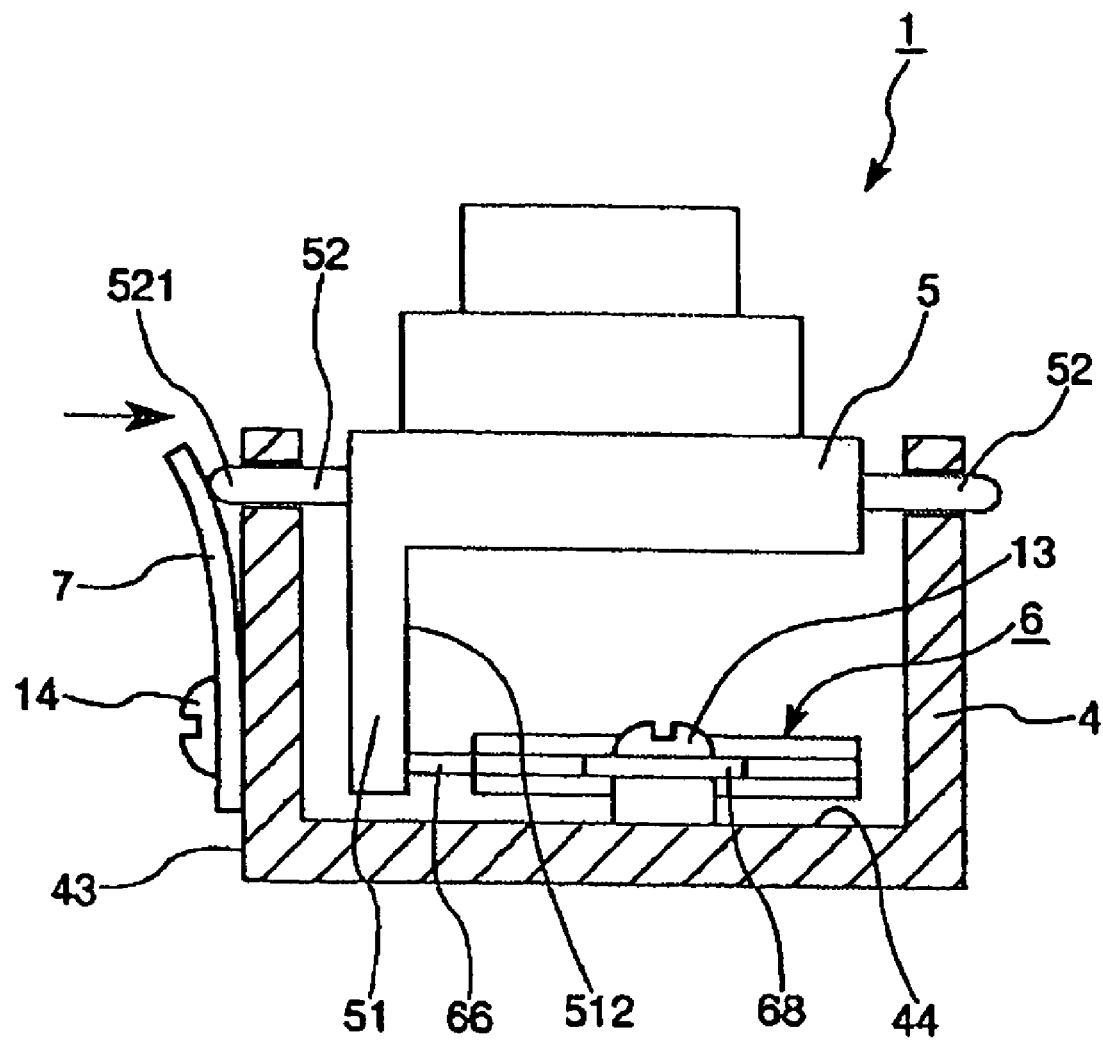
FIG. 43 is a cross-sectional view of a side face of an operating apparatus in a fifteenth embodiment according to the present invention.

FIG. 43 is a cross-sectional view of a side face of an operating apparatus in a fifteenth embodiment according to the present invention. In FIG. 43, the same parts (components) as those of the operating apparatus 1 in the embodiments described above are designated as the same reference numerals, and explanations thereof will be omitted. In comparison with the operating apparatus 1 in the first embodiment described above, the operating apparatus 1 has a characteristic on the point to be provided with a leaf spring (elastic member) 7 as pushing means for pushing one of a contacted element 51 and a vibrating element 6 toward the other, i.e., pushing means for pushing the contacted element 51 of the driven element 5 (described later) toward a contact portion 66 of the vibrating element 6 by pushing the driven element 5.

The driven element 5 is supported in the frame 4 via shafts 52, 52 so as to be able to rotate around the shafts 52, 52 and to displace in an axial direction of the shaft 52. Further, one shaft 52 that is positioned at a side of the contact portion 66 of the vibrating element 6 protrudes through the frame 4 toward the outside of the frame 4. A plate-shaped contacted element 51 is formed at an end portion of the driven element 5 on which the contact portion 66 of the vibrating element 6 abuts and on the lower side of the driven element 5 in FIG. 43. The contacted element 51 has a substantially semicircular-shaped structure when viewed from a side of the operating apparatus 1 in FIG. 43 (i.e., when viewed from an axial direction of the shaft 52).

The vibrating element 6 is provided close to a bottom surface 44 of the frame 4. In particular, since the vibrating element 6 has a thin plate-shaped structure, it is preferable for such a configuration. Further, the vibrating element 6 is arranged so that a longitudinal direction thereof faces toward the axial direction of the shaft 52 and the contact portion 66 is in frictional contact with a surface 512 of the contacted element 51 at a right side in FIG. 43.

The leaf spring 7 is fixedly provided on an outer wall surface 43 of the frame 4 at a side of the contact portion 66 of the vibrating element 6 so that a base end side of the leaf spring 7 is fixed on the frame 4 via a bolt (fixing member) 14. In this case, the leaf spring 7 is arranged at a state where a tip portion thereof abuts on a tip portion (protruding portion) 521 of the shaft 52 that is positioned at the side of the contact portion 66 of the vibrating element 6 and therefore the corresponding part of the leaf spring 7 undergoes elastic deformation (i.e., the leaf spring 7 is curved). The shaft 52 of the driven element 5 is pushed toward a direction in which the contacted element 51 gets close to the contact portion 66 of the vibrating element 6 (a rightward direction in FIG. 43) by means of elastic force (restoring force) of the leaf spring 7. Namely, the driven element 5 (the contacted element 51) is biased toward the rightward direction in FIG. 43 by the elastic force of the leaf spring 7, whereby the surface 512 of the contacted element 51 is in pushing contact with the contact portion 66 of the vibrating element 6.

Further, similar to the operating apparatus 1 in the fifth embodiment described above, a pair of (two) arm portions 68, 68 each having elasticity (flexibility) are integrally formed on the reinforcing plate 63 of the vibrating plate 6.

In the operating apparatus 1, when the vibrating element 6 undergoes vibration by application of a high-frequency alternating current from an outer conducting circuit (not shown), the contacted element 51 rotates so that the shaft 52 is a rotational axis thereof, by being struck by means of the contact portion 66 of the vibrating element 6. Together with the contacted element 51 the driven element 5 rotatively displaces so that the shaft 52 is a rotational axis thereof. Thus, an imaging direction of the optical system 2 can be changed to a rotative direction of the driven element 5.

According to the operating apparatus 1, it is possible to push the surface 512 of the contacted element 51 toward the contact portion 66 of the vibrating element 6 with a simplified structure (by a simple method). Since the surface 512 of the contacted element 51 is pushed toward the contact portion 66 of the vibrating element 6, it is possible to obtain greater torque (driving force). Therefore, it is possible to rotatively displace the driven element 5 surely. Further, it is possible to prevent shakiness in a radial direction of the driven element 5. This makes it possible to rotatively displace the driven element 5 smoothly. Moreover, it is possible to obtain effects similar to that of the fifth embodiment described above.

In this regard, the operating apparatus 1 in this embodiment is constructed so that the driven element 5 rotatively displaces (rotates) around one axis (i.e., the shaft 52), but the present invention is not limited to this structure. For example, by using a similar constitution and principle, the operating apparatus 1 may be constructed so that the driven element 5 rotatively displaces (rotates) around two axes whose directions are different from each other, in particular, around two axes that mutually cross at right angles.

As described above, it should be noted that, even though the operating apparatus and the electric instrument of the present invention have been described with reference to the preferred embodiments shown in the accompanying drawings, the present invention is not limited to these embodiments, it is of course possible to make various changes and modifications to each element of the operating apparatus, the electric instrument and various elements described above can be replaced with any other element capable of performing the same or a similar function.

In this regard, the present invention may combine any two or more constitutions (characteristics) in all the embodiments.

The invention claimed is:

1. An operating apparatus comprising:
   a driven element;
   a stationary frame which rotatably supports the driven element about a rotation axis;
   a contacted element which is stationary with respect to the driven element; and
   a vibrating element which includes a first piezoelectric element that undergoes extension and contraction by application of an AC voltage, a reinforcing plate having a contact portion and an arm portion, and a second piezoelectric element that undergoes extension and contraction by application of an AC voltage, the first piezoelectric element, the reinforcing plate and the second piezoelectric element being laminated in this order, and the contact portion of the vibrating element abutting on the contacted element at a single abutting point;
   wherein the vibrating element is fixedly provided on the frame so that the extension and contraction direction of the vibrating element is substantially perpendicular to the rotation axis of the driven element, and when the vibrating element is driven, the vibrating element transmits power to the driven element via the contacted element at the single abutting point to rotate the driven element with respect to the frame.

2. The operating apparatus as claimed in claim 1, wherein the contacted element is fixedly provided on the driven element.

3. The operating apparatus as claimed in claim 1, wherein the vibrating element is fixedly provided on the frame.

4. The operating apparatus as claimed in claim 1, wherein the vibrating element has a thin plate-shaped structure, and the contacted element and the vibrating element are provided in a substantially same plane.

5. The operating apparatus as claimed in claim 1, wherein the driven element has a side surface and the frame has an inner wall surface which is opposite to the side surface of the driven element through a gap therebetween, and the contacted element and the vibrating element are arranged within the gap.

6. The operating apparatus as claimed in claim 1, wherein the vibrating element is arranged so that a longitudinal direction thereof is parallel to a width direction of the frame, and the contacted element is arranged on a line extended to the longitudinal direction of the vibrating element.

7. The operating apparatus as claimed in claim 1, wherein the contacted element and the vibrating element are arranged so as to overlap each other when viewed from a top of the operating apparatus.

8. The operating apparatus as claimed in claim 1, further comprising a decelerating mechanism between the contacted element and the driven element.

9. The operating apparatus as claimed in claim 1, further comprising means for pushing one of the contacted element and the vibrating element toward the other.

10. An operating apparatus comprising:
    a driven element;
    a first frame which receives the driven element;
    a second frame which rotatably supports the first frame;
    a contacted element which is stationary with respect to the first frame; and
    a vibrating element which includes a first piezoelectric element that undergoes extension and contraction by application of an AC voltage, a reinforcing plate having a contact portion and an arm portion, and a second piezoelectric element that undergoes extension and contraction by application of an AC voltage, the first piezoelectric element, the reinforcing plate and the second piezoelectric element being laminated in this order, and the contact portion of the vibrating element abutting on the contacted element;
    wherein the vibrating element transmits power to the first frame via the contacted element to rotate the first frame.

11. The operating apparatus as claimed in claim 10, wherein the driven element is rotatably supported in the first frame, and the driven element and the first frame respectively have rotational axes in which an axial direction of the rotational axis of the driven element with respect to the first frame is different from that of the first frame with respect to the second frame.

12. The operating apparatus as claimed in claim 11, wherein the rotational axis of the driven element with respect to the first frame is substantially orthogonal to that of the first frame with respect to the second frame.

13. The operating apparatus as claimed in claim 10, wherein the vibrating element has a thin plate-shaped structure, and the contacted element and the vibrating element are provided in a substantially same plane.

14. The operating apparatus as claimed in claim 10, wherein the first frame has a side surface and the second frame has an inner wall surface which is opposite to the side surface of the first frame through a gap therebetween, and the contacted element and the vibrating element are arranged within the gap.

15. The operating apparatus as claimed in claim 10, wherein the first frame has a bottom portion and the second frame has an inner wall surface and an inner bottom surface, the contacted element and the vibrating element are arranged within a space defined by the bottom portion of the first frame and the inner wall surface and the inner bottom surface of the second frame, and the vibrating element and the contacted element transmit power to the first frame through the bottom portion of the first frame.

16. The operating apparatus as claimed in claim 10, further comprising a decelerating mechanism between the contacted element and the first frame.

17. The operating apparatus as claimed in claim 10, wherein the contacted element has a gear and the first frame has tooth grooves so that the tooth grooves which are in engagement with the gear so that the contacted element transmits the power of the vibrating element to the first frame via the gear and the tooth grooves.

18. The operating apparatus as claimed in claim 10, wherein the contacted element is fixedly provided on the first frame.

19. The operating apparatus as claimed in claim 10, wherein the contacted element is fixedly provided on the second frame.

20. The operating apparatus as claimed in claim 19, wherein the vibrating element is fixedly provided on the first frame so as to rotate together with the first frame.

21. The operating apparatus as claimed in claim 20, wherein the inner wall surface of the second frame constitutes the contacted element, and the vibrating element abuts on the inner wall surface of the second frame to transmit its vibration to the inner wall surface and to receive reaction force from the inner wall surface so that the first frame is rotated together with the vibrating element by means of the reaction force.

22. An operating apparatus comprising:
a driven element;
a first frame which rotatably supports the driven element;
a first contacted element which is stationary with respect to the driven element;
a first vibrating element which includes a first piezoelectric element that undergoes extension and contraction by application of an AC voltage, a reinforcing plate having a contact portion and an arm portion, and a second piezoelectric element that undergoes extension and contraction by application of an AC voltage, the first piezoelectric element, the reinforcing plate and the second piezoelectric element of the first vibrating element being laminated in this order, and the contact portion of the first vibrating element abutting on the first contacted element;
a second frame which rotatably supports the first frame;
a second contacted element which is stationary with respect to the first frame; and
a second vibrating element which includes a first piezoelectric element that undergoes extension and contraction by application of an AC voltage, a reinforcing plate having a contact portion and an arm portion, and a second piezoelectric element that undergoes extension and contraction by application of an AC voltage, the first piezoelectric element, the reinforcing plate and the second piezoelectric element of the second vibrating element being laminated in this order, and the contact portion of the second vibrating element abutting on the second contacted element;
wherein the first vibrating element transmits power to the driven element via the first contacted element to rotate the driven element with respect to the first frame, and the second vibrating element transmits power to the first frame via the second contacted element to rotate the first frame with respect to the second frame.

23. An electric instrument provided with an operating apparatus, the operating apparatus comprising:
a driven element;
a stationary frame which rotatably supports the driven element about a rotation axis;
a contacted element which is stationary with respect to the driven element; and
a vibrating element which includes a first piezoelectric element that undergoes extension and contraction by application of an AC voltage, a reinforcing plate having a contact portion and an arm portion, and a second piezoelectric element that undergoes extension and contraction by application of an AC voltage, the first piezoelectric element, the reinforcing plate and the second piezoelectric element being laminated in this order, and the contact portion of the vibrating element abutting on the contacted element at a single abutting point;
wherein the vibrating element is fixedly provided on the frame so that the extension and contraction direction of the vibrating element is substantially perpendicular to the rotation axis of the driven element, and when the vibrating element is driven, the vibrating element transmits power to the driven element via the contacted element at the single abutting point to rotate the driven element with respect to the frame.

24. An electric instrument provided with an operating apparatus, the operating apparatus comprising:
a driven element;
a first frame which receives the driven element;
a second frame which rotatably supports the first frame;
a contacted element which is stationary with respect to the first frame; and
a vibrating element which includes a first piezoelectric element that undergoes extension and contraction by application of an AC voltage, a reinforcing plate having a contact portion and an arm portion, and a second piezoelectric element that undergoes extension and contraction by application of an AC voltage, the first piezoelectric element, the reinforcing plate and the second piezoelectric element being laminated in this order, and the contact portion of the vibrating element abutting on the contacted element;
wherein the vibrating element transmits power to the first frame via the contacted element to rotate the first frame.

25. An electric instrument provided with an operating apparatus, the operating apparatus comprising:
a driven element;
a first frame which rotatably supports the driven element;
a first contacted element which is stationary with respect to the driven element;
a first vibrating element which includes a first piezoelectric element that undergoes extension and contraction by application of an AC voltage, a reinforcing plate having a contact portion and an arm portion, and a second piezoelectric element that undergoes extension and contraction by application of an AC voltage, the first piezoelectric element, the reinforcing plate and the second piezoelectric element of the first vibrating element being laminated in this order, and the contact portion of the first vibrating element abutting on the first contacted element;
a second frame which rotatably supports the first frame;
a second contacted element which is stationary with respect to the first frame; and
a second vibrating element which includes a first piezoelectric element that undergoes extension and contraction by application of an AC voltage, a reinforcing plate having a contact portion and an arm portion, and a second piezoelectric element that undergoes extension and contraction by application of an AC voltage, the first piezoelectric element, the reinforcing plate and the second piezoelectric element of the second vibrating element being laminated in this order, and the contact portion of the second vibrating element abutting on the second contacted element;
wherein the first vibrating element transmits power to the driven element via the first contacted element to rotate the driven element with respect to the first frame, and the second vibrating element transmits power to the first frame via the second contacted element to rotate the first frame with respect to the second frame.

* * * * *

UNITED STATES PATENT AND TRADEMARK OFFICE
CERTIFICATE OF CORRECTION

PATENT NO. : 7,193,353 B2
APPLICATION NO. : 10/817446
DATED : March 20, 2007
INVENTOR(S) : Osamu Miyazawa It is certified that error appears in the above-identified patent and that said Letters Patent is hereby corrected as shown below:

Title Page, item 56 FOREIGN PATENT DOCUMENTS, Line 3, delete "WO WO0038309 * 6/2000" (repeat of Line 2).

Col. 1, line 22-23: "http://www.viwemedia. co.jp/kiki/vcc4.htm" should be -- http://www.viwemedia.co.jp/kiki/vcc4.htm --

Col. 15, line 47: after "rotating" insert -- amount (for example, rotation number, rotation angle, or the like) for the --

Col. 25, line 60: after "to," insert -- efficiently obtain --.

Col. 33, line 27: after "element" insert -- 5 --.

Signed and Sealed this

Fifteenth Day of April, 2008

JON W. DUDAS
*Director of the United States Patent and Trademark Office*